United States Patent
Morisset et al.

(10) Patent No.: US 10,479,200 B2
(45) Date of Patent: Nov. 19, 2019

(54) THROTTLE CONTROL SYSTEM AND METHOD

(71) Applicant: MAGTEC PRODUCTS, INC., Calgary (CA)

(72) Inventors: Michel Robert Morisset, Calgary (CA); Kaushik Krishna Veera Raghavan, Calgary (CA)

(73) Assignee: MAGTEC PRODUCTS, INC., Calgary, Alberta (CA)

( * ) Notice: Subject to any disclaimer, the term of this patent is extended or adjusted under 35 U.S.C. 154(b) by 0 days.

(21) Appl. No.: 15/548,756

(22) PCT Filed: Apr. 19, 2016

(86) PCT No.: PCT/CA2016/000116
§ 371 (c)(1),
(2) Date: Aug. 3, 2017

(87) PCT Pub. No.: WO2017/147677
PCT Pub. Date: Sep. 8, 2017

(65) Prior Publication Data
US 2018/0065481 A1 Mar. 8, 2018

(51) Int. Cl.
*B60K 31/00* (2006.01)
*B60K 31/04* (2006.01)
(Continued)

(52) U.S. Cl.
CPC ............ *B60K 31/047* (2013.01); *B60K 26/02* (2013.01); *B60K 26/021* (2013.01);
(Continued)

(58) Field of Classification Search
CPC .................. B60K 26/02; B60K 26/021; B60K 2031/0091; B60W 30/143; B60W 30/146;
(Continued)

(56) References Cited

U.S. PATENT DOCUMENTS 3,718,202 A  2/1973  Brock
3,878,915 A  4/1975  Purland et al.
(Continued)

FOREIGN PATENT DOCUMENTS

| GB | 2481025 B | 11/2013 |
| WO | 2010087990 A1 | 8/2010 |
| WO | 2011154736 A1 | 12/2011 |

OTHER PUBLICATIONS

Airco VDO., "Pedal Interface II—The Easy, Flexible Way to Manage Engine Performance," 6 pages, Retrieved from the Internet: URL: http://www.airco.com.au/PDF/PI_2_Broch%C3%BCre_gb.pdf.
(Continued)

*Primary Examiner* — Richard A Goldman
(74) *Attorney, Agent, or Firm* — Stephen M. De Klerk

(57) ABSTRACT

A throttle control system and method for use with a vehicle. The throttle control system receives an input voltage from a vehicle throttle controller. The throttle control system prepares a throttle signal and provides the throttle signal to the throttle to force deceleration to a selected speed or constrain acceleration to a selected value. Preparing the throttle signal may follow detection of maximum threshold values of speed or input voltage. The maximum threshold values may be specific to the location of the vehicle. The throttle signal and the maximum threshold values may be defined with reference to the input voltage, vehicle speed, vehicle location, or other parameters. The throttle signal may force deceleration or constrain acceleration incrementally to mitigate loss of vehicle throttle controller responsiveness to driver commands. The throttle signal may be an output voltage provided to a vehicle electronic control module.

71 Claims, 34 Drawing Sheets

(51) Int. Cl.
*B60K 26/02* (2006.01)
*F02D 11/10* (2006.01)
*B60W 30/14* (2006.01)
*F02D 41/14* (2006.01)
*B60W 50/00* (2006.01)

(52) U.S. Cl.
CPC ........ *B60W 30/143* (2013.01); *B60W 30/146* (2013.01); *F02D 11/10* (2013.01); *F02D 11/105* (2013.01); *B60K 2031/0091* (2013.01); *B60T 2201/02* (2013.01); *B60W 2050/0081* (2013.01); *B60W 2510/0604* (2013.01); *B60W 2520/10* (2013.01); *B60W 2550/12* (2013.01); *B60W 2550/22* (2013.01); *B60W 2550/406* (2013.01); *B60W 2710/0605* (2013.01); *B60W 2720/10* (2013.01); *B60W 2720/106* (2013.01); *F02D 2011/101* (2013.01); *F02D 2041/1411* (2013.01)

(58) Field of Classification Search
CPC . B60W 2050/0081; B60W 2510/0604; B60W 2520/10; B60W 2550/12; B60W 2550/22; B60W 2550/406; B60W 2710/0605; B60W 2720/10; B60W 2720/106; F02D 11/10; F02D 11/105; F02D 2011/101; F02D 2041/1411; B60T 2201/02
USPC .......................................................... 701/93
See application file for complete search history.

(56) References Cited

U.S. PATENT DOCUMENTS

| | | | |
|---|---|---|---|
| 3,985,195 A * | 10/1976 | Tixier | B60K 31/0058 180/168 |
| 4,419,729 A * | 12/1983 | Krieder | B60K 26/04 123/352 |
| 4,838,377 A | 6/1989 | Kozaki et al. | |
| 4,905,786 A | 3/1990 | Miyake et al. | |
| 5,101,926 A | 4/1992 | Berman et al. | |
| 5,115,145 A | 5/1992 | Westberg et al. | |
| 5,315,286 A | 5/1994 | Nolan | |
| 5,394,135 A | 2/1995 | Stadler | |
| 5,485,161 A | 1/1996 | Vaughn | |
| 5,519,255 A | 5/1996 | Burtch et al. | |
| 5,559,491 A | 9/1996 | Stadler | |
| 5,635,901 A | 6/1997 | Weinblatt | |
| 5,745,030 A | 4/1998 | Aaron | |
| 5,774,820 A | 6/1998 | Linden et al. | |
| 5,828,297 A | 10/1998 | Banks et al. | |
| 5,828,585 A | 10/1998 | Welk et al. | |
| 5,878,359 A * | 3/1999 | Takeda | F02D 11/106 701/107 |
| 6,060,981 A | 5/2000 | Landes | |
| 6,067,007 A | 5/2000 | Gioia | |
| 6,157,317 A | 12/2000 | Walker | |
| 6,356,186 B1 | 3/2002 | Price et al. | |
| 6,370,472 B1 * | 4/2002 | Fosseen | B60K 31/0058 123/399 |
| 6,573,827 B1 | 6/2003 | McKenzie | |
| 6,581,712 B1 | 6/2003 | Nathans | |
| 6,691,015 B1 | 2/2004 | Levine | |
| 6,696,927 B2 | 2/2004 | Flick | |
| 6,756,886 B2 | 6/2004 | Flick | |
| 7,272,467 B2 | 9/2007 | Goncalves et al. | |
| 7,305,294 B2 | 12/2007 | Bate et al. | |
| 7,434,649 B2 | 10/2008 | Bolduc et al. | |
| 7,659,811 B2 | 2/2010 | Flick | |
| 7,671,727 B2 | 3/2010 | Flick | |
| 7,699,133 B2 | 4/2010 | Bolduc et al. | |
| 7,826,959 B2 | 11/2010 | Namari et al. | |
| 7,957,882 B2 * | 6/2011 | Morisset | B60W 30/17 180/179 |
| 8,000,874 B2 * | 8/2011 | Tange | B60T 7/22 701/301 |
| 8,000,877 B2 * | 8/2011 | Aussillou | F02D 11/105 123/396 |
| 8,204,646 B2 | 6/2012 | Morisset et al. | |
| 8,290,680 B2 | 10/2012 | Morisset et al. | |
| 8,311,734 B2 * | 11/2012 | Georgis | G08G 1/096775 701/415 |
| 8,751,133 B2 * | 6/2014 | Poulin | B60W 30/146 700/304 |
| 2002/0170762 A1 * | 11/2002 | Daneshmand | B60K 31/04 180/178 |
| 2004/0002808 A1 * | 1/2004 | Hashimoto | F02D 11/107 701/107 |
| 2004/0041691 A1 | 3/2004 | Kapolka | |
| 2004/0075541 A1 | 4/2004 | Simoneau | |
| 2004/0113761 A1 | 6/2004 | Borugian | |
| 2005/0081119 A1 | 4/2005 | DiZoglio et al. | |
| 2005/0197744 A1 * | 9/2005 | Kalau | B60R 25/04 701/1 |
| 2006/0195249 A1 * | 8/2006 | Fosseen | F02D 35/02 701/104 |
| 2007/0156321 A1 | 7/2007 | Schad | |
| 2009/0210257 A1 * | 8/2009 | Chalfant | G06Q 40/08 705/4 |
| 2009/0240387 A1 * | 9/2009 | Kawai | B60K 6/445 701/22 |
| 2012/0290160 A1 * | 11/2012 | McVean | B62M 6/45 701/22 |
| 2013/0211643 A1 | 8/2013 | Cox et al. | |
| 2014/0114502 A1 * | 4/2014 | Hugron | B60W 50/14 701/2 |
| 2014/0229067 A1 * | 8/2014 | Gibson | B62D 5/0481 701/41 |
| 2015/0134219 A1 * | 5/2015 | Poulin | B60K 31/00 701/70 |
| 2015/0317844 A1 * | 11/2015 | Choi | G07C 5/008 701/29.3 |
| 2015/0322868 A1 * | 11/2015 | Marenco | B60K 26/04 701/93 |
| 2015/0355637 A1 * | 12/2015 | Morisset | G05D 1/0022 701/2 |
| 2018/0065481 A1 * | 3/2018 | Morisset | B60K 26/021 |

OTHER PUBLICATIONS

Autokontrol., "System 80," 2 pages, Retrieved from the Internet: URL: http://www.autokontroluk.co.uk/our-products/drive-by-wire/system-80/.
Derive Systems., "Speed Limiters, Fuel Efficiency, Safety and Performance Tuning," Derive Solutions, 3 pages, Retrieved from the Internet: URL: http://derivesystems.com/efficiency/solutions/?gclid=CMC869-ussMCFUVhfgod13YAFQ.
Groeneveld Lubrication Solutions., "Speed Limiter ESL / SL-4 Specification Sheet," Groeneveld Group, Dec. 2015-V1.0, 2 pages.
Groeneveld., "Speed Limiter Parts Manual," Release date Jun. 2015, D000030R01, 24 pages.
IMPCO Technologies Europe, "IMPCO Speed Limiter," 1 page.
International Patent Application No. PCT/CA2016/000116, International Search Report and Written Opinion dated Jan. 18, 2017.
Mine Technology Services LTD., "Autokontrol Speed-Limiters System 80," 1 page, Retrieved from the Internet: URL: http://www.mineserv.co.uk/pdfs/Autokontrol%20System%2080.pdf.
SABO Speed Limiter for Road Safety, SABO Electronic Technology Co., Ltd, 1 pages. Retrieved from the Internet URL: http://www.sabo-speed.com/.
Speedshield., "Automotive Product Range," 11 pages.
Stoneridge Electronics LTD, "Electronic Road Speed Limiter Training Course," Vehicle & Operator Services Agency, DD55381 Rev 03, 46 pages.
Sturdy Europe., "Electronic Road Speed Limiter Install Guide," Sep. 2008, 132 pages.

* cited by examiner

THROTTLE CONTROL SYSTEM AND METHOD

CROSS-REFERENCE TO OTHER APPLICATIONS

This is a National Phase of International Application No. PCT/CA2016/000116 filed on Apr. 19, 2016.

FIELD

The present disclosure relates generally to throttle control for a vehicle.

BACKGROUND

Many vehicles include a drive-by-wire system that applies electronic sensors to relay driver input to an electronic control module ("ECM"). The ECM calculates driving of appropriate actuators to respond to the driver input. One subsystem commonly controlled by the ECM is an electronic throttle control system.

A vehicle's accelerator pedal is connected to the ECM by electronic circuits that transduce the accelerator pedal position into corresponding electrical voltages that the ECM applies to position the vehicle's throttle. When the driver is not applying any pressure to the accelerator pedal, the throttle will be at the idle position. When the driver applies sufficient pressure to the pedal to move it through its entire range of motion, the throttle will be at the wide open position. The rise and fall of the voltages in between the idle position and the wide open position reflect the pressure exerted by the driver on the accelerator pedal, which translates as a request for an increase or decrease in acceleration.

The accelerator pedal is a critical element for the safety and drivability of the vehicle. As a result, the ECM typically samples pedal voltages at a rate in the kHz range to monitor the condition of the accelerator pedal while it is being depressed or released. When the driver pushes on the throttle pedal, the corresponding voltages sent to the ECM by the throttle pedal circuits increase. In response to the increase in voltage, the ECM causes throttle position motors on cylinder heads in the vehicle's engine to move a butterfly valve to a position that will provide an increase in the air-fuel mixture provided to the cylinder, resulting in an increase in acceleration.

When the driver reduces the pressure on the throttle pedal, the corresponding voltages sent to the ECM by the accelerator pedal circuits decrease. In response to the decrease in voltage, the ECM causes the throttle position motors to move the butterfly valve to a position that will provide a decrease in the air-fuel mixture provided to the cylinder, resulting in an decrease in acceleration.

SUMMARY

It is desirable to automatically control some aspects of a vehicle's function, including acceleration, deceleration, and speed. Vehicle acceleration, deceleration, and speed may be controlled in response to defined conditions by modulating driver control of a vehicle throttle when the defined conditions are detected. Some previous control systems for disabling or controlling a vehicle throttle included drawbacks in terms of fuel economy, damage to the vehicle, and driver stress associated with transitions between driver control and automated throttle control. It is an object of the present disclosure to obviate or mitigate at least one disadvantage of previous control systems.

Herein provided is a throttle control system and method for use with a vehicle to control a throttle of the vehicle. The throttle control system receives an input voltage from a vehicle throttle controller, such as a throttle pedal. The throttle control system prepares a throttle control signal and provides the throttle control signal to the throttle. The throttle control signal may be prepared with reference to the input voltage, speed data of vehicle speed, location data of vehicle location, or a combination thereof. The speed data may be received from a satellite service, a vehicle speed sensor ("VSS"), a vehicle data bus, an vehicle inertial navigation system ("INS"), a terrestrial beacon service, or any suitable source or combination of data sources. The location data may be received from the STM, the INS, the terrestrial beacon service, or any suitable combination of data sources.

The throttle control signal may constrain vehicle acceleration to a selected value, force deceleration of the vehicle to a selected speed, or result in other changes in throttle response relative to a throttle response that would otherwise result from providing the input voltage from the vehicle throttle controller to a vehicle electronic control module ("ECM") in operative communication with the throttle. The throttle control system may provide the throttle control signal to the throttle by stepping down, attenuating, or otherwise lowering the input voltage to a target voltage value, and providing an output voltage at the target voltage value to the ECM. The throttle control system may also be included as an onboard component of the ECM, in which case the throttle control signal may be provided directly to a fuel injector or other downstream component of the throttle.

A throttle control signal for controlling acceleration, deceleration, or speed may be provided to the throttle where a maximum speed threshold value is exceeded, a maximum voltage threshold value is exceeded, or any suitable condition is met. The threshold values or other conditions may be determined or updated with reference to vehicle data of the input voltage, the vehicle speed, the vehicle location, or a combination thereof. The threshold values or other conditions may be determined or updated with reference to parameters including geofences, posted speed limits, driver profiles, weather conditions, or other suitable factors. The vehicle data may be compared with the threshold values to determine whether the threshold values as defined by the parameters have been exceeded. The throttle control system may be in communication with an internet service. The geofence locations and properties, posted speed limits, driver profiles, and weather conditions may be accessed remotely through the internet service or from a locally stored database with updates from the internet service.

The throttle control system may constrain acceleration by applying acceleration control within a defined range of input voltage values. The limits of the range may be a baseline input voltage value and a maximum voltage range value. From the baseline value, the upper maximum voltage range value defines a maximum voltage threshold value. The baseline value may be an idle throttle voltage value of the input voltage. Acceleration control may follow an increase in the input voltage from the baseline value to a value greater than the maximum voltage threshold value. In such a case, driver control of the throttle is removed and the throttle control signal may be gradually increased from the baseline value to the maximum voltage range value. Once the upper maximum voltage range value is reached under acceleration control, driver control over the throttle may be resumed within a defined time frame. By controlling acceleration only from identified baseline values, such as the idle throttle voltage value, rapid acceleration from a stopped position may be curtailed while leaving rapid acceleration available for passing other vehicles on a highway or other acceleration that may be taking place at higher speeds.

The throttle control system may force deceleration by applying deceleration control when the vehicle speed exceeds a maximum speed threshold value. The throttle control signal may be gradually lowered to a target value from the control signal resulting from the input voltage at or above the maximum speed threshold value when deceleration control is initiated. The target value, such as an idle throttle value, will limit vehicle speed relative to the maximum threshold speed value. The maximum speed threshold value may be specific for a given location and updated for other locations. Acceleration control may follow receipt of speed data indicative of a vehicle speed equal to or greater than the maximum speed threshold value for the vehicle location. Once the input voltage is equal to the target value and the vehicle speed is also below the maximum speed threshold value, driver control over the throttle may be resumed within a defined time frame. By controlling deceleration when the maximum speed threshold value specific to a given location is exceeded, vehicle operation at excessive speeds may be mitigated. In addition, a vehicle owner or other person with access to the throttle control system may program the maximum speed threshold values specific to various locations, various drivers, posted speed limits, weather conditions, or other parameters.

Location-specific maximum voltage or speed threshold values may facilitate safer driving practices. Gradual modification of the throttle control signal may mitigate loss of vehicle throttle responsiveness and mitigate disruption of the driver's interaction with the vehicle, which may also provide advantages in terms of safety. The throttle control system may be calibrated to throttle position for preparing the throttle control signal based on the input voltage at idle throttle, the input voltage at wide open throttle, speed data, or a combination thereof. The calibration may facilitate the gradual modification of input throttle values.

In a first aspect, the present disclosure provides a throttle control system and method for use with a vehicle. The throttle control system receives an input voltage from a vehicle throttle controller. The throttle control system prepares a throttle signal and provides the throttle signal to the throttle to force deceleration to a selected speed or constrain acceleration to a selected value. Preparing the throttle signal may follow detection of maximum threshold values of speed or input voltage. The maximum threshold values may be specific to the location of the vehicle. The throttle signal and the maximum threshold values may be defined with reference to the input voltage, vehicle speed, vehicle location, or other parameters. The throttle signal may force deceleration or constrain acceleration incrementally to mitigate loss of vehicle throttle controller responsiveness to driver commands. The throttle signal may be an output voltage provided to a vehicle electronic control module.

In a further aspect, the present disclosure provides a method of controlling a throttle on a vehicle. The method includes receiving speed data of a vehicle speed; receiving location data of a vehicle location; receiving an input voltage from a throttle controller; accessing a maximum speed threshold value corresponding to the vehicle location; comparing the vehicle speed with the maximum speed threshold value; and providing a throttle signal to the throttle. The throttle signal corresponds to the input voltage where the speed data is indicative of the vehicle speed being below the maximum speed threshold value. The throttle signal corresponds to a lowered input voltage value for controlling vehicle deceleration where the speed data is indicative of the vehicle speed being greater than the maximum speed threshold value In some embodiments, receiving the speed data includes receiving the speed data from a satellite service. In some embodiments, the method includes receiving comparison speed data from a comparison speed data source other than the satellite service; and calibrating the comparison speed data against the speed data received from the satellite service. In some embodiments, the comparison speed data source includes a vehicle speed sensor; in some embodiments, the comparison speed data source includes a vehicle data bus; in some embodiments, after calibrating the comparison speed data against the speed data received from the satellite service: the throttle signal corresponds to the input voltage where the comparison speed data is indicative of the vehicle speed being below the maximum speed threshold value; and the throttle signal corresponds to the lowered input voltage value for controlling vehicle deceleration where the comparison speed data is indicative of the vehicle speed being greater than the maximum speed threshold value. In some embodiments, the comparison speed data is applied for comparing the vehicle speed with the maximum speed threshold value when the speed data is unavailable from the satellite service.

In some embodiments, receiving the speed data includes receiving the speed data from a satellite service. In some embodiments, the method includes removing driver control over a vehicle cruise control module where the vehicle cruise control module is directing the vehicle to drive at a maximum cruise control speed threshold value greater than the maximum speed threshold value. In some embodiments, removing driver control over the vehicle cruise control module follows receiving speed data indicative of the vehicle speed being greater than the maximum cruise control speed threshold value; in some embodiments, removing driver control over the vehicle cruise control module follows a defined time period of receiving speed data indicative of the vehicle speed being at or below the maximum cruise control speed threshold value and being greater than the maximum speed threshold value.

In some embodiments, receiving the speed data includes receiving the speed data from a satellite service. In some embodiments, receiving the speed data from the satellite service includes receiving the speed data with a satellite-based tracking module ("STM"); comparing the vehicle speed with the maximum speed threshold value is completed by the STM; and providing the throttle signal to the throttle includes receiving a limiter trigger signal from the STM where the vehicle speed is greater than the maximum speed threshold value. In some embodiments, the method includes receiving comparison speed data from a comparison speed data source other than the satellite service; receiving a calibration trigger signal from the STM; and calibrating the comparison speed data against the speed data received from the satellite service; in some embodiments, the method includes receiving a cruise trigger signal from the STM; and removing driver control over a vehicle cruise control feature in response to the cruise trigger signal.

In some embodiments, receiving the speed data includes receiving the speed data from a vehicle speed sensor.

In some embodiments, receiving the speed data includes receiving the speed data from a vehicle data bus.

In some embodiments, receiving the location data includes receiving the location data from a satellite service.

In some embodiments, receiving the location data includes receiving the location data from an inertial navigation system.

In some embodiments, receiving the location data includes receiving the location data from a terrestrial beacon system.

In some embodiments, accessing the maximum speed threshold value includes accessing a database of posted speed limits, identifying the vehicle location in the database, and applying the posted speed limit at the vehicle location for defining the maximum speed threshold value. In some embodiments, defining the maximum speed threshold value includes setting the maximum speed threshold value at a defined margin above the posted speed limit.

In some embodiments, accessing the maximum speed threshold value includes accessing a database of geofence locations and identifying the vehicle location in the database. In some embodiments, receiving the location data includes receiving the location data from a satellite service; and the maximum speed threshold value at the time the vehicle enters a geofence remains applicable if communication with the satellite service is lost; in some embodiments, a border of the geofence is located proximate an access point to a tunnel; in some embodiments, the geofence locations are defined by accumulators that define the maximum speed threshold value; in some embodiments, accessing the database of geofence locations includes accessing an internet service hosting the database of geofence locations; in some embodiments, accessing the database of geofence locations includes accessing a locally-stored copy of the database of geofence locations; in some embodiments, the maximum speed threshold value inside at least one geofence is zero. In some embodiments, the method includes sending an alert to an internet service when the vehicle enters the geofence with a zero maximum speed threshold value.

In some embodiments, accessing the maximum speed threshold value includes accessing a database of driver profiles.

In some embodiments, accessing the maximum speed threshold value includes accessing an internet service. In some embodiments, accessing the internet service includes accessing a weather service. In some embodiments, accessing the weather service includes receiving weather data including data of a bad weather zone location, identifying the vehicle location in relation to the bad weather zone, and defining the maximum speed threshold value with respect to the bad weather zone. In some embodiments, the method includes lowering the maximum speed threshold where the vehicle location is inside the bad weather zone; in some embodiments, the method includes lowering the maximum speed threshold where the vehicle location is within a defined distance from the bad weather zone.

In some embodiments, accessing the maximum speed threshold value includes accessing a database locally stored onboard the vehicle.

In some embodiments, the throttle signal includes an output voltage to an ECM of the vehicle; the output voltage is lowered from the input voltage to a target voltage value for controlling vehicle deceleration where the speed data is indicative of the vehicle speed being greater than the maximum speed threshold value; and providing the throttle signal to the throttle includes providing the output voltage at the target voltage value to the ECM. In some embodiments, the method includes receiving an input voltage of an idle throttle value ("$V_{Idle}$"); and calibrating the target voltage based on $V_{Idle}$; wherein the target voltage is $V_{Idle}$. In some embodiments, the method includes recalibrating $V_{Idle}$ during vehicle operation when the input voltage is equal to $V_{Idle}$; in some embodiments, lowering the output voltage to $V_{Idle}$ includes lowering the output voltage from a voltage value at the time the maximum speed threshold value is detected ("$V_{LIM}$") to $V_{Idle}$ in X steps of Y duration each. In some embodiments, the method includes releasing control over the output voltage once a time period of XY has passed following both the output voltage reaching $V_{Idle}$ and the speed data indicating that the speed is equal or less than the maximum speed threshold value; in some embodiments, X=60 steps, Y=50 ms/step, and XY=3 seconds.

In some embodiments, providing the throttle signal to the throttle includes providing an output voltage to an ECM in communication with the throttle.

In some embodiments, comparing the speed data to the maximum speed threshold value and preparing the throttle signal are executed onboard an ECM of the vehicle and providing the throttle signal to the throttle includes actuation of the throttle by the ECM.

In some embodiments, the throttle signal corresponds to the input voltage where the speed data is indicative of the vehicle speed accelerating beyond the maximum speed threshold value following the throttle signal corresponding to the lowered input voltage value.

In some embodiments, the method includes providing the speed data, the location data, or data of the input voltage to an internet service.

In a further aspect, the present disclosure provides a method of controlling a throttle on a vehicle. The method includes receiving an input voltage from a throttle controller; accessing a maximum voltage threshold value; comparing the input voltage to the maximum voltage threshold value; and providing a throttle signal to the throttle. The throttle signal corresponds to the input voltage where the input voltage is below the maximum voltage threshold value. The throttle signal corresponds to a lowered input voltage for controlling vehicle acceleration where the input voltage is greater than the maximum voltage threshold value.

In some embodiments, the throttle signal includes an output voltage to an ECM of the vehicle; the output voltage is lowered from the input voltage to an lowered output voltage value for controlling vehicle acceleration where the input voltage is greater than the maximum voltage threshold value; and providing the throttle signal to the throttle includes providing the output voltage at the lowered voltage value to the ECM. In some embodiments, the method includes receiving an input voltage of an idle throttle value ("$V_{Idle}$"); receiving an input voltage of a wide open throttle voltage value ("$V_{WOT}$"); and calibrating the lowered output voltage based on $V_{WOT}$ and $V_{Idle}$. In some embodiments, comparing the input voltage to the maximum voltage threshold value follows an input voltage value of $V_{Idle}$; a target output voltage is $V_{Idle}+(V_{WOT}-V_{Idle})*MF$; the maximum voltage threshold value is $V_{Idle}+(V_{WOT}-N_{Idle})*MF$; and controlling acceleration includes increasing the output voltage from $V_{Idle}$ to $V_{Idle}+(V_{WOT}-V_{Idle})*MF$ at a defined rate. In some embodiments, MF is about 33%; in some embodiments, increasing the output voltage from $V_{Idle}$ to $V_{Idle}+(V_{WOT}-V_{Idle})*MF$ at the defined rate includes: defining a number of steps ("X"), and a time per step ("Y"); and increasing the output voltage from $V_{Idle}$ to $V_{Idle}+(V_{WOT}-V_{Idle})*MF$ in X steps having a duration per step of Y for a total time of XY. In some embodiments, X=60 steps, Y=50 ms/step, and XY=3 seconds; in some embodiments, the method includes releasing control over the output voltage once a time period of XY has passed following the output voltage reaching $V_{Idle}+(V_{WOT}-V_{Idle})$.

In some embodiments, the method includes receiving speed data of a vehicle speed, and the maximum voltage threshold value is defined with respect to the vehicle speed.

In some embodiments, the method includes receiving location data of a vehicle location, and the maximum voltage threshold value is defined with respect to the vehicle location.

In some embodiments, comparing the speed data to the maximum speed threshold value and preparing the throttle signal are executed onboard an ECM of the vehicle and providing the throttle signal to the throttle includes actuation of the throttle by the ECM.

In a further aspect, the present disclosure provides a computer readable medium including instructions encoded thereon for carrying out any of the methods described herein.

In a further aspect, the present disclosure provides a system for controlling a throttle on a vehicle. The system includes a speed data input for receiving speed data of a vehicle speed; a location data input for receiving location data of a vehicle location; a voltage input for receiving an input voltage from a throttle controller; a throttle output for providing a throttle signal to the throttle; a computer readable medium for storing a maximum speed threshold value corresponding to the location; and a processor in communication with the speed data input for receiving the speed data, with the location data input for receiving the location data, with the voltage input for receiving the input voltage, with the throttle output for controlling the throttle signal, and with the computer readable medium for accessing the maximum speed threshold value. The processor is configured and adapted to compare the speed data to the maximum speed threshold value. The throttle signal corresponds to the input voltage where the speed data is indicative of the vehicle speed being below the maximum speed threshold value. The throttle signal corresponds to a lowered input voltage value for controlling vehicle deceleration where the speed data is indicative of the vehicle speed being greater than the maximum speed threshold value.

In some embodiments, the speed data input and the location data input together include a satellite data input for receiving satellite data from a satellite service, and the satellite data includes the speed data and the location data. In some embodiments, the system includes a comparison speed data input for receiving comparison speed data from a comparison speed data source other than the satellite service; wherein the processor is configured and adapted to calibrate the comparison speed data against the speed data received from the satellite service. In some embodiments, the comparison speed data source includes a vehicle speed sensor; in some embodiments, the comparison speed data source includes a vehicle data bus; in some embodiments, the throttle signal corresponds to the input voltage where the comparison speed data is indicative of the vehicle speed being below the maximum speed threshold value; and the throttle signal corresponds to the lowered input voltage value for controlling vehicle deceleration where the comparison speed data is indicative of the vehicle speed being greater than the maximum speed threshold value. In some embodiments, the processor is configured and adapted to apply the comparison speed data for comparing the vehicle speed with the maximum speed threshold value when the speed data is unavailable from the satellite service.

In some embodiments, the speed data input and the location data input together include a satellite data input for receiving satellite data from a satellite service, and the satellite data includes the speed data and the location data. In some embodiments, In some embodiments, the system includes a cruise control relay interrupt for removing driver control over a vehicle cruise control module where the vehicle cruise control module is directing the vehicle to drive at a speed greater than the maximum speed threshold value.

In some embodiments, the speed data input and the location data input together include a satellite data input for receiving satellite data from a satellite service, and the satellite data includes the speed data and the location data. In some embodiments, the system includes a satellite-based tracking module ("STM") in communication with the processor; wherein the STM is in communication with the satellite service for providing the location data input and the speed data input; comparing the vehicle speed with the maximum speed threshold value is completed by the STM; and the STM is configured and adapted to provide a limiter trigger signal to the processor where the vehicle speed is greater than the maximum speed threshold value. In some embodiments, the system includes a comparison speed data input for receiving comparison speed data from a comparison speed data source other than the satellite service; and wherein the STM is configured and adapted to provide a calibration trigger signal to the processor in response to comparison speed data indicative of the maximum speed threshold value; and the processor is configured and adapted to calibrate the comparison speed data against the speed data received from the satellite service in response to the calibration trigger signal and the limiter trigger signal both being provided to the processor by the STM.

In some embodiments, the speed data input and the location data input together include a satellite data input for receiving satellite data from a satellite service, and the satellite data includes the speed data and the location data. In some embodiments, the system includes a satellite-based tracking module ("STM") in communication with the processor; wherein the STM is in communication with the satellite service for providing the location data input and the speed data input; comparing the vehicle speed with the maximum speed threshold value is completed by the STM; and the STM is configured and adapted to provide a limiter trigger signal to the processor where the vehicle speed is greater than the maximum speed threshold value. In some embodiments, the processor is configured and adapted to receive an input voltage of an idle throttle value ("$V_{Idle}$") and calibrate the target voltage based on $V_{Idle}$; the STM is configured and adapted to provide a calibration trigger signal to the processor in response to an input voltage equal to $V_{Idle}$; and the processor is configured and adapted to calibrate $V_{Idle}$ in response to the calibration trigger signal.

In some embodiments, the speed data input and the location data input together include a satellite data input for receiving satellite data from a satellite service, and the satellite data includes the speed data and the location data. In some embodiments, the system includes a satellite-based tracking module ("STM") in communication with the processor; wherein the STM is in communication with the satellite service for providing the location data input and the speed data input; comparing the vehicle speed with the maximum speed threshold value is completed by the STM; and the STM is configured and adapted to provide a limiter trigger signal to the processor where the vehicle speed is greater than the maximum speed threshold value. In some embodiments, the system includes a cruise control relay providing operative communication between the processor and a vehicle cruise control feature, and wherein: the STM is configured and adapted to provide a cruise trigger signal to the processor; and the processor is configured and adapted to remove driver control over a vehicle cruise control feature in response to the cruise trigger signal.

In some embodiments, the speed data input is for receiving the speed data from a vehicle speed sensor.

In some embodiments, the location data input is for receiving the speed data from a satellite-based tracking system.

In some embodiments, the location data input is for receiving the speed data from an inertial navigation system.

In some embodiments, the location data input is for receiving the speed data from a terrestrial beacon system.

In some embodiments, the throttle output includes a voltage output for connecting the system to an electronic control module ("ECM") of the vehicle; the throttle signal includes an output voltage; and controlling the throttle signal includes lowering the input voltage to a lower value target voltage for controlling vehicle deceleration where the speed data indicates that the speed is greater than the maximum speed threshold value. In some embodiments, the processor is configured and adapted to receive an input voltage of an idle throttle value ("$V_{Idle}$"); and calibrate the target voltage based on $V_{Idle}$; wherein the target voltage is $V_{Idle}$. In some embodiments, the processor is configured and adapted to recalibrate $V_{Idle}$ during vehicle operation when the input voltage is equal to $V_{Idle}$; in some embodiments, the processor is configured and adapted to lower the output voltage to $V_{Idle}$ by lowering the output voltage from a voltage value at the time the maximum speed threshold value is detected ("$V_{LIM}$") to $V_{Idle}$ in X steps of Y duration each. In some embodiments, the processor is configured and adapted to release control over the output voltage once a time period of XY has passed following both the output voltage reaching $V_{Idle}$ and the speed data indicating that the speed is equal or less than the maximum speed threshold value; in some embodiments, X=60 steps, Y=50 ms/step, and XY=3 seconds.

In some embodiments, the throttle output includes a downstream output for directing actuation of the throttle downstream of an ECM.

In some embodiments, the throttle signal corresponds to the input voltage where the speed data is indicative of the vehicle speed accelerating beyond the maximum speed threshold value following the throttle signal corresponding to the lowered input voltage value.

In a further aspect, the present disclosure provides a system for controlling a throttle on a vehicle. The system includes a voltage input for receiving an input voltage from a throttle controller; a throttle output for providing a throttle signal to the throttle; a computer readable medium for storing a maximum voltage threshold value; and a processor in communication with the voltage input for receiving the input voltage, with the throttle output for controlling the throttle signal, and with the computer readable medium for accessing the maximum voltage threshold value. The processor is configured and adapted to compare the input voltage to the maximum voltage threshold value. The throttle signal corresponds to the input voltage where the input voltage is below the maximum voltage threshold value. The throttle signal corresponds to a lowered input voltage for controlling vehicle acceleration where the input voltage is greater than the maximum voltage threshold value.

In some embodiments, the throttle output includes a voltage output for connecting the system to an electronic control module ("ECM") of the vehicle; the throttle signal includes an output voltage; and controlling the throttle signal includes lowering the input voltage to a lower value target voltage for controlling vehicle acceleration where the input voltage increases from an idle voltage value ("$V_{Idle}$") to an input voltage equal to or greater than the maximum voltage threshold value. In some embodiments, the processor is configured and adapted to: receive an input voltage of an idle throttle value ("$V_{Idle}$"); receive an input voltage of a wide open throttle voltage value ("$V_{WOT}$"); and calibrate the lowered output voltage based on $V_{WOT}$ and $V_{Idle}$. In some embodiments, the processor is configured and adapted to compare the input voltage to the maximum voltage threshold value following an input voltage value of $V_{Idle}$; a target output voltage is $V_{Idle}+(V_{WOT}-V_{Idle})*MF$; the maximum voltage threshold value is $V_{Idle}+(V_{WOT}-V_{Idle})*MF$; and controlling acceleration includes increasing the output voltage from $V_{Idle}$ to $V_{Idle}+(V_{WOT}-V_{Idle})*MF$ at a defined rate. In some embodiments, MF is about 33%; in some embodiments, increasing the output voltage from $V_{Idle}$ to $V_{Idle}+(V_{WOT}-V_{Idle})*MF$ at the defined rate includes: defining a number of steps ("X"), and a time per step ("Y"); and increasing the output voltage from $V_{Idle}$ to $V_{Idle}+(V_{WOT}-V_{Idle})*MF$ in X steps having a duration per step of Y for a total time of XY.

In some embodiments, X=60 steps, Y=50 ms/step, and XY=3 seconds; in some embodiments, the processor is configured and adapted to release control over the output voltage once a time period of XY has passed following the output voltage reaching $V_{Idle}+(V_{WOT}-V_{Idle})$.

In some embodiments, the system includes a speed data input for receiving speed data of a speed of the vehicle, and wherein the processor is configured and adapted to updated the maximum voltage threshold value based on the speed data.

In some embodiments, the system includes a location data input for receiving location data, and wherein the processor is configured and adapted to updated the maximum voltage threshold value based on the location data.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figure, in which features sharing reference numerals with a common final two digits correspond to similar features across multiple figures (e.g. the processor 12, 112, 212, 312, 412, 512, 612, 712, 812, 912, 1012, 1112, etc.).

DETAILED DESCRIPTION

Figure 1:
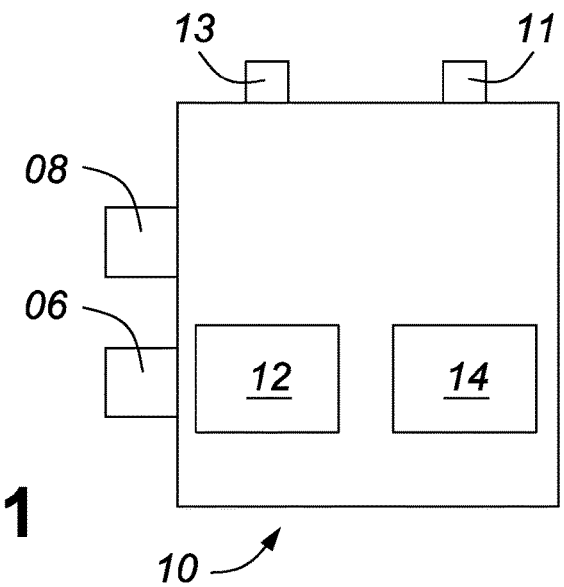
FIG. 1 is a schematic of a throttle control system.

Safety and security of drivers, cargo, and vehicles are important in the automotive transportation industry. It is desirable to automatically control some aspects of a vehicle's function, including acceleration and speed. Vehicle acceleration and speed may be controlled in response to defined conditions by modulating driver control of the vehicle throttle when the defined conditions are detected. Some previous control systems for disabling or controlling a vehicle throttle included drawbacks in terms of fuel economy, damage to the vehicle, and driver stress. It is an object of the present disclosure to obviate or mitigate at least one disadvantage of previous control systems.

Herein provided is a throttle control system and method for use with a vehicle. The system interfaces a vehicle throttle controller and a vehicle throttle for receiving an input voltage from the throttle controller and providing a throttle control signal to the throttle. The throttle control signal may be an output voltage to a vehicle ECM. Where the throttle control system is integrated with the ECM or otherwise downstream of an ECM voltage input, the throttle control signal may be a mechanical actuation or other downstream effect of the ECM on the throttle. For simplicity, most of the embodiments provided as examples herein are described with an output voltage as the throttle control signal. However, the method and system described herein may be applied either upstream or downstream of the ECM.

The output voltage may be stepped down, attenuated, or otherwise lowered from the input voltage by a variable voltage generator or transformer based on a set of rules that applies inputs of vehicle speed, vehicle location, or a combination thereof. The output voltage may be lowered to limit acceleration from a baseline input voltage value, force deceleration to a selected speed, or other applications. Acceleration control may be applied when the user increases the input voltage from a baseline value to a value greater than a maximum input voltage threshold value that may be equal to the maximum voltage range value. When acceleration control is applied, the output voltage is lowered from the input voltage such that an increase from the baseline voltage to the maximum voltage range value takes place more slowly than would be the case without acceleration control. Deceleration control may be applied when the user increases the vehicle speed to or beyond a maximum speed threshold value. When deceleration control is applied, the output voltage decreases from the input voltage to a lower target voltage value, which may be a voltage value on the throttle control that corresponds to an idle throttle position. The output voltage may be raised or lowered from the input voltage as described above gradually to mitigate loss of vehicle throttle responsiveness and to mitigate disruption of the vehicle driver's interaction with the vehicle. Changing the voltage gradually may include application of a voltage limiting gradient method. The input voltage and output voltage may be calibrated to throttle position based on the input voltage at idle throttle, at wide open throttle, or both. Calibration may be updated in response to known throttle voltages or speeds being detected.

The output voltage may be lowered from the input voltage based on a set of rules that applies inputs of speed data and location data. Vehicle speed data may be received from a satellite service, a vehicle speed sensor ("VSS"), a vehicle data bus, an inertial navigation system ("INS"), a terrestrial beacon service, or any suitable source or combination of data sources. Vehicle location data may be received from the satellite service, the INS, the terrestrial beacon service, or any suitable combination of data sources. Where the sources of speed data and of location data each include the satellite service or the terrestrial beacon service, having access to VSS, data bus, or INS data may provide a comparison vehicle speed data in the absence of a connection with the satellite service or the terrestrial beacon service. Application of the rules to the input voltage with reference to the speed data and the location data may be in the context of geofence data, speed limit data, driver identification data, weather data, other parameters, or a combination thereof, which define maximum speed threshold values, maximum input voltage threshold values, or both, in association with defined locations.

Multiple sources of vehicle speed data may provide reference points for calibration of vehicle speed from different vehicle speed data sources against each other, such as calibrating pulse data from a VSS against speed data received from the satellite service. In addition, the throttle control system may be calibrated to throttle position for defining the input voltage at idle throttle, the input voltage at wide open throttle. Calibration of the idle and wide open throttle voltage values may facilitate the gradual modification of input throttle values.

The throttle control system may be in communication with an internet service. The internet service may provide input to the throttle control system through live updates, access to databases, or both. The live updates, the databases, or both, may include one or more of geofence data, speed limit data, weather data, driver profile data, or other transient data that may change as between locations and with the short-term passage of time. The updates from the internet service may result in changes to the maximum speed or voltage threshold values, changes to the gradual rate at which input voltage is changed, or other changes. Any input from the internet service may be provided to the throttle control system, and may be encrypted (e.g. by hexadecimal encryption, etc.). In addition to providing updates to, and receiving reports from, the throttle control system, the internet service may be used to remotely immobilize the vehicle thus mitigating risks of theft, vandalism, and other property with interference, and increasing the safety and security of the driver, the cargo, and the vehicle.

Connection with the satellite service may be through a satellite-based tracking module ("STM"). Inputs of speed data, location data, or both from the satellite service may be received by the STM. The STM in turn passes on analog inputs, digital inputs, or both for to a processor for processing the speed data, location data, or both, and associated lowering of the throttle control signal if the maximum threshold speed or voltage values are met or exceeded. Communication between the STM and the processor may include conveyance of digital speed data and digital location data, or both, which may be received by the STM as satellite data from a satellite based navigation system provided as a satellite service, or calculated based on such satellite data. The analog inputs may include ground triggers for limiting speed, calibrating voltage, or closing cruise control. The analog inputs may be provided to the throttle control system alone or in combination to result in different actions at the throttle control system. The analog inputs may be provided to the throttle control system in response to speed data or location data received and processed by the STM.

The throttle control system and method facilitates variable acceleration control, speed control, and other remote control of any heavy duty, medium duty, or light duty vehicle, whether including a driver in cab, remotely operated, or autonomous. Data of the vehicle location, vehicle speed, or both may be applied to parameters including geofences, driver profiles, the posted speed limit in a specific geographical area, weather or other transient event data, or other factors. The parameters may affect the values of maximum speed or voltage threshold values as a function of the vehicle location, driver profile, whether the vehicle is above or below the posted speed limit (which is not necessarily the same as the maximum speed threshold value), whether the driver is allowed to request for rapid acceleration, whether a maximum speed threshold value needs to be enforced for special circumstances, whether the vehicle has been flagged for immobilization, or other factors.

Throttle Control System

FIG. 1 is a schematic of a throttle control system 10 for use with a vehicle. The throttle control system 10 includes a processor 12 in communication with a computer readable medium 14. The processor 12 is configured and adapted to execute instructions encoded thereon with reference to inputs received by the processor 12 and with reference to data stored on the computer readable medium 14.

The throttle control system 10 includes a throttle controller input 11 in communication with the processor 12 for receiving an input throttle voltage from a vehicle throttle controller. The throttle control system 10 includes a throttle output 13 for providing an output throttle control signal to a vehicle throttle. The throttle control system may lower the throttle control signal relative to the throttle control signal that would ordinarily follow the input voltage. The throttle control signal may be an output voltage to an electronic control module ("ECM") of the vehicle. The throttle output 13 may facilitate an electrical output of the output voltage. Where the throttle control signal is an output voltage, lowering the throttle control signal may include the output voltage may be stepping down, attenuating, or otherwise lowering the input throttle voltage to a target output voltage.

In response to the output voltage, the ECM may calculate driving of actuators to control the vehicle throttle and associated fuel injection system components. Alternatively, the throttle control system 10 may be integrated with the ECM (e.g. as in the throttle control system 810 in FIG. 30, etc.) or the throttle output may otherwise be downstream of the ECM, in which case the throttle control signal may a downstream control signal or actuation sent to the vehicle throttle or fuel injection system. In such cases, the throttle control signal would correspond to the downstream signal at a value that would follow a lowered input voltage if the input voltage received at the throttle controller input were processed by the EMC and effected on the throttle without modification of the downstream signal by the throttle control system.

The throttle control system 10 includes a vehicle speed data input 06 for receiving speed data of a speed of the vehicle and a vehicle location data input 08 for receiving location data of a location of the vehicle. The vehicle speed data input 06 and the vehicle location data input 08 may each be separate input points to the throttle control system 10, or may both be provided by a single input point for receiving both the location data and the speed data, for example the satellite data receiver 142 of the throttle control system 110 shown in FIG. 8.

Figure 2:
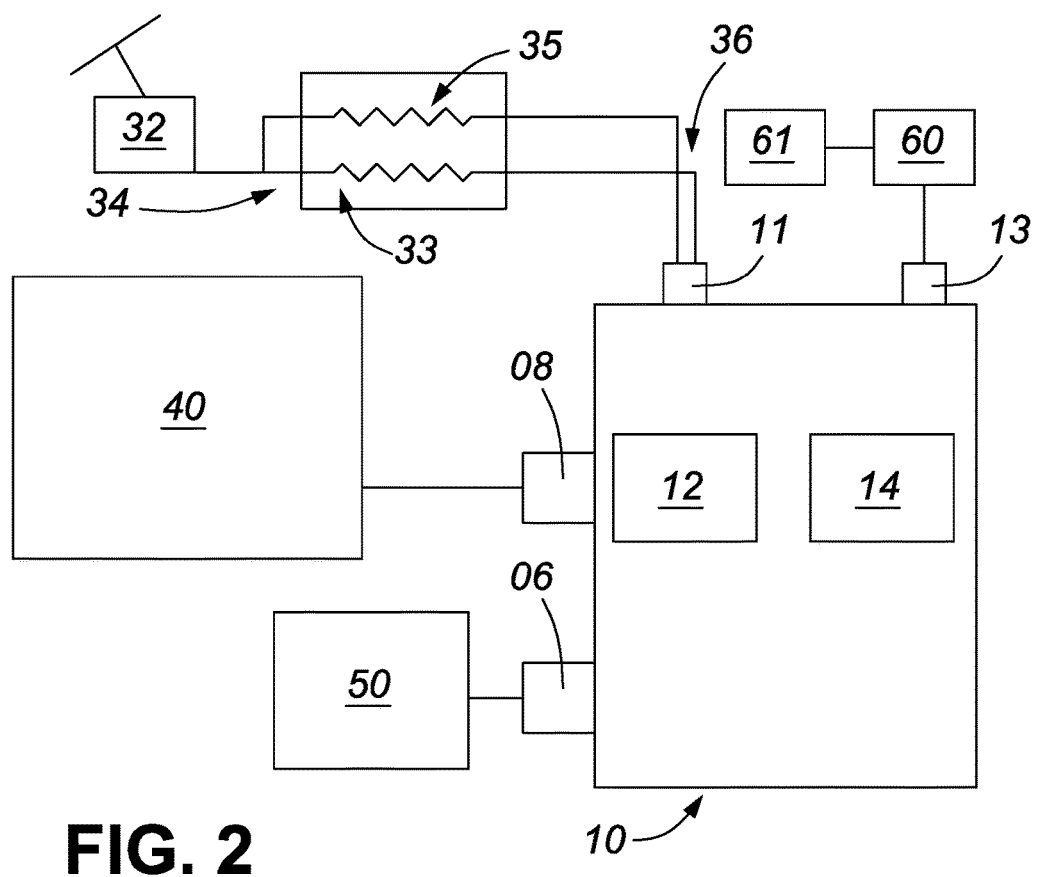
FIG. 2 is a schematic of the throttle control system of FIG. 1 operatively connected with a vehicle.

FIG. 2 is a schematic of the throttle control system 10 in communication with a throttle controller 30, a location data source 40, a speed data source 50, and an ECM 60. The throttle control system 10 is in communication with the throttle controller 30 at the throttle controller input 11. Data of voltage values received as the input throttle voltage from the throttle controller 30 may be provided to the processor 12. The input throttle voltage corresponds to a driver input to the throttle controller 30. The throttle control system 10 is in communication with the location data source 40 at the location data input 08. Location data received from the location data source 40 may be provided to the processor 12. The throttle control system 10 is in communication with the speed data source 50 at the speed data input 06. Speed data received from the speed data source 50 may be provided to the processor 12. The throttle control system 10 is in communication with the ECM 60 at the throttle output 13 for providing the throttle control signal, which may be an the output voltage, to the ECM 60.

The throttle control system 10 provides the output voltage to the ECM 60 at the throttle output 13. The ECM 60 is in communication with the throttle 61. The output voltage may be lowered by the throttle control system 10 from the input voltage of the throttle controller 30 to slow the pace of acceleration or to reduce speed to a defined value. The output voltage to the ECM 60 determines the downstream effect in the vehicle of the input voltage from the throttle controller 30. The output voltage may be gradually adjusted from the input voltage to the target voltage over a time period. The target voltage may correspond to the input voltage from the throttle controller 30 at an idle position of the throttle 61. The input voltage value at the idle throttle position is referred to as "$V_{Idle}$" in some cases below. The time period may be between about 0.1 second and about 5 seconds, for example about 3 seconds. When the throttle control system is applying acceleration control to the throttle 61, the output voltage may be increased from a baseline input voltage to a maximum voltage range value over the time period as further described below with reference to FIGS. 3 to 5. When the throttle control system is applying deceleration control to the throttle 61, the output voltage may be lowered from the input voltage to the target voltage over the time period as further described below with reference to FIGS. 6 and 7.

The processor 12 may include acceleration control system limiting logic, speed limiting logic, tamper logic, and safety logic. The acceleration and speed control system limiting logic provides functionality described below with reference to FIGS. 3 to 7, 13, and 14 for calculating a pace of controlled acceleration or controlled deceleration. The tamper logic may be activated when input voltage from the throttle controller 30 is zero, output voltage to the ECM 60 is zero, or the main power is disconnected from the throttle control system 10. The safety logic allows the driver to manipulate the engine speed to shift to a lower gear if necessary (e.g. to deal with terrain, unusual road conditions, etc.) as described below with respect to downhill logic.

Figure 34:
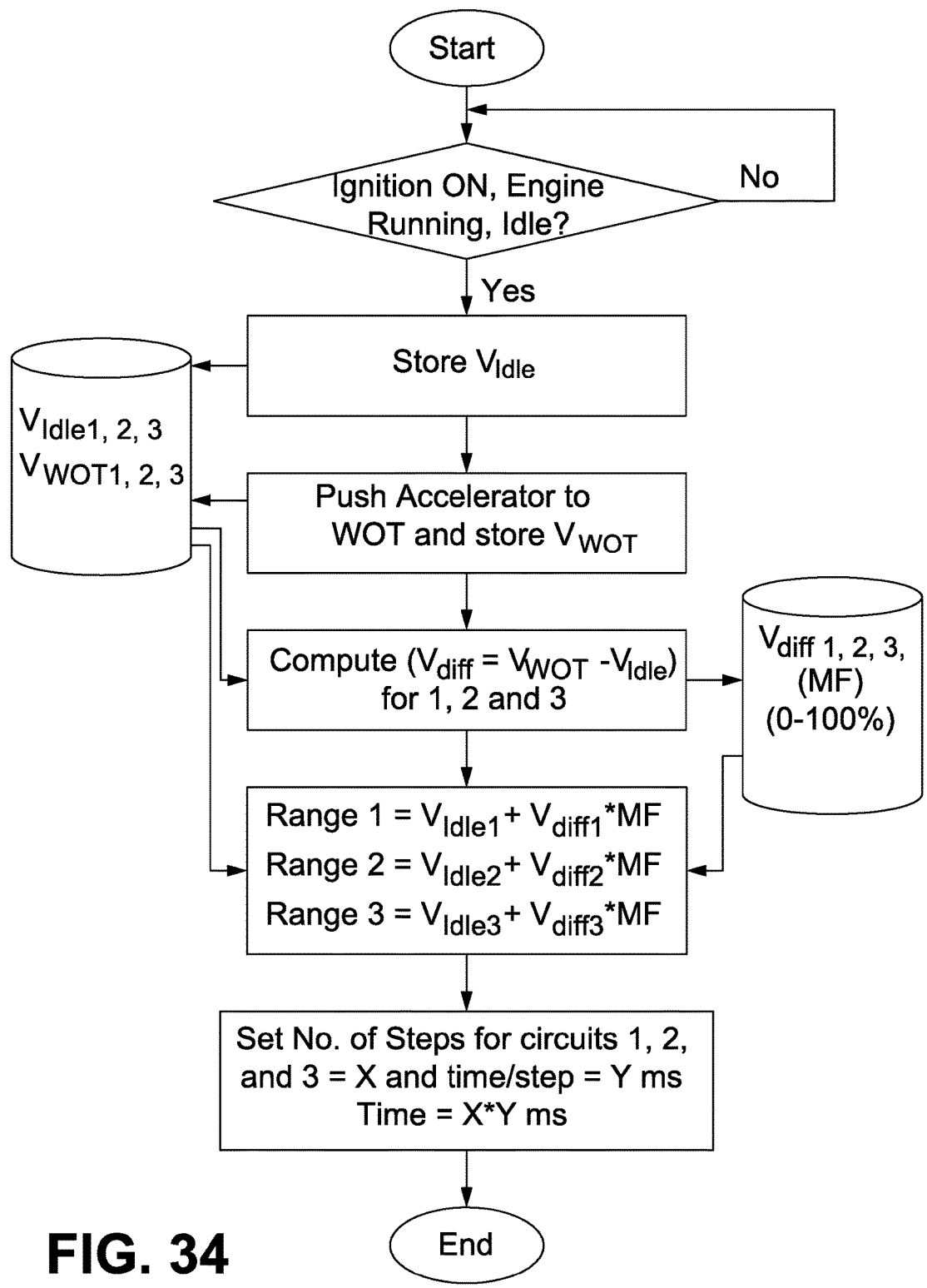
FIG. 34 is a flow chart of calibrating of a 3-circuit throttle control system.
Figure 35:
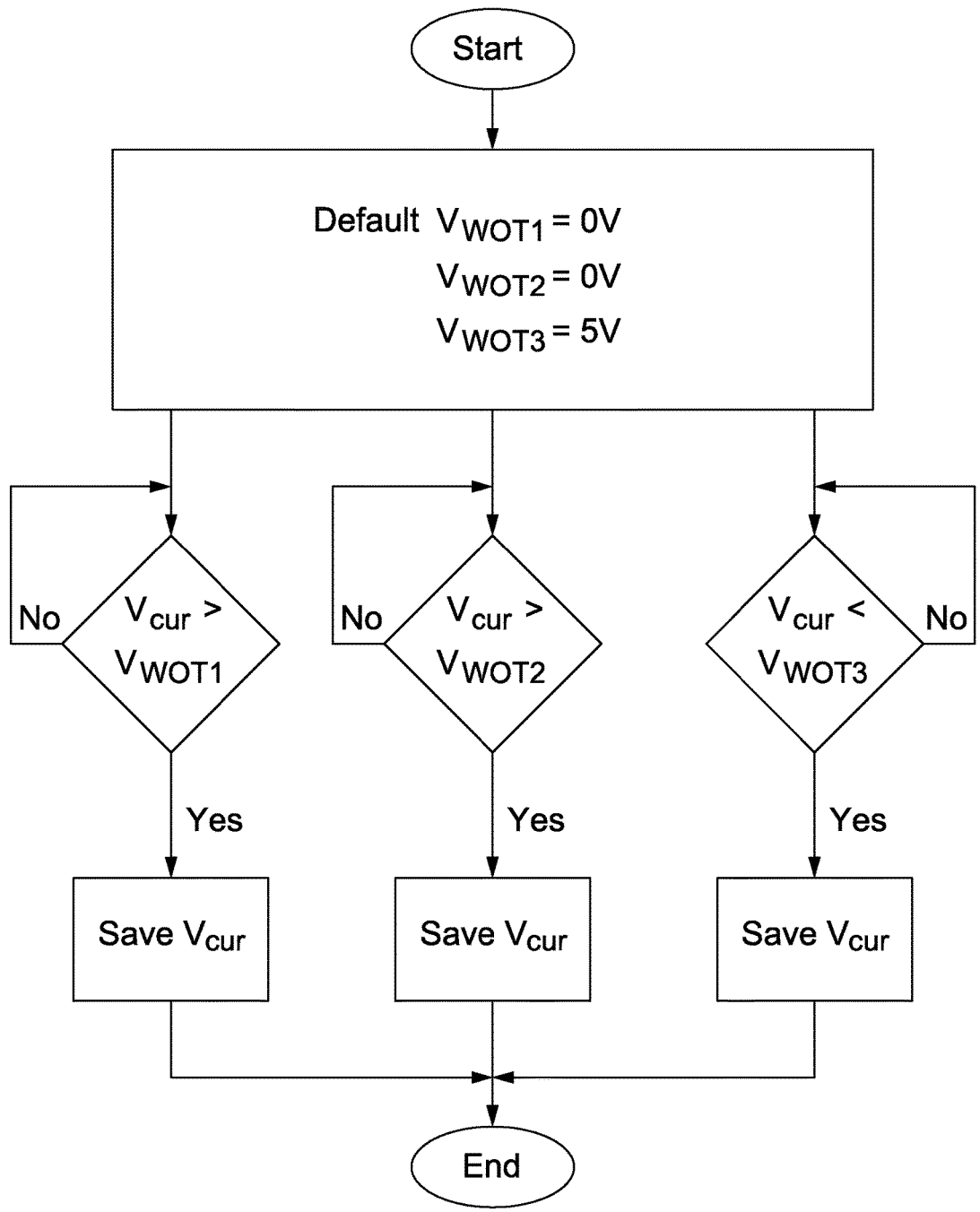
FIG. 35 is a flow chart of storing pedal voltages at a wide open throttle position during the calibration of a 3-circuit throttle control system.
Figure 36:
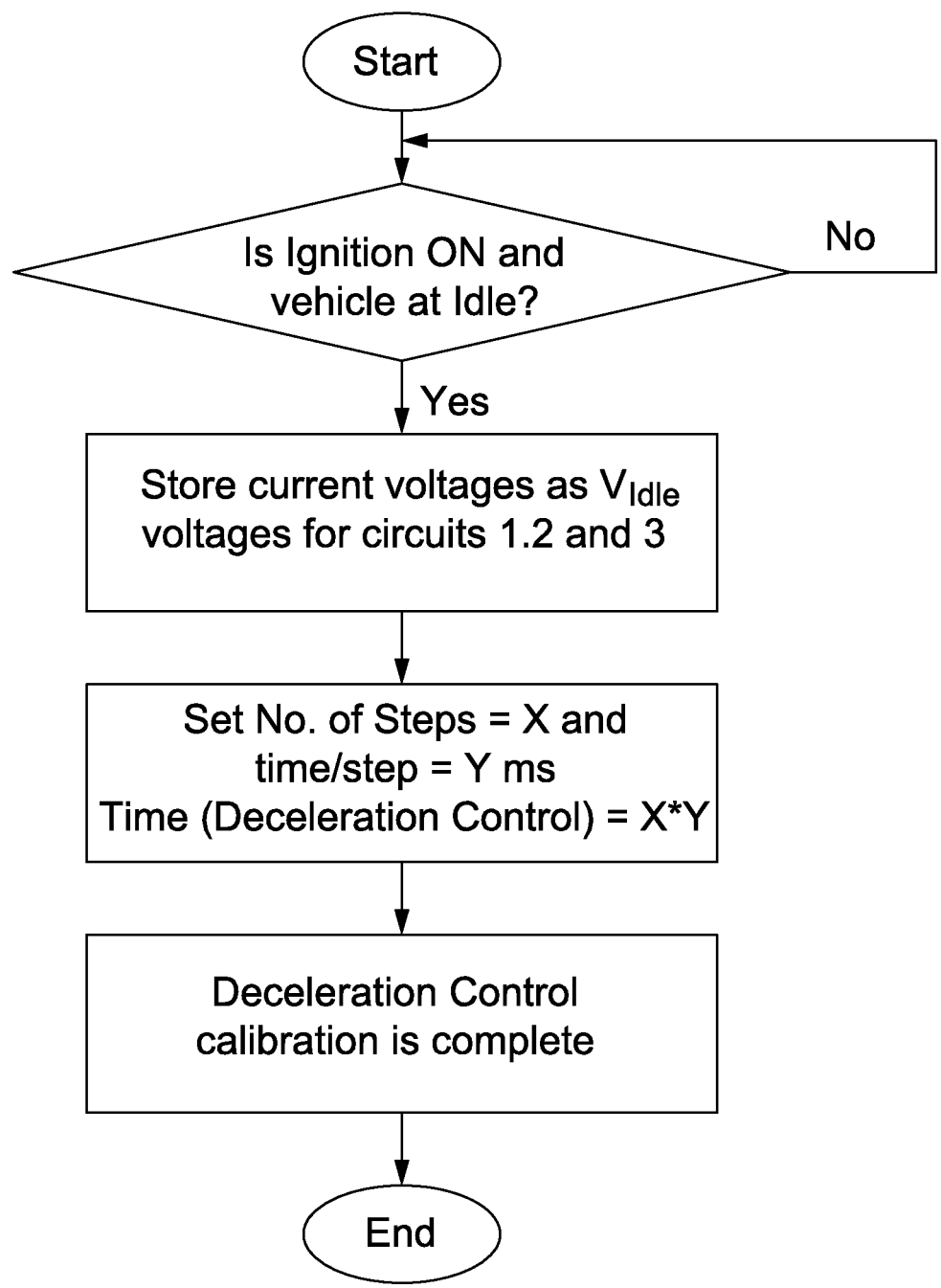
FIG. 36 a flow chart of calibrating a 3-circuit throttle control system for controlling vehicle deceleration.

The throttle control system 10 is in communication with the throttle controller 30 at the throttle input 11 for receiving the input voltage. The throttle controller 30 includes a pedal 32 connected with a throttle positioning system 34. The throttle positioning system 34 may include any suitable voltage sensor (e.g. potentiometric, inductive, magnetic, etc.). The throttle positioning system 34 is shown as a two-circuit throttle positioning system including a first throttle circuit 33 and a second throttle circuit 35, but may alternatively include any suitable throttle positioning system (e.g. three-circuit, single circuit with idle validation, etc.). FIGS. 34 to 36 show corresponding three-circuit examples for some functionality described below in the context of the two-circuit throttle positioning system 34. The throttle controller 30 is in communication with the throttle input 11 by a throttle control connection 36. The throttle control connection 36 includes any suitable number of individual connections for communicating voltages across the throttle positioning system 34 to the throttle input 11.

The processor 12 may execute instructions, with access the computer readable medium 14 as necessary, for causing the throttle control system 10 to lower the input voltage from the throttle controller 30. Lowering the input voltage from the throttle control and providing a lowered output voltage may slow the pace of acceleration and provide acceleration to a target voltage value in steps, or drop the output voltage to a lowered target voltage value in steps. A throttle control signal of output voltage to the ECM in accordance with the throttle control system 10 or other throttle control system embodiments that are upstream of the ECM are referenced in the description below description of throttle control system functionality as shown in the flow charts of FIGS. 3 to 7. However, the functions of throttle control systems upstream of the ECM that send the output voltage to the ECM as the throttle control signal may be similarly applied to throttle control systems resident on the ECM (such as the throttle control system 810 of FIG. 30). For a throttle control system integrated with the ECM, such as the throttle control system 810 of FIG. 30, corresponding instructions may be executed to modify the throttle control signal that would otherwise be sent from the integrated ECM 860 to the throttle 861.

In the throttle control system 10, the throttle control signal from the throttle output 13 is an output voltage to the ECM 60. The output voltage to the ECM 60 may be at the lowered voltage value for controlling acceleration, or controlling deceleration of the vehicle. For controlling acceleration, the input voltage and the output voltage may be calibrated to known idle and wide open throttle ("WOT") positions. For controlling deceleration, the input voltage and the output voltage may be calibrated to the idle throttle position.

Acceleration Control

Figure 3:
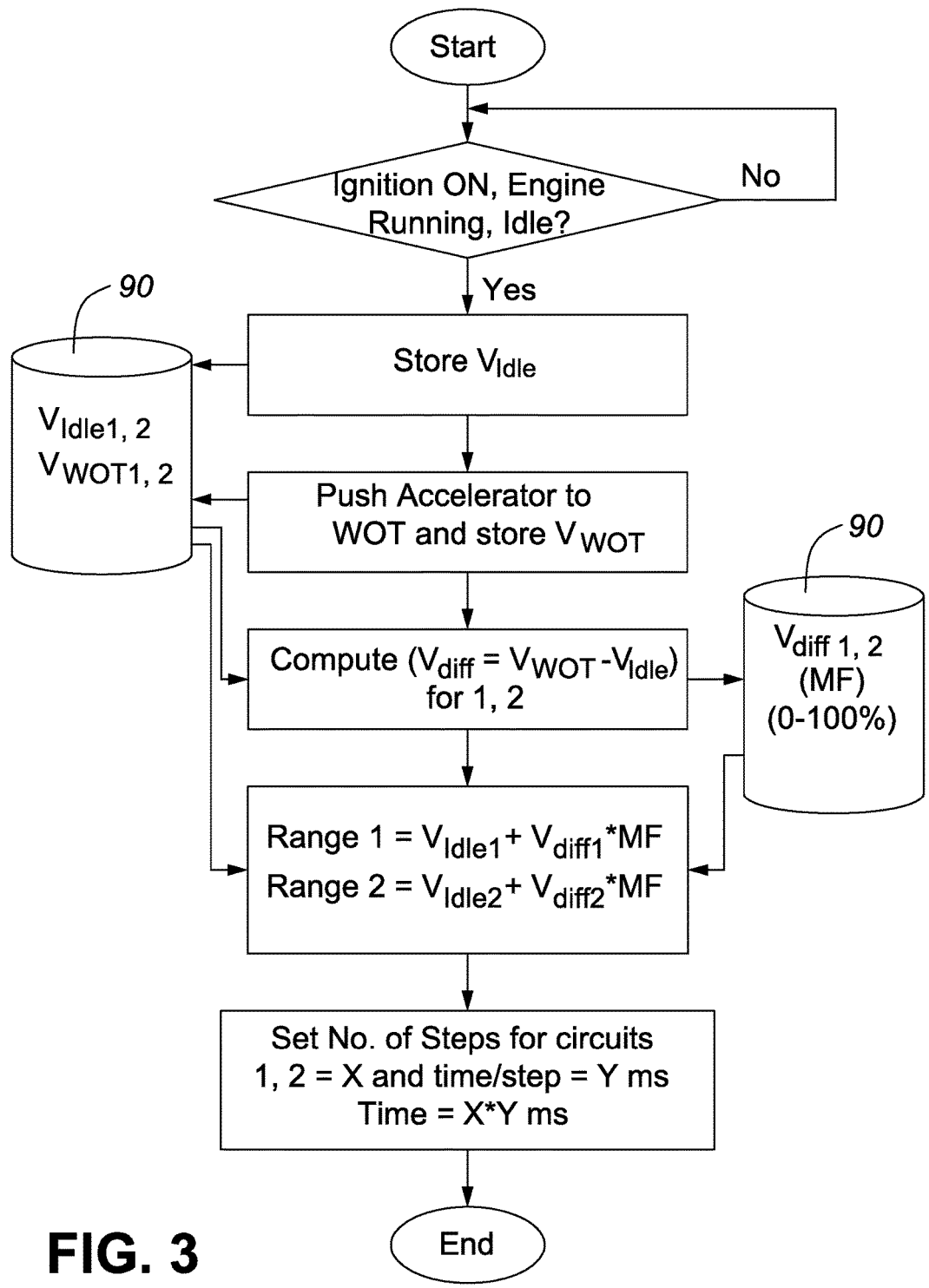
FIG. 3 is a flow chart of calibrating the throttle control system of FIG. 1 based on input voltage from a vehicle throttle.

FIG. 3 is a flow chart of a method of calibrating the throttle control system 10 for acceleration control. The vehicle engine is run with the throttle 61 at the idle position for a pre-set amount of time to ensure stability of the throttle position. The input voltage to the throttle control system 10 from the throttle controller 30 at idle ("$V_{Idle}$") is then detected and added to a calibration database 90 stored on the computer readable medium 14. The throttle positioning system 34 is used to locate the throttle 61 at the WOT position for a pre-set amount of time. The input voltage to the throttle control system 10 from the throttle controller 30 at the WOT position ("$V_{WOT}$") is detected and stored in the calibration database 90 on the computer readable medium 14.

In the two-circuit throttle control system 10, two different values of $V_{Idle}$ and $V_{WOT}$ are recorded. $V_{Idle1}$ and $V_{WOT1}$ are recorded from the first throttle circuit 33 and $V_{Idle2}$ and $V_{WOT2}$ are recorded from the second throttle circuit 35. Together, the recorded values of $V_{Idle}$ and $V_{WOT}$ are stored in the calibration database 90 on the computer readable medium 14 for access by the processor 12 in controlling the output voltage at the throttle output 13. FIG. 34 is a flow chart of a corresponding calibration method for a three-circuit throttle positioning system. The method in the flow chart of FIG. 34 includes recording $V_{Idle3}$ and $V_{WOT3}$.

Figure 4:
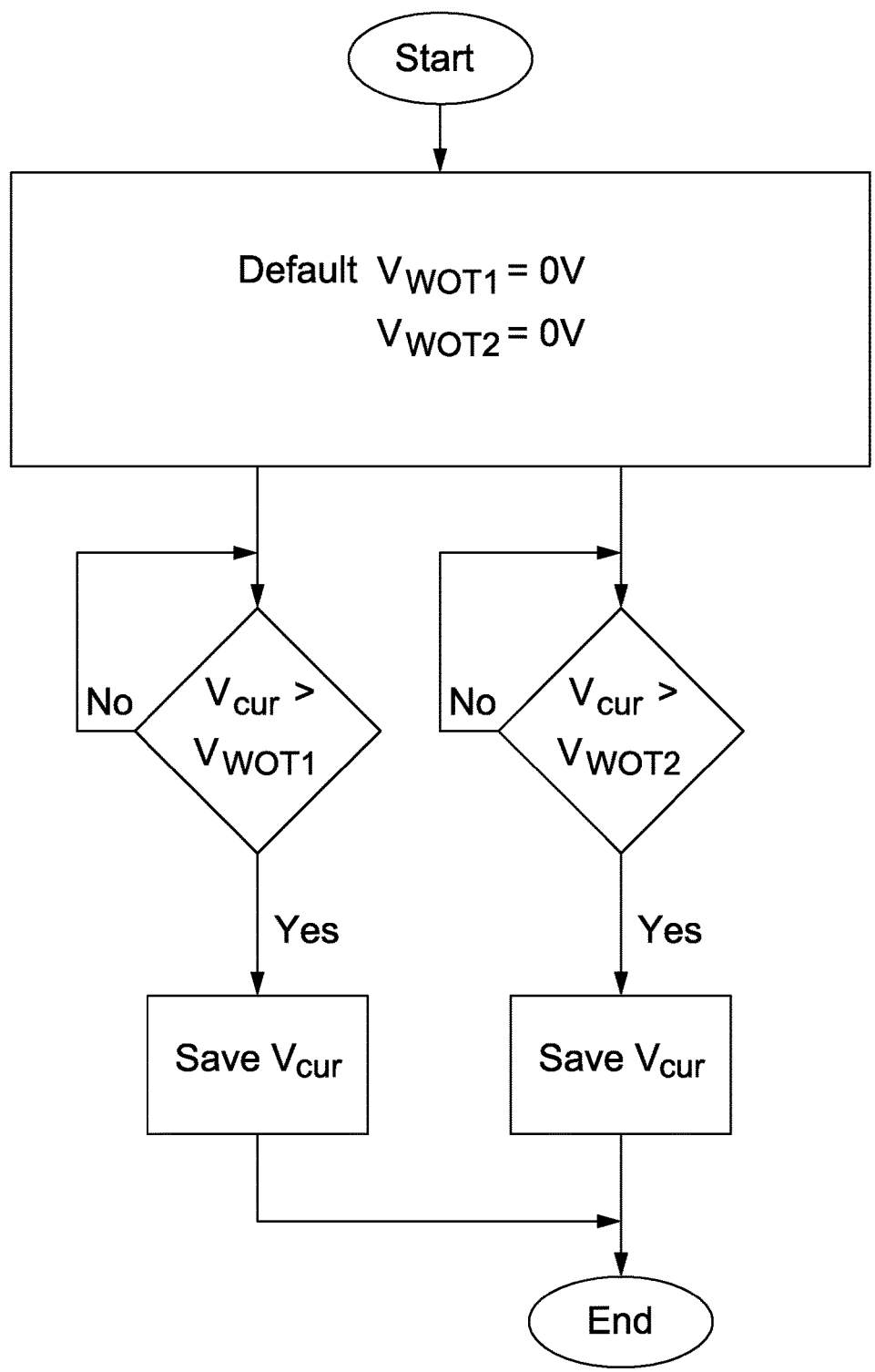
FIG. 4 is a flow chart of storing pedal voltages at a wide open throttle position during the calibration of the throttle control system of FIG. 1.

FIG. 4 is a flow chart of calibration of the $V_{WOT}$ values received by the throttle control system 10 as inputs from the throttle controller 30. Calibration of the $V_{WOT}$ values received by the throttle control system may be completed at the time of installation of the throttle control system 10. The default $V_{WOT}$ values for each of the first circuit 33 and the second circuit 35 are set at 0 V. When calibrating, the driver pushes down on the pedal to the maximum open position to read and store WOT voltages. The detected $V_{WOT}$ for each of the throttle pedal circuits ("$V_{cur}$" in FIG. 4) are compared to the default $V_{WOT1}$ and $V_{WOT2}$ values. If detected voltages exceed the default voltages, the greatest voltage values are stored as the $V_{WOT1}$ and $V_{WOT2}$ values. FIG. 35 is a flow chart of a corresponding calibration method for a three-circuit throttle positioning system. The method in the flow chart of FIG. 35 includes recording $V_{Cur}$ for the third throttle circuit and also recording $V_{WOT3}$.

Returning to FIG. 3, once all values of $V_{Idle}$ and $V_{WOT}$ are stored in the calibration database 90, the difference between $V_{Idle}$ and $V_{WOT}$ for each circuit is calculated and stored on the computer readable medium 14 in the calibration database 90 as $V_{diff}$. For the two-circuit throttle positioning system 34, the difference between $V_{Idle1}$ and $V_{WOT1}$ is $V_{diff1}$ and the difference between $V_{Idle2}$ and $V_{WOT2}$ is $V_{diff2}$.

The throttle control system 10 may apply acceleration control, providing a "feathered" acceleration that increases in steps, by limiting the output voltage from the throttle control system 10 to the ECM 60. The throttle control system 10 may limit the range of the output voltage to a percentage of the available $V_{diff}$ of each circuit by applying a multiplicative factor ("MF") to the output voltage from each of the first throttle circuit 33 and the second throttle circuit 35. The MF may be from 0 to 100%. The MF value may be stored in the calibration database 90 on the computer readable medium 14. The throttle control system 10 may apply acceleration control over a range of input voltage values for each circuit. Range 1, which applies to the first circuit 33, may be from $V_{Idle1}$ to $V_{Idle1}$ ($V_{diff1}$*MF). Range 2, which applies to the second circuit 35, may be from $V_{Idle2}$ to $V_{Idle2}$ ($V_{diff2}$*MF).

Within the range of input voltages from the throttle positioning system 34 defined as Range 1, acceleration control will limit the output voltage on the first circuit 33 to a maximum of $V_{Idle1}$ ($V_{diff1}$*MF), which defines a maximum threshold voltage value for the first circuit 33. Within the range of input voltages from the throttle positioning system 34 defined as Range 2, acceleration control will limit the output voltage on the second circuit 35 to a maximum of $V_{Idle2}$ ($V_{diff2}$*MF), which defines a maximum threshold voltage value for the second circuit 35. During acceleration control, the pace of acceleration is limited to a maximum voltage range value of $V_{Idle}$ ($V_{diff}$*MF) for each circuit will be defined by a number of steps, referred to as "X", and the time per step, referred to as "Y". The product of these two values, XY, may also be applied by the processor 12 as a time frame in which to return control over the throttle positioning system 34 to the driver once other criteria are met, such as defined values or ranges of vehicle speed, vehicle acceleration, input voltage, or other factors.

Example calibration values for the throttle control system 10 are shown in Table 1.

TABLE 1

Example calibration values of the throttle control system 10

| Circuit | $V_{Idle}$ | $V_{WOT}$ | $V_{Diff}$ | MF | $V_{Diff}$* MF | $V_{Idle}$ + ($V_{Diff}$* MF) |
|---|---|---|---|---|---|---|
| First 33 | 0.5 | 1.5 | 1.0 | 33% | 0.33 | 0.83 |
| Second 35 | 1.1 | 3.9 | 2.8 | 33% | 0.924 | 2.024 |

In the example of Table 1, Range 1, which applies to the first circuit 33, applies to input voltages of from 0.5 V to 0.83 V. Range 2, which applies to the second circuit 35, applies to input voltages of from 1.1 V to 2.024 V. The first throttle circuit 33 and the second throttle circuit 35 are in sync and will reach relative points in their respective voltage ranges at the same time. As a result, subject to signal drift and recalibration, the difference between $V_{Idle2}$ and $V_{Idle1}$ will be maintained and the difference between $V_{WOT2}$ and $V_{WOT1}$ will be maintained. For the example shown in Table 1, the difference between $V_{Idle2}$ and $V_{Idle1}$ is 1.1–0.5=0.6 V. The difference between $V_{WOT2}$ and $V_{WOT1}$ is 3.9–1.5=2.4 V.

The time period XY is the time period over which to reach the maximum voltage range values of $V_{Idle}$ ($V_{diff}$*MF) for each circuit. The time period XY may also be the time period in which to return throttle control to the driver as described below with reference to FIG. 5. An example application may have values of X=60 steps and Y=50 ms. In this case, the time for returning throttle control to the driver, XY=60*50 ms=3000 ms=3 s. The speed and smoothness of throttle pedal return may be adjusted by modifying X, Y, or both. The above example and additional examples of X and Y values, are provided in Table 2.

TABLE 2

Example values of X and Y, and resultant time periods XY

| X | Y (ms) | XY (s) |
|---|---|---|
| 5 | 20 | 0.1 |
| 40 | 20 | 0.8 |
| 50 | 30 | 1.5 |
| 60 | 40 | 2.4 |
| 60 | 50 | 3.0 |
| 70 | 50 | 3.5 |
| 100 | 50 | 5.0 |

Figure 5:
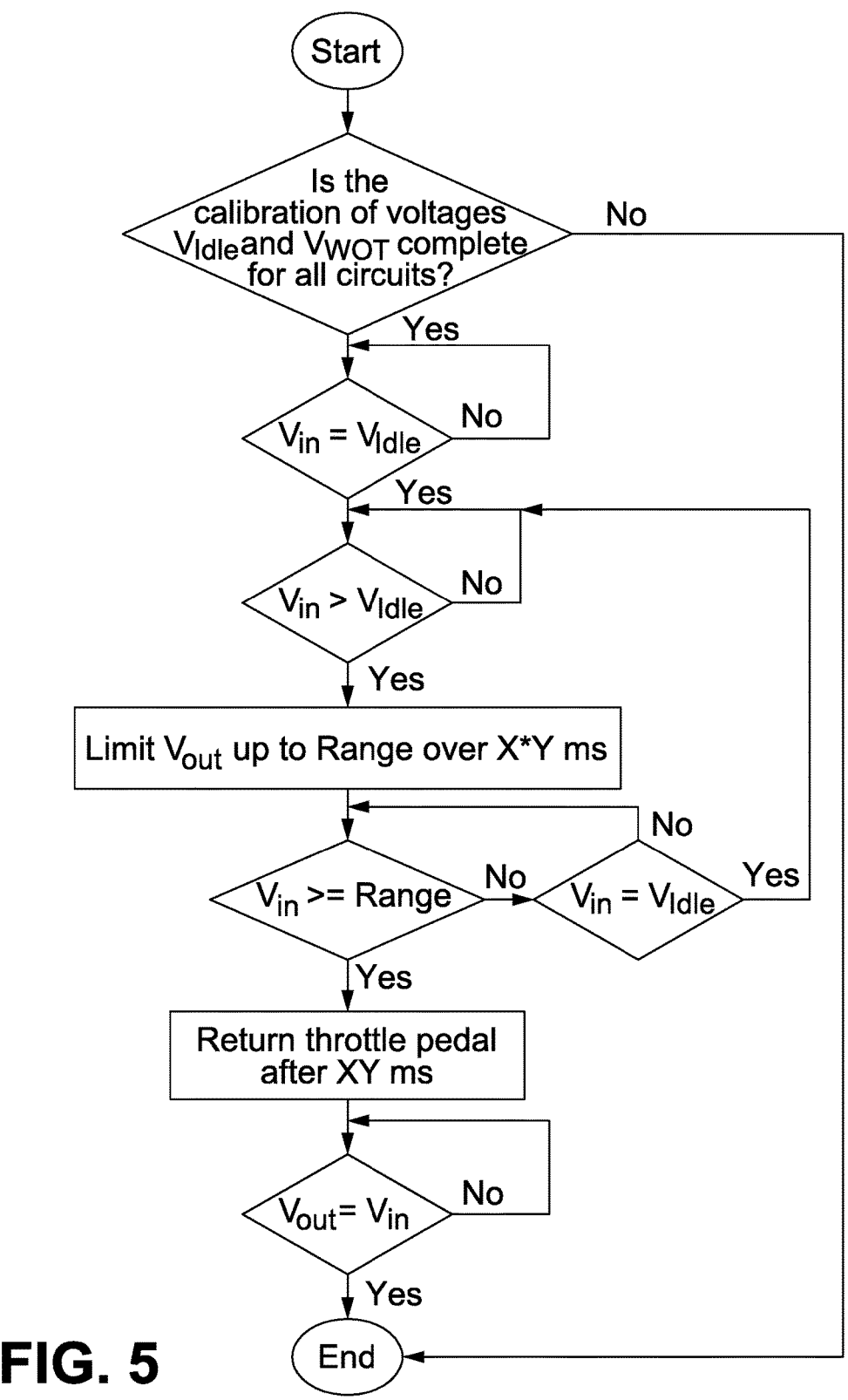
FIG. 5 is a flow chart of controlling vehicle acceleration with the system of FIG. 1.

FIG. 5 is a flow chart of a method of acceleration control by the throttle control system 10. The processor 12 confirms that $V_{Idle}$ and $V_{WOT}$ are calibrated for each circuit in the throttle positioning system 34. Calibration of $V_{Idle}$ and $V_{WOT}$ may be as shown in FIG. 3. If the $V_{Idle}$ and $V_{WOT}$ values are not calibrated, acceleration control is not available and the program ends. If the $V_{Idle}$ and $V_{WOT}$ values are calibrated, the throttle control system 10 monitors the input voltage to confirm that the input voltage is equal to a baseline input voltage, which is the lower value in each of the two ranges, Range 1 and Range 2, defined for the first and second circuits 33, 35. In the acceleration control method of FIG. 5, the baseline voltage input value as shown is $V_{Idle}$. However, other values may be used for acceleration control in situations other than from $V_{Idle}$. For example, acceleration may be controlled at voltage values above $V_{Idle}$ corresponding to defined speed ranges. In such cases, the output voltage may be lowered to a lesser extent relative to the input voltage at greater speeds to facilitate passing or avoiding danger while travelling at highway speeds.

When the input voltage ("$V_{in}$" in FIG. 5 and other figures) on each of the first and second circuits 33, 35 increases from the respective $V_{Idle}$ baseline input voltage values, acceleration control may be applied by the throttle control system 10 depending on the input voltage. During acceleration control, the output voltage ("$V_{out}$" in some figures) to the ECM 60 is limited to the output voltage that would otherwise follow from input voltages within Range 1 and Range 2 as defined for each of the first and second circuits 33, 35 in the calibration of FIG. 3. If the input voltage is below the maximum threshold voltage value of $V_{Idle}+(V_{diff}*MF)$ for each circuit, then the throttle controller 30 functions normally in response to driver input on the throttle positioning system 34.

If the input voltage following the baseline input voltage value of $V_{Idle}$ exceeds the maximum threshold voltage value of $V_{Idle}+(V_{diff}MF)$ within XY ms of the input voltage values being equal to $V_{Idle}$, acceleration is control is applied by the throttle control system 10. During acceleration control, the output voltage for each of the first and second circuits 33, 35 provided from the throttle control system 10 to the ECM 60 is increased from $V_{Idle}$ to $V_{Idle}+(V_{diff}*MF)$ in X steps of Y ms each. After XY ms, the throttle control system 10 confirms whether the input voltage is greater to or equal than the Range 1 and Range 2 values. If the input voltage remains over the Range 1 and Range 2 values, driver control over the throttle positioning system 34 may be returned in a time period of XY.

After driver control over the throttle positioning system 34 is restored, the input voltage is equal to the output voltage and acceleration control will cease until the input voltage is again equal to $V_{Idle}$ followed by a value greater than $V_{Idle}$. Acceleration control may be enabled or disabled by adjusting a programmable parameter on board the throttle control system 10, for example during installation of the throttle control system 10 or by remotely sending a packet to a throttle control system through a data service (e.g. the internet service 792 of the throttle control system 710 in FIG. 24.

Deceleration Control

Figure 6:
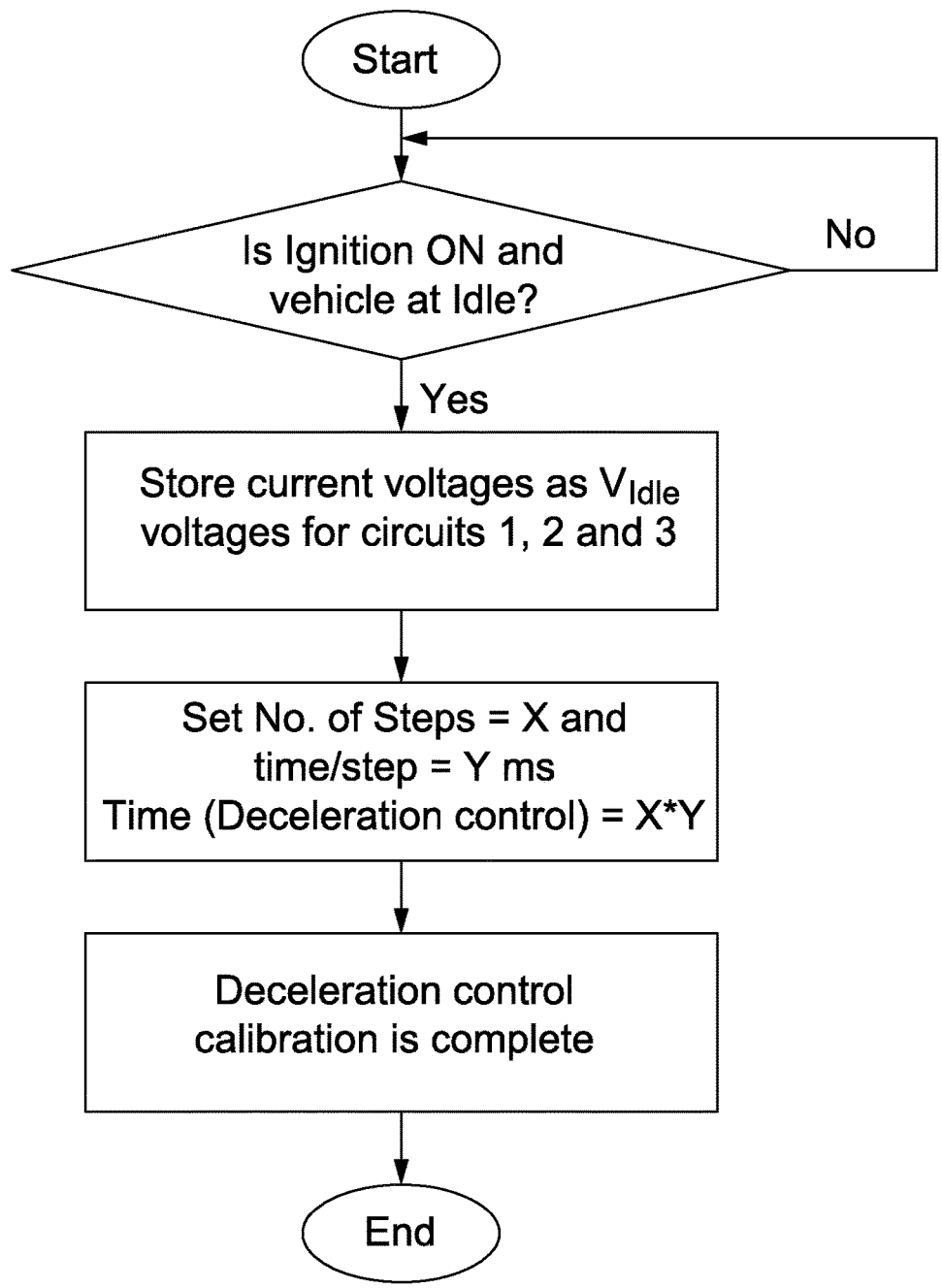
FIG. 6 is a flow chart of calibrating the throttle control system of FIG. 1 for controlling vehicle deceleration.

FIG. 6 is a flow chart of a calibration method for deceleration control. The vehicle engine is run with the throttle at the idle position for a pre-set amount of time to ensure stability of the throttle position. $V_{Idle}$ is then detected and stored in the calibration database 90 on the computer readable medium 14. The values of X and Y are set, which determine the timeline over which control is returned to the driver once deceleration control is activated, similarly to the X and Y values described in relation to the calibration method for acceleration control in FIG. 3. Calibration for deceleration control does not include calibration of $V_{WOT}$, unlike the calibration for acceleration control shown in FIG. 3.

Figure 7:
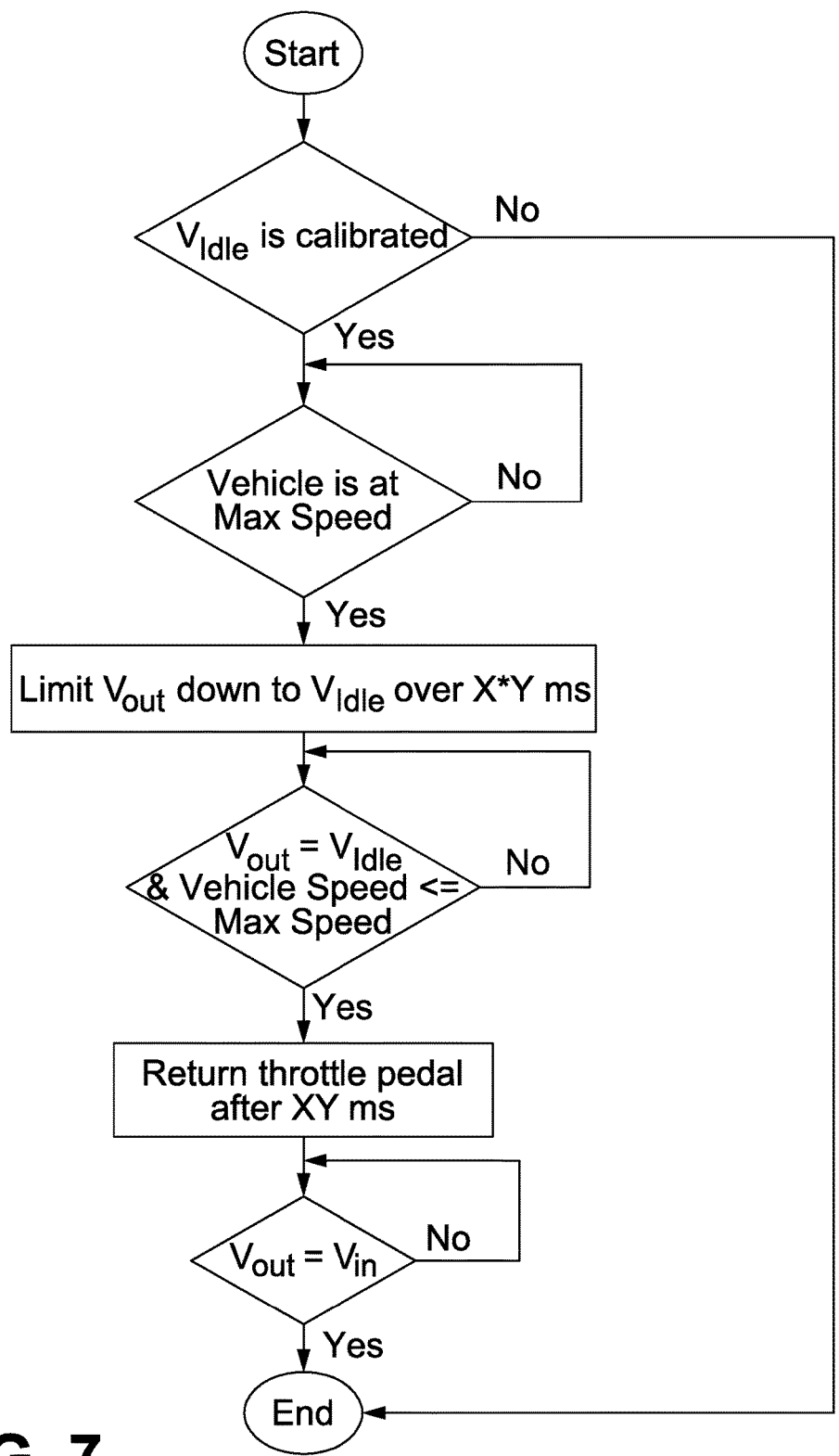
FIG. 7 is a flow chart of controlling vehicle deceleration with the system of FIG. 1.

FIG. 7 is a flow chart of a deceleration control method applied by the throttle control system 10 in response to a speed input indicating that the vehicle is travelling at a speed equal to or greater than a maximum speed threshold value. The processor 12 checks whether the $V_{Idle}$ values are calibrated for each circuit of the throttle positioning system 34. If the $V_{Idle}$ values are not calibrated, deceleration control is not available and the program ends. If the $V_{Idle}$ values are calibrated, the throttle control system will limit the output voltage to the ECM 60 in response to the speed data input from the speed data source 50 indicating that the vehicle is at or above a maximum speed threshold value ("Max Speed" in FIG. 7 and other figures is a reference to the maximum speed threshold value). The maximum speed threshold value may be stored on the computer readable medium 14. Multiple maximum speed threshold values may be stored on the computer readable medium. The processor 12 may include instructions encoded thereon to access different maximum speed threshold values depending on the location of the vehicle as determined from the location data source 40.

If an input of speed data received from the speed data source 50 at the speed data input 06 indicates that the vehicle is travelling at the maximum speed threshold value, the output voltages to the ECM 60 are limited over a time period XY. During the time period XY, the output voltages are lowered to the calibrated $V_{Idle}$ values for each circuit of the throttle positioning system 34. The input voltage observed from the respective throttle circuit when the speed input indicative of the maximum speed threshold value is the voltage at which limiting of the throttle control signal began and is referred to as "$V_{LIM}$" below and in some figures. The output voltages are lowered from $V_{LIM}$ to $V_{Idle}$ in X steps of Y ms duration each. After the output voltage is equal to $V_{Idle}$ and the vehicle speed is detected at or below the maximum speed threshold value, user control over the throttle positioning system 34 may be returned in a time period of XY. Once the input and output voltages match, deceleration control will cease until a speed data input indicating that the vehicle is at the maximum speed threshold value is again received by the throttle control system 10.

Deceleration forces the throttle positioning system 34 from its position at the maximum speed threshold value, providing $V_{LIM}$, to the position at which $V_{Idle}$ occurs on each circuit. The change in throttle position occurs in X steps of Y ms duration each. The stepped or "feathered" deceleration provides smooth removal from the driver of control over the pedal 32, mitigating jerkiness during deceleration control. The stepped deceleration may mitigate disruption to the drivability of the vehicle and other aspects of the driver's experience, mitigate driver stress, and prevent jerkiness when the throttle control system 10 forces deceleration to the maximum speed threshold value and the throttle position to the $V_{Idle}$ position.

Satellite Data Receiver

Figure 8:
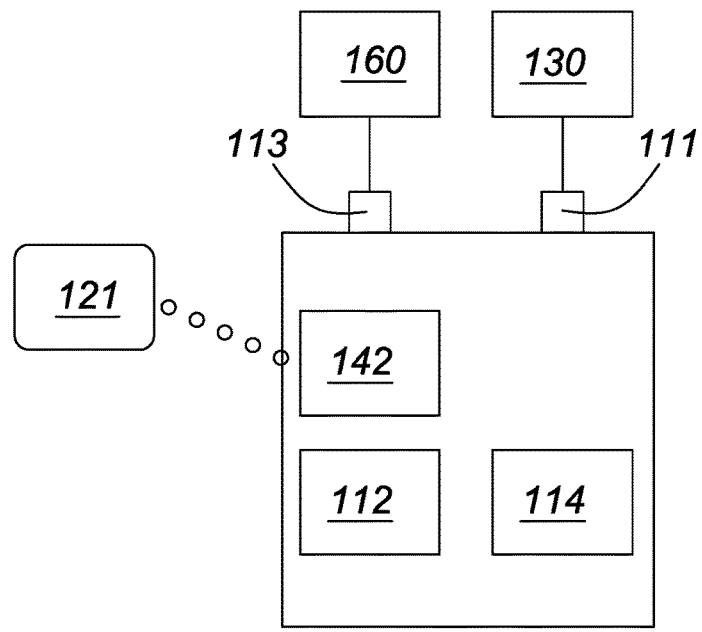
FIG. 8 is a throttle control system that includes a satellite data receiver.

FIG. 8 is a schematic of a throttle control system 110 that includes a satellite data receiver 142 connected with the processor 112. The satellite data receiver 142 may receive satellite data from a satellite service 121. The satellite data may include speed data, location data, heading data, or other information. The satellite data receiver 142 may follow any appropriate protocol for through a satellite-based navigation device (e.g. GPS, SATNAV, A-SATNAV, S-SATNAV, GLONASS, COMPASS, GALILEO, BeiDou-2, Quasi-Zenith Satellite System, etc.).

In the throttle control system 110, the satellite data receiver 142 provides both the location data and the speed data to the processor 112. In providing the satellite data, the satellite service 121 may serve as the location data source 40 and the speed data source 50 as described above in relation to the system 10. The satellite data receiver 142 may function as the vehicle location data input 08, and the vehicle speed data input 06 as described above in relation to the system 10. The satellite service 121 and the satellite data receiver 142 are provide location data and speed data for the throttle control system 110. As shown below, other sources of location data, speed data, or both, in addition to a satellite data receiver, may be added to a throttle control system.

A terrestrial beacon system (not shown) may be in communication with the satellite data receiver 142 or with a similar receiver for providing location data, speed data, or both, to the throttle control system similarly to the satellite service 121 with the signal originating from a land-based beacon. Such systems may be applied in urban canyons or other locations where assisted navigation is complicated by a lack of reception to satellite or other data signals.

Figure 9:
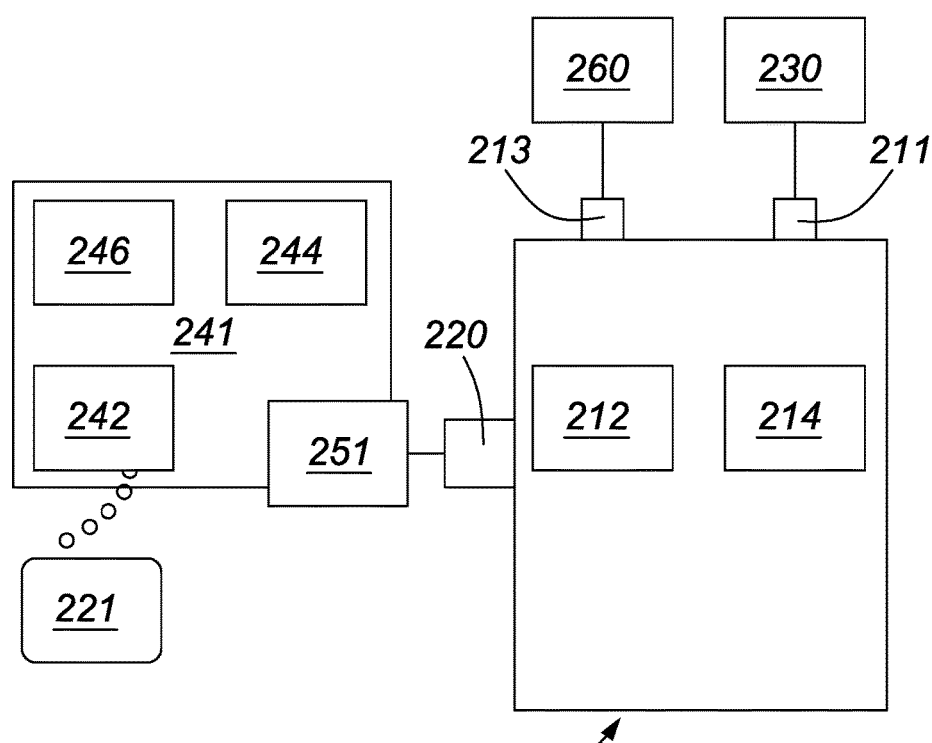
FIG. 9 is a schematic of a throttle control system with a separate satellite-based tracking module.

FIG. 9 is a schematic of a throttle control system 210 including a satellite-based tracking module ("STM") 241 with an onboard STM processor 244 and STM computer readable medium 246. The STM 241 may be included as part of the throttle control system 210 as a component in a stand-alone throttle control system 210. Alternatively, the STM 241 may be a vehicle component or a satellite-enabled mobile device that is in communication with the other components of the throttle control system 210. The processor 212 is in communication with the STM 241 through a communication port 220. The communication port 220 allows data to be exchanged in both directions between the processor 212 and the STM 241. The data received at the communication port 220 may include satellite data from the STM 241. The satellite data may be applied by the processor 212 to calculate the output voltage to the ECM 260. The satellite data may include vehicle speed data, vehicle location data, vehicle heading data, or both.

The STM 241 includes the satellite data receiver 242 in communication with the STM processor 244. The STM processor 244 is also in communication with the STM computer readable medium 246. The satellite data receiver 242 receives the satellite data and communicates the satellite data to the STM processor 244, passes the satellite through to an STM communication port 251, or both. The STM communication port 251 is in communication with the communication port 220 for providing the satellite data directly to the throttle control system 210 and for receiving data, commands, or both from the throttle control system 210. Communications exchanged between the STM communication port 251 and the communication port 220 may be encrypted (e.g. by hexadecimal encryption, etc.).

The STM processor 244 may receive raw satellite data from the satellite data receiver 242, process the raw satellite data to processed satellite data, and pass on the processed satellite data to the processor 212. Processing the raw satellite data may be completed with reference to data stored on the STM computer readable medium 246 as necessary. When processing the raw satellite data, the STM processor 244 applies rules encoded on the STM processor 244 with reference to data stored on the STM computer readable medium 246 as necessary. The rules are applied with reference to the raw satellite data. Similarly, the processor 212 may apply calculations to either the processed satellite data, the raw satellite data, or both, based on rules encoded on the processor 212 with reference to data stored on the computer readable medium 214 as necessary. Based on the outcome of application of the rules to the raw satellite data, the processed satellite data, or both, by the processor 212, the processor 244, or both, the processor 212 may step down the input voltage received at the throttle controller input 211 for providing the output voltage at the target voltage to the ECM 260 at the throttle output 213. The maximum speed threshold value, the maximum voltage threshold value, or both, may be stored on the computer readable medium 214, the STM computer readable medium 246, or both.

Throttle Control with Reference to STM Trigger Signals

Figure 10:
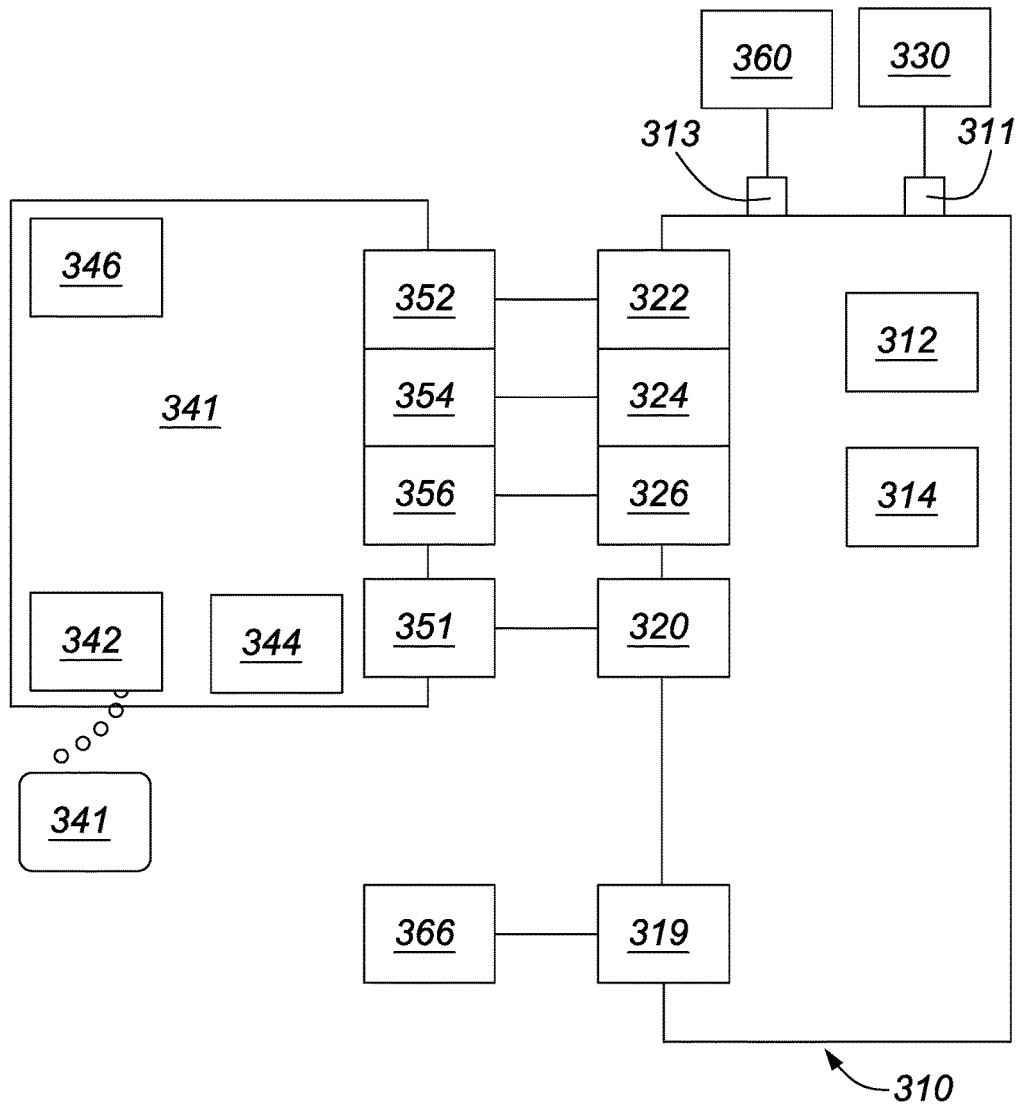
FIG. 10 is a schematic of a throttle control system with a separate satellite-based tracking module and trigger-based signaling.

FIG. 10 is a schematic of a throttle control system 310. The throttle control system 310 is in communication with the STM 341 through the communication port 320 and through analog trigger inputs 322, 324, and 326. The analog trigger inputs in the throttle control system 310 include a cruise trigger input 322, a limiter trigger input 324, and a calibration trigger input 326. The STM 341 may send an analog trigger signal to one or more of the cruise trigger input 322, the limiter trigger input 324, and the calibration trigger input 326 based on the outcome of processing satellite data by the STM 341 at the STM processor 344, or based on other data received by the STM 341 from the processor 312 at the STM communication port 351. While the trigger outputs 352, 354, and 356 are exemplified as analog trigger outputs, other open collector outputs or other trigger signal outputs may be applied in other examples of a throttle control system having a separate STM that communicates with the processor by trigger outputs.

The analog trigger inputs 322, 324, and 326 each allow a trigger signal to be provided to the throttle control system 310 from the STM 341. Each trigger signal is applied by the processor 312 for modulating the input voltage to an output voltage having a target voltage value or other actions. The target voltage value corresponds to the conditions indicated by the trigger signal as defined by instructions on the processor 312 and data in the computer readable medium 314. In the throttle control system 310, three analog trigger inputs are shown, although other numbers of analog trigger inputs may be applied with changes to how the analog trigger inputs are processed by the processor 312. Alternatively, the STM processor 344 may send digital control or other signals to the processor 312 through the STM communication port 351. Examples provided below with reference to the throttle control system 310 or the throttle control system 410 that apply trigger signals to provide a given effect based on instructions on the STM processor 344 may also be carried out based on other signals provided to the processor 312 following execution of similar instructions on the STM processor 344, such as through the STM communication port 351 and the communication port 320.

The throttle control system 310 is in communication with a vehicle cruise control module 366 at a cruise control relay 319. The processor 312 may be configured and adapted to disable the cruise control module 366 by sending an interrupt signal to the cruise control module 366 through the cruise control relay 319. When the interrupt signal from the cruise control relay 319 is received by the cruise control module 366, driver control of the cruise control module 366 may be removed.

The STM processor 344 may apply rules encoded on the STM processor 344, with reference to the STM computer readable medium as necessary, to the raw satellite data received at the satellite data receiver 342. Based on the outcome of application of the rules to the raw satellite data, the STM processor 344 may cause the STM 341 to output satellite data through the STM communication port 351, send a cruise trigger signal through the cruise trigger output 352, send a limiter trigger signal through the limiter trigger output 354, send a calibration trigger signal through the calibration trigger output 356, or a combination thereof. The cruise trigger output 352, the limiter trigger output 354, and the calibration trigger output 356 are respectively in communication with the cruise trigger input 322, the limiter trigger input 324, and the calibration trigger input 326 for providing the trigger signals to the processor 312.

The processor 312 may be controlled by analog signals received from the STM 341 at the cruise trigger input 322, the limiter trigger input 324, the calibration trigger input 326, or a combination thereof. As described above, the STM processor 344 causes one or more of the cruise trigger output 352, the limiter trigger output 354, and the calibration trigger output 356 to send a trigger signal to the processor 312 based on the outcome of processing.

Table 3 is a truth table showing the possible combinations of analog trigger inputs from to the cruise trigger input 322, the limiter trigger input 324, and the calibration trigger input 326 from the cruise trigger output 352, the limiter trigger output 354, and the calibration trigger output 356, respectively. Each of trigger states A to F are used in the example throttle control system 310. Trigger states G and H are not assigned functions in the throttle control system 310, but functions could be assigned to these trigger states.

TABLE 3

Truth table of trigger inputs to the throttle control system 310 from the STM 341

| | Trigger State | | | | | | | |
|---|---|---|---|---|---|---|---|---|
| Trigger | A | B | C | D | E | F | G | H |
| Calibrate (26/56) | 0 | 0 | 0 | 0 | 1 | 1 | 1 | 1 |
| Cruise (22/52) | 0 | 0 | 1 | 1 | 0 | 0 | 1 | 1 |
| Limiter (24/54) | 0 | 1 | 0 | 1 | 0 | 1 | 0 | 1 |

Trigger state A corresponds to no input to the processor 312 from the STM 341. Trigger state A does not result in any particular action by the processor 312.

Trigger state B corresponds to the limiter trigger input 324 being triggered. In response to trigger state B, the processor 312 removes driver control over the throttle controller 330 and the throttle control system 310 applies deceleration control. As in the method of FIG. 7, trigger state B will remain on until XY seconds have passed after $V_{out}=V_{Idle}$ and the vehicle speed is below the maximum speed threshold value.

Trigger state C corresponds to the cruise trigger input 322 being triggered. The STM Processor 344 sends the outputs to the cruise trigger output 352 in response to a loss of signal reception at the satellite data receiver 342. Additional detail on the STM processor 344 logic leading to trigger state C is provided below with reference to FIG. 11.

Trigger state D corresponds to the cruise trigger input 322 and the limiter trigger input 324 being triggered, which results in cruise control being disabled as in trigger state C. In addition, deceleration control is applied as in trigger state B.

Trigger state E corresponds to the calibration trigger input 326 being triggered. The STM processor 344 activates trigger state E as described below with reference to FIG. 13. In response to trigger state E, the throttle control system 310 calibrates $V_{Idle}$ as described above with reference to FIG. 13.

Trigger State F corresponds to the limiter trigger input 324 and the calibration trigger input 326 being triggered. Trigger state F accesses pulse data from a VSS and is further described below with reference to FIGS. 12 to 14, which describe a throttle control system 410 that is in communication with a VSS 462. Briefly, as further described below, the STM processor 444 causes trigger state F based on vehicle speed derived from satellite data received at the satellite data receiver 442. In response to trigger state F, the processor 412 calibrates pulse data from the VSS 462 to the maximum speed threshold value as described below with reference to FIG. 13, and removes driver control over the throttle controller 430 and applies deceleration control.

Trigger State G corresponds to the cruise trigger input 322 and the calibration trigger input 326 being triggered. Trigger state H corresponds to each of the cruise trigger input 322, the limiter trigger input 324, and the calibration trigger input 326 being triggered. Neither trigger state G nor trigger state H plays a role in the example throttle control system 310, although functionality could be assigned to either or both of trigger states G or H by including the appropriate instructions on the STM processor 344 and corresponding instructions on the processor 312.

The STM processor 344 computes vehicle speed and location data based on the raw satellite data from the satellite data receiver 342. When the speed of the vehicle as monitored reaches a value equal to or greater than the set maximum speed threshold value, the STM processor 344 may cause the STM 341 to deliver one or more outputs at the cruise trigger output 352, the limiter trigger output 354, and the calibration trigger output 356 as described above with reference to Table 3 (with trigger states B, D, and F each resulting from conditions including detection of a vehicle speed at or above the maximum speed threshold value).

Upon receiving one of the analog trigger signals described above in Table 3, the processor 312 controls vehicle speed by deceleration control, recalibrates $V_{Idle}$, recalibrates the pulse data against maximum vehicle speed (where the VSS data is available, such as in the throttle control system 410), disables cruise control, or any combination as described above with reference to Table 3. When deceleration control is applied, it may be to the most recently calibrated values for $V_{Idle}$, maximum speed threshold value based on pulse data, or any other defined speed threshold. The values for $V_{Idle}$, maximum speed threshold value based on pulse data, and other pulse data in the speed table are stored on the computer readable medium 314, the STM computer readable medium 346, or both (or the corresponding features of the throttle control system 410 with respect to pulse data).

As a result of this loss of acceleration during deceleration control, vehicle speed drops. When vehicle speed drops below the maximum speed threshold value set on the STM 341, the STM processor 344 stops providing the trigger output to the limiter trigger output 354. When the processor 321 stops receiving a trigger at the limiter trigger input 324, control may be provided back to the driver in a controlled manner over a time period of XY as described above with reference to FIGS. 3, 6, and 7.

The throttle control system 310 is in communication with the cruise control module 366 at the cruise control relay 319. Trigger states C, D, and E include a cruise trigger that may be provided by the STM 341 to the processor 312 at the cruise trigger output 352, and other trigger outputs for trigger states D and E. The processor 312 receives the trigger signal at the cruise trigger input 322 and at other trigger inputs for trigger states D and E. When the cruise trigger is received at the cruise trigger input 322, the cruise kick out relay 319 changes state (e.g. a normally closed cruise kick out relay may be opened, etc.). The change in state of the cruise kick out relay 319 disables the cruise control module 366. Each of trigger states C and D results in disabling cruise control.

Figure 11:
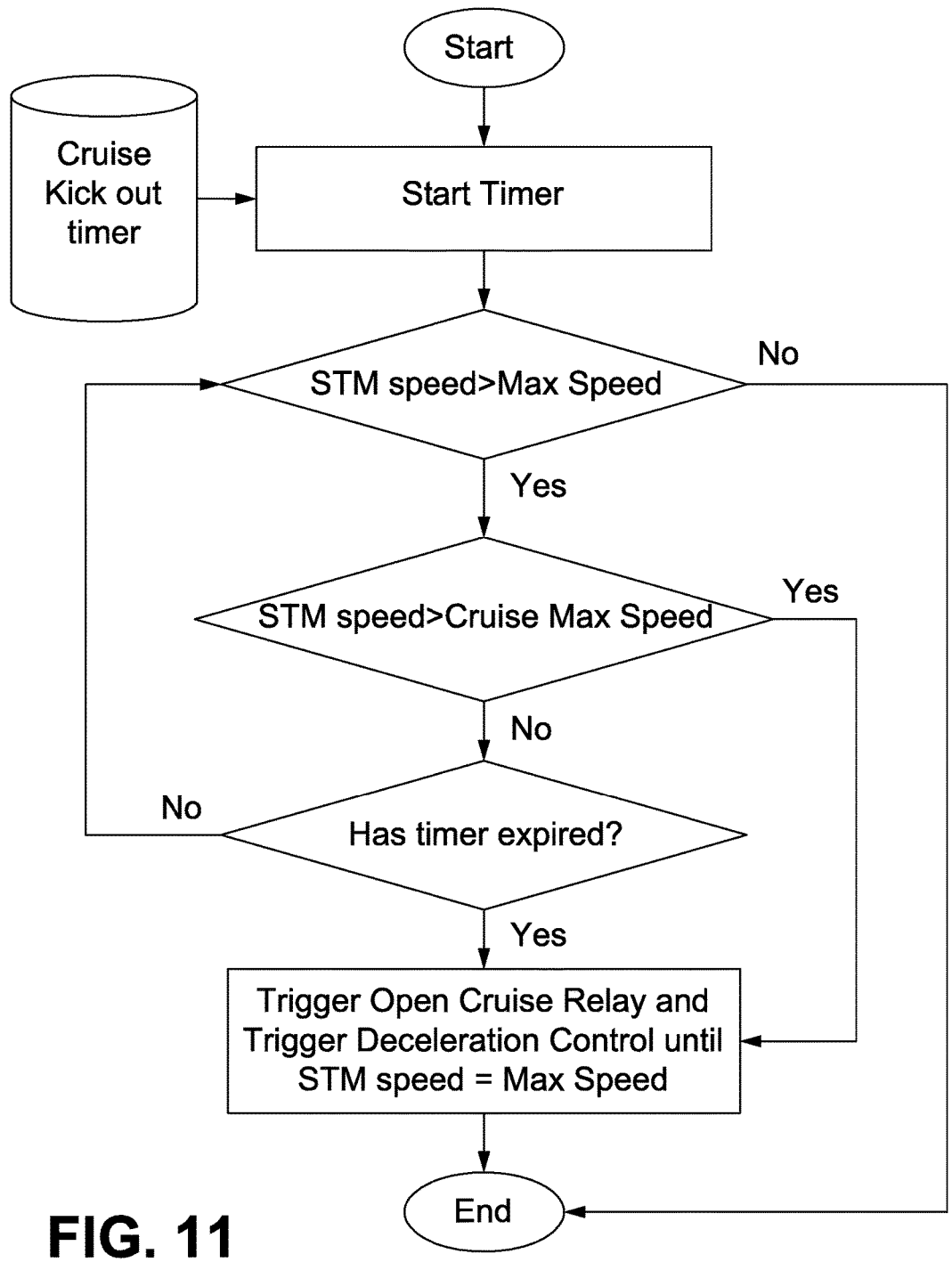
FIG. 11 is a flow chart of disabling cruise control as part of controlled deceleration.

FIG. 11 is a flow chart of a method executed on the STM processor 344 for determining when to output the cruise trigger from the cruise trigger output 352. If the vehicle cruise control module 366 is set at a speed value at or above the maximum speed threshold value for a defined cruise kickout time period, the STM 341 sends the cruise trigger from the cruise trigger output 352. The logic executed by the STM processor 344 for determining when to send the cruise trigger from the cruise trigger output 352 includes inputs of vehicle speed and a timer duration. The timer duration may be between about 5 and about 15 seconds, for example about 10 seconds. The method of FIG. 11 may mitigate or prevent driver circumvention of the maximum speed threshold value by increasing a speed setting cruise control module 366 above the maximum speed threshold value. In addition, if the maximum speed threshold value changes while the vehicle is operating under cruise control (e.g. upon crossing a geofence, following a change in posted speed limit, etc.), the method of FIG. 11 may provide the driver with a chance to lower the vehicle speed manually from the speed set with the vehicle cruise control module 366 before deceleration control begins.

In FIG. 11, the vehicle speed exceeds the maximum speed threshold value, for example 100 km/h, and the vehicle is travelling at a speed above the maximum speed threshold value, for example 110 km/h, using the cruise control module 366 set at a speed having a maximum cruise control speed threshold value. Once the maximum speed threshold value is exceeded, the STM processor 344 begins counting down from a set value to zero, providing a timer. If the vehicle speed drops below the maximum speed threshold value before the timer reaches zero, the timer is cleared and reset. If the vehicle speed exceeds the maximum cruise control speed threshold value, which is greater than the maximum speed threshold value, trigger signals are sent from both the cruise trigger output 352 and the limiter trigger output 354. Similarly, if the timer reaches zero, meaning the vehicle speed remains at or above the maximum speed threshold value, trigger signals are sent from both the cruise trigger output 352 and the limiter trigger output 354.

In trigger state D, in addition to the trigger signal from the cruise trigger output 352, the processor causes the trigger signal to be sent from the limiter trigger output 354. In response to the trigger signal input at the limiter trigger input 324, the throttle control system 310 may control deceleration. The driver cannot use the cruise control module 366 to increase the speed of the vehicle and the speed of vehicle is lowered. When the vehicle speed reduces to equal or below the maximum speed threshold value, the STM 341 withdraws the signal trigger from the cruise trigger output 352 and from the limiter trigger output 354. When the throttle control system 310 stops receiving the trigger signals at the cruise trigger input 322 and the limiter trigger input 324, driver control of the cruise control module 366 and the throttle pedal 332 is resumed.

Recalibration

With reference to FIG. 2, vehicle sensors on the throttle pedal 32 and the throttle positioning system 34 may deteriorate separately at different rates, potentially resulting in signal errors. An actuator attached to the throttle 61 may also fail, resulting in information being conveyed to the ECM 60 that may result in the engine going into fail-safe, causing the vehicle to stall when idling or during the process of stopping. To ensure that the throttle control system 10 remains in sync with wear or otherwise gradual deterioration of sensors on the throttle, throttle pedal 32, the throttle positioning system 34, other components of the throttle controller 30, or other relevant components of the vehicle, the throttle control system 10 may include a function to recalibrate over time.

Figure 12:
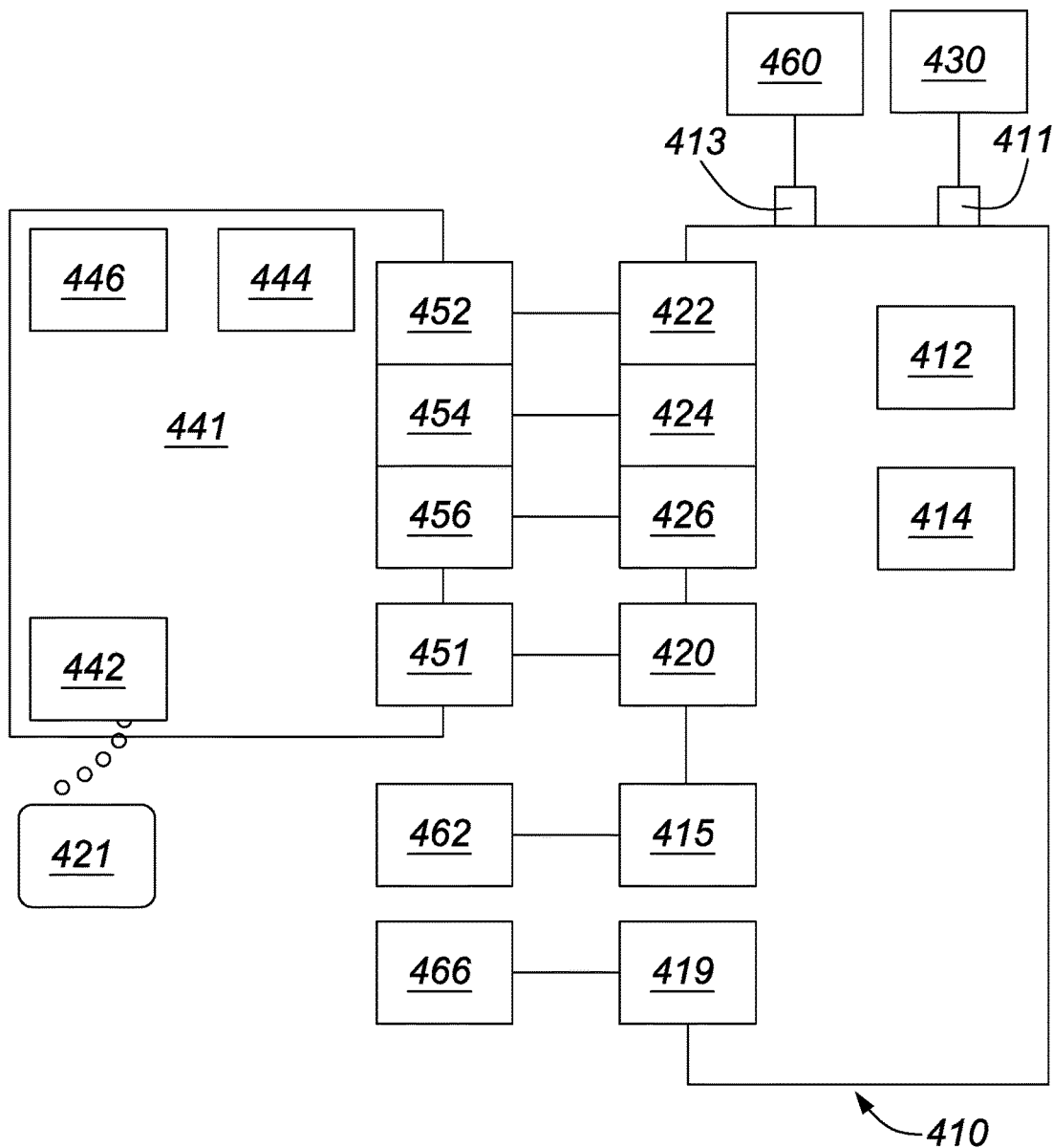
FIG. 12 is a schematic of a throttle control system connected with a vehicle speed sensor.

FIG. 12 is a schematic of a throttle control system 410. The throttle control system 410 is in communication with a vehicle speed sensor ("VSS") 462 at a VSS input 415. The VSS 462 measures the speed of rotation of an output shaft of a transmission on the vehicle. The speed of rotation is measured in square wave pulses and the relationship between pulse output of the speed sensor and rotation of the output shaft is linear. The resulting pulse data is indicative of vehicle speed. The VSS input 415 receives the pulse data from the VSS 462 and communicates the pulse data to the processor 412 for storage on the computer readable medium 414, communication to the STM 441, or other applications. The pulse data may provide advantages for recalibration, and recalibration is described below with reference to the throttle control system 410. However, a throttle control system including a different alternative source of speed data, such as the throttle control system 510, which interacts with a vehicle data bus 564, may be similarly adapted to recalibration. In addition, the recalibration may also be adapted to the throttle control systems 10, 110, 210, 310, or other throttle control systems that have only one source of speed data.

Figure 13:
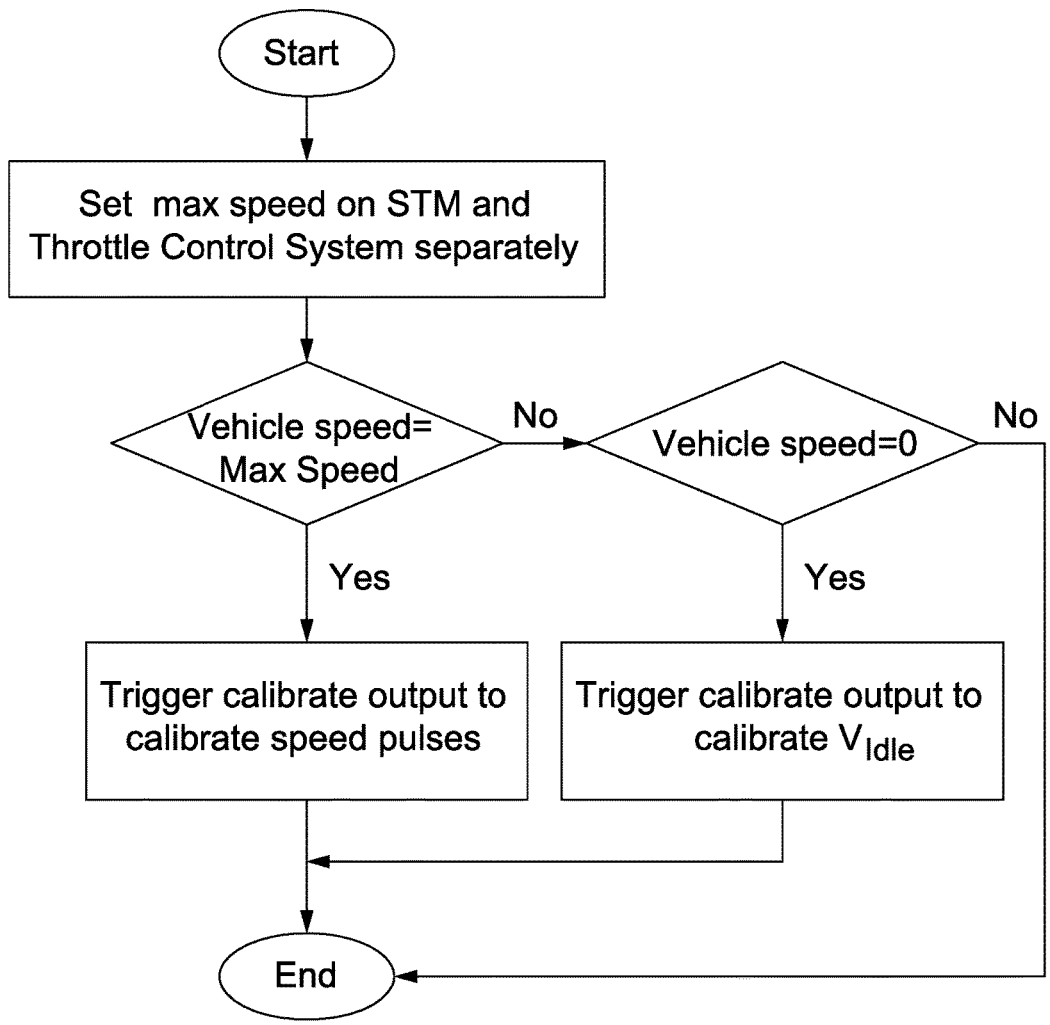
FIG. 13 is a flow chart of calibrating the throttle control system of FIG. 12 based on speed data from a satellite-based tracking module and a vehicle speed sensor.

FIG. 13 is a flow chart of a recalibration method for the throttle control system 410. Recalibration may be executed by the processor 444 to calibrate the pulse data from the VSS 462 against the satellite data from the satellite service 421. The processor 412 may be recalibrated with respect to $V_{Idle}$. Recalibration may be triggered by the STM processor 444 by providing trigger signals to the processor 412, by the STM processor 444 by providing a digital input to the processor 412, or by the processor 412 based on pass through of speed data through the STM communication port 451. The calibration trigger output 456 may be applied for causing the processor 412 to recalibrate $V_{Idle}$ (trigger state E). FIG. 13 also shows application of speed data indicative that the vehicle is over the maximum speed threshold value for causing the STM processor 444 to correlate the maximum speed threshold value with pulse data from the VSS 462 (trigger state F).

As shown in FIG. 13, when the STM processor 444 receives the satellite data from the satellite data receiver 442 indicative of zero speed, a trigger signal from the calibration trigger output 456 is provided to the calibration trigger input 426 and received by the processor 412 (trigger state E). The trigger signal from the calibration trigger output 456 is received at the calibration trigger input 426 and causes the processor 412 to calibrate the $V_{Idle}$ input voltage from the throttle controller 430 if the $V_{Idle}$ input voltage is within the error threshold value programmed. The error threshold value may have a range with a minimum value of 0 V and a maximum value of 0.9999 V, and may be between 0.3 and 0.4 V. The $V_{Idle}$ value is stored in a calibration database on the computer readable medium 414 for access by the processor 412 when controlling the control signal provided at the throttle output 413.

The $V_{Idle}$ of each circuit in the throttle controller 430 are sampled frequently while the vehicle is idling and the root mean square ("RMS") value of the samples for each circuit is calculated. The RMS calculation removes voltage spikes from the voltage data received during the calibration time interval, improving the accuracy of calibration of throttle positioning system voltages received at the throttle controller input 411 at a position of the throttle pedal which places the throttle at the idle position. After a pre-set number of such calibrations, the processor 412 may update previously calibrated $V_{Idle}$ values. If any spikes in voltages are detected by the processor 412 when calibrating $V_{Idle}$, data corresponding to the spikes are discarded from the RMS calculation as exceptions and stored on the computer readable medium 414. Once the $V_{Idle}$ values are updated, a data packet may be stored on the computer readable medium 414 and provided to the STM computer readable medium 446 via the communication port 420.

As also shown in FIG. 13, when the STM processor 444 receives data from the satellite data receiver 442 indicative of the vehicle travelling at the maximum speed threshold value, an output from the limiter trigger output 454 and from the calibration trigger output 456 is provided to the processor 412 (trigger state F). The trigger signal from the limiter trigger output 454 and the calibration trigger output 456 is received at the limiter trigger input 424 and the calibration trigger input 426. The maximum speed threshold value is stored on both the computer readable medium 414 and the STM computer readable medium 446.

Figure 14:
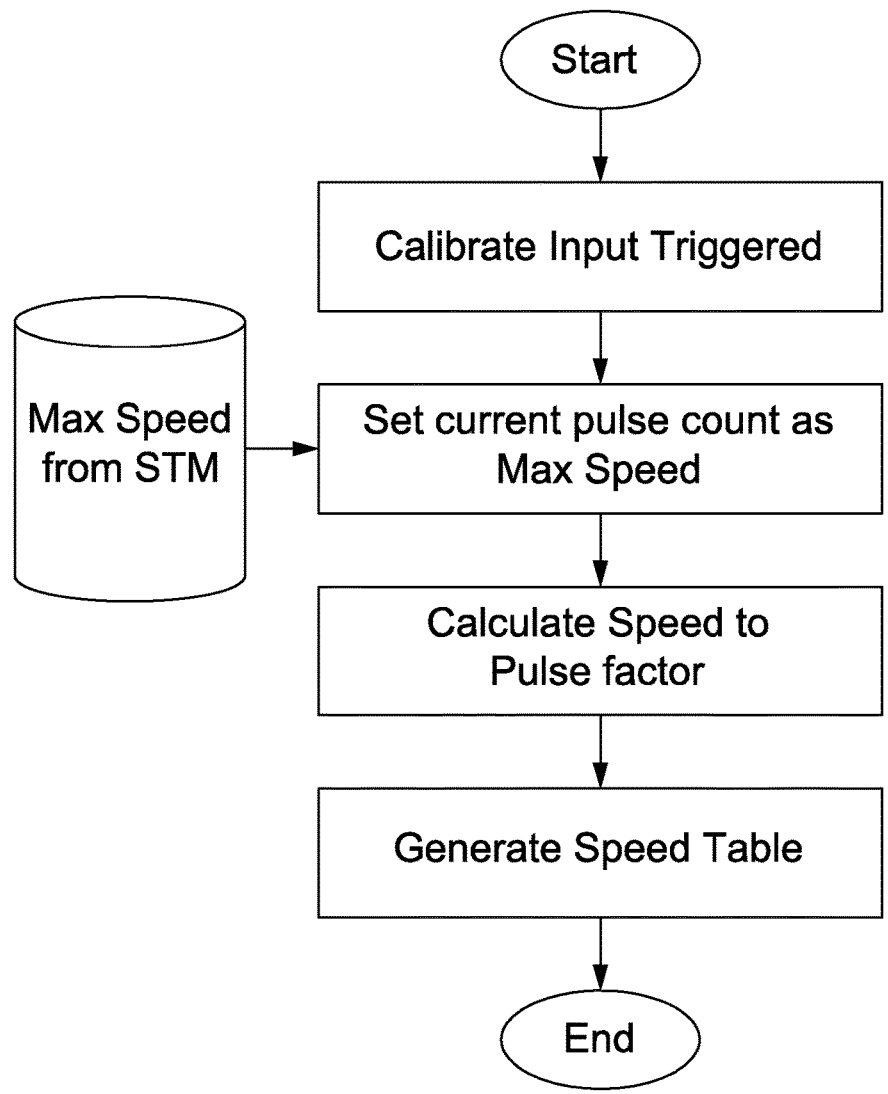
FIG. 14 is a flow chart of calibrating speed measured on a vehicle speed sensor against satellite-based speed data.

FIG. 14 is a flow chart of a method of calibrating the throttle control system 410 with reference to the pulse data from the VSS 462 to correlate the pulse data with road speed in a speed table including speeds other than the maximum speed threshold value. The method of FIG. 14 is executed by the processor 412 and is a downstream effect on the processor 412 of the "Vehicle Speed=Max Speed" branch of the method executed on the STM processor 444 shown on the left-hand side of FIG. 13. In response to the combination of the two trigger signals being received at the limiter trigger input 424 and the calibration trigger input 426, the processor 412 may map the pulse data from the VCS 462 to the maximum speed threshold value. The processor 412 may then calculate a ratio of the pulse count to the speed. A speed table correlating the pulse data to the vehicle speed is calculated by the processor 412 and stored on the computer readable medium 414 for access by the processor 412. The speed table may be prepared with reference to calculations of speed by the STM processor 444 using clock synchronization to ascertain time and distance values. The pulse data from the VSS 462 provides comparison speed data to calibrate against the speed data from the satellite service 421.

Throttle Control with Reference to Geofences

Figure 15:
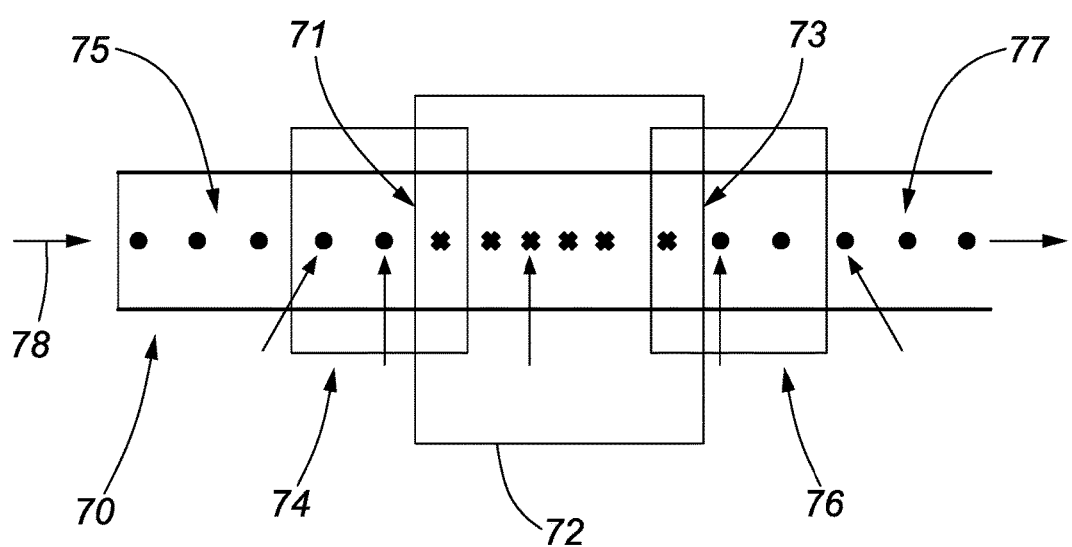
FIG. 15 is a schematic of geofences marking a tunnel used with a throttle control system.
Figure 16:
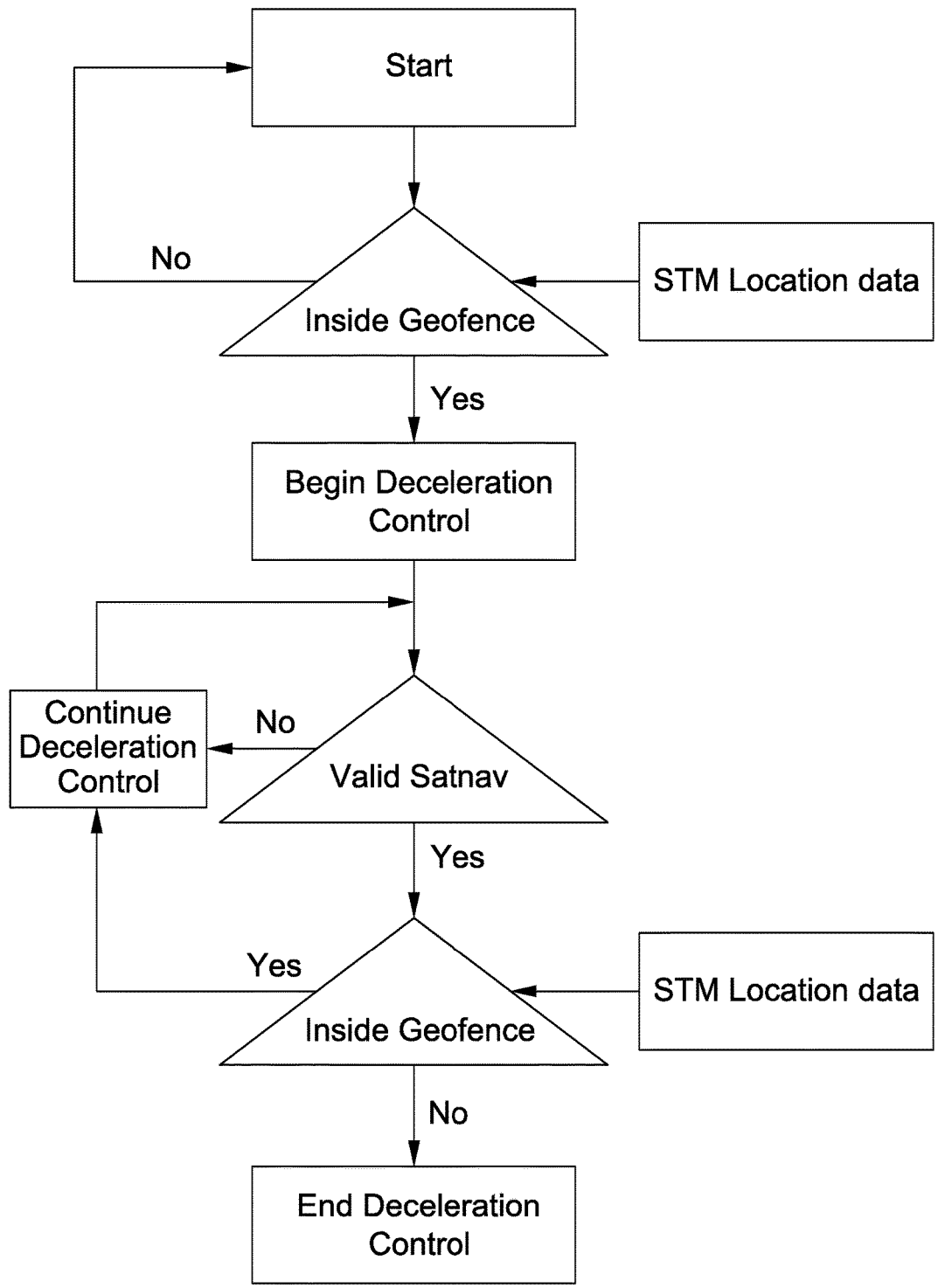
FIG. 16 is a flow chart of speed limiting based on geofences.
Figure 17:
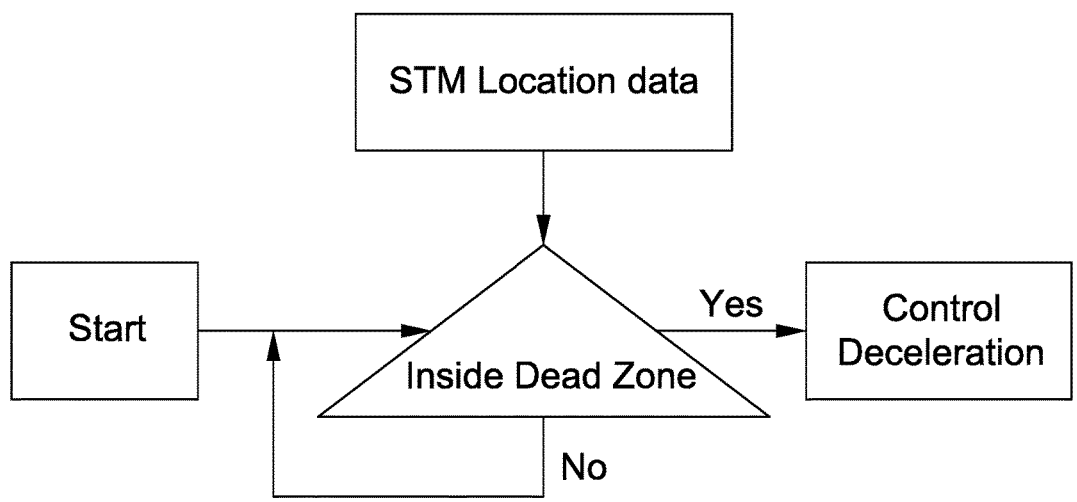
FIG. 17 is a flow chart of vehicle disabling based on a dead zone.
Figure 24:
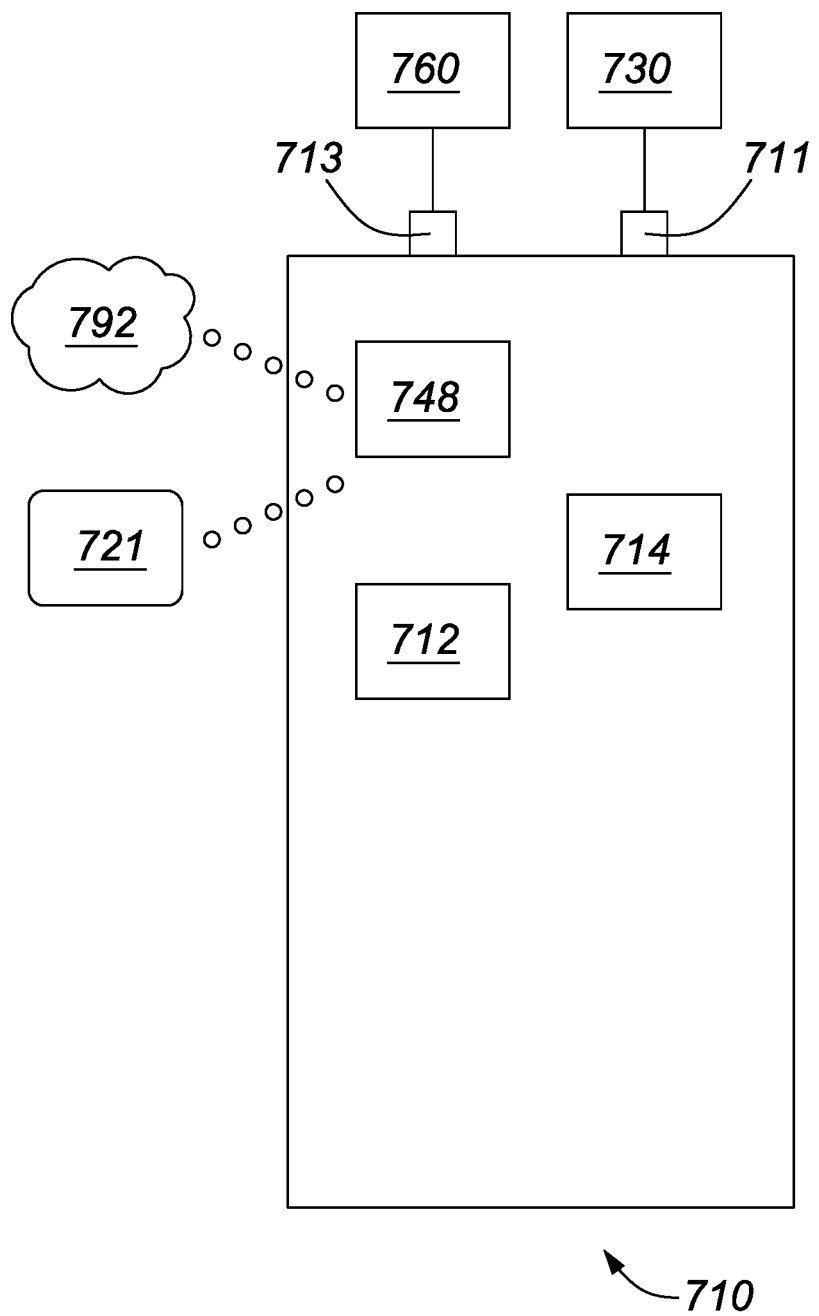
FIG. 24 is a schematic of a throttle control system in communication with an internet service.

FIGS. 15 to 17 show a schematic and flow charts of application of geofences that may be defined and locally stored on the throttle control system. The below description of geofences applies the throttle control system 410 as a reference point, but geofences may be applied to define changes in maximum speed threshold value, maximum voltage threshold value, location-specific details of driver profiles, posted speed limits, or other parameters that are defined in part by the vehicle location. The locations and boundaries of the geofences may be stored on the STM computer readable medium 446, the computer readable medium 414, or both. When location data indicative that a geofence has been entered is received by the satellite data receiver 442, any resulting changes to the maximum speed threshold value, maximum voltage threshold value, or other functions of the processor 412, the STM processor 444, or both, are applied and are saved into the computer readable medium 412, the STM computer readable medium 444, or both. The changes in maximum speed threshold value, maximum voltage threshold value, or other functions are determined with reference to properties of the geofences as defined and stored on the computer readable medium 412, the STM computer readable medium 444, or both. FIG. 24 shows an analogous application of geofences that are stored on the internet service 792. Speed control with reference to geofence data may be carried out on throttle control systems described and taught herein other than the throttle control system 410 or the throttle control system 710.

FIG. 15 is a schematic of a road 70 including a tunnel 72 extending between a first access point 71 and a second access point 73. Outside the tunnel 72, the road 70 is open, facilitating reception of satellite signals and other data signals, such as signals detected by the satellite data receiver 442 along a first open road section 75 and a second open road section 76. The tunnel 72 defines an enclosed road section 79 with limited reception of satellite or other data signals.

A first geofence 74 straddles the first access point 71, and a second geofence 76 straddles the second access point 73. Geofences are enclosed zones defined by satellite coordinates and are used to track inbound and outbound traffic. Geofences may be used to alert users or control devices when a vehicle, driver, cargo, or other asset has either entered of left the specified boundaries of the geofence. Each of the first and second geofences 74, 76 extends from approximately 100 m outside the tunnel to approximately 100 m inside the tunnel. The location of the first and second geofences 74, 76 and the maximum speed threshold value within each of the first and second geofences 74, 76 may each be locally stored in the computer readable medium 414, the STM computer readable medium 446, or both. The first geofence 74 may define the same maximum speed threshold value as the second geofence 76.

The first and second geofences 74, 76 respectively straddle the first and second access points 71, 73 to the tunnel 72. As a result, the first geofence 74 includes both the first open road section 75 and the enclosed road section 79, and the second geofence 76 includes both the second open road section 77 and the enclosed road section 79. When travelling along the road 70 in a direction 78, a vehicle would enter the first geofence 74, enter the tunnel 72 at the first access point 71, exit the first geofence 74 within the enclosed road section 79, enter the second geofence 76, exit the tunnel 72 at the second access point 73, and then exit the second geofence 76. The relative placement of the first and second geofences 74, 76 with respect to the tunnel 72 facilitates controlling vehicle speed in accordance with the maximum speed threshold value in the tunnel 72, where a satellite signal would not be received by the satellite data receiver 42.

FIG. 16 is a flow chart of a method of controlling vehicle speed executable by the STM processor 444, the processor 412, or both, based on geofence data locally stored in the STM computer readable medium 446, the computer readable medium 414, or both. The method of FIG. 16 may be executed as the vehicle enters a tunnel, such as the tunnel 72 of FIG. 15. If the throttle control system 410 receives location data indicative of the vehicle being within the first geofence 74, the maximum speed threshold value applicable outside the first geofence 74 on the road 70 may be updated to a lower maximum speed threshold value within the first geofence 74. The lower maximum speed threshold value of the first geofence 74 would apply within the tunnel 72 proximate the first access point 71. The maximum speed threshold values within the first and second geofences 74, 76 and the location of the first and second geofences 74, 76 may both be within the geofence data stored on the STM computer readable medium 446, the computer readable medium 414, or both.

If the updated lower maximum speed threshold value is detected through the satellite data receiver 442 inside the first geofence 74 and outside of the tunnel 72, a trigger signal may be sent from the limiter trigger output 454 (trigger state B), from the cruise trigger output 452 and the limiter trigger output 454 (trigger state D), or from the calibration trigger output 456 and the limiter trigger output 454 (trigger state F). The processor 412 receives the trigger signal and the throttle control system 410 may control deceleration (such by the method of FIG. 7) if the maximum speed threshold value inside the first geofence 74 is exceeded. As the vehicle enters the tunnel 72, communication between the satellite network 421 and the STM 441 may be lost. While satellite communication with the STM 441 is absent, the STM processor 444 maintains the maximum speed threshold value applicable within the first geofence 74, which functionality may be programmed on the STM processor 444 by maintaining the last known location as the vehicle's current location it the absence of satellite communication with the STM 441. As a result, any maximum speed threshold value associated or other relevant rules are maintained as in the last known location, which would result in the maximum speed threshold value of the first geofence 74 being maintained upon entering the enclosed road section 79. Once satellite communication with the STM 41 is reestablished, the STM processor 444, the processor 412, or both, may update the maximum speed value threshold value as appropriate based on the vehicle location as detected by the satellite data receiver 442 and any relevant geofence data stored on the STM computer readable medium 446, the computer readable medium 414, or both. Where the first and second geofences 74, 76 share a common maximum speed threshold value, the common maximum speed threshold value may be applied to maintain common maximum speed threshold value of the vehicle as the vehicle travels through the tunnel 72.

FIG. 17 is a flow chart of a method of preventing operation of the vehicle within a defined dead zone, the method executable by the STM processor 444, the processor 412, or both, and based on geofence data locally stored in the STM computer readable medium 446, the computer readable medium 414, or both. The dead zone may for example be an area that the vehicle must not enter (e.g. airports, sensitive government buildings, school areas, etc.). When the satellite data received by the satellite data receiver 442 is indicative of the vehicle being within the dead zone, the STM processor 444 sends a trigger signal including an output from the limiter trigger output 454. The maximum speed threshold value in a dead zone may be set at 0 km/hr. As a result, when the vehicle enters the dead zone, the STM processor 444 causes a trigger signal to be sent from the limiter trigger output 454 with the maximum speed threshold value of 0 km/hr. The vehicle then decelerates to a stop as the throttle idles while still allowing the driver to bring the vehicle to a stop safely.

Over the air authentication may be required to allow the vehicle to be move out of the dead zone. In throttle control systems having access to cellular or other transmission features, such as the throttle control system 710, the processor 712, the STM processor 744, or both, may be programmed to transmit a message to a response team when the dead zone has breached.

Throttle Control with Reference to VSS Pulse Data

As described above, the throttle control system 410 includes the VSS input 415 and receives the pulse data from the VSS 462. The pulse data may be received by the VSS input 415 and passed on to the processor 412, the computer readable medium 414, or both. The processor 412 may be applied to filter out noise from the pulse data. The pulse data may be calibrated against speed data from the satellite service 421 by the STM processor 444 as shown in FIG. 13 or by the processor 412 as shown in FIG. 14.

As shown in FIG. 14, when the STM processor 444 receives data from the satellite data receiver 442 indicative of the maximum speed threshold value as stored on the STM computer readable medium 446, outputs from both the limiter trigger output 454 and the calibration trigger output 456 are provided to the processor 412 (trigger state F). In response to trigger state F, the processor 412 calibrates the pulse data to the maximum speed threshold value. The calibration facilitates defining the speed table referenced in FIG. 14 and the throttle control system 410 may apply the pulse data as the speed data. The pulse data from the VSS 462 may be applied by the processor 412 to cause the throttle control system 410 to control deceleration.

While the STM 441 is receiving satellite data at the satellite data receiver 442, and the maximum speed threshold stored on the computer readable medium 414 is equal to the maximum speed threshold value stored on the STM computer readable medium 446, the calibration procedures of FIGS. 13 and 14 may be repeated, which may improve accuracy in calibration of the processor 412 and more accurate speed control by the throttle control system 410. After calibrating the pulse data from the VSS 462 to the vehicle speed with reference to the maximum speed as determined by the STM 441 with reference to vehicle speed data from the satellite service 421, the processor 412 may function independently of the STM 441 and may be used to limit the maximum speed of the vehicle in the absence of any satellite data being received from the satellite service 421 by the satellite data receiver 442.

Once the pulse data is calibrated against the satellite data or other speed data, the pulse data may be used primarily for deceleration control by the processor 412, or may be used only where no connection with the satellite service 421 is available (such as in "case 1" below). Where the pulse data is used primarily for deceleration control by the processor 412, the satellite service 421 remains as the source of location data and facilitates recalibration of the pulse data. Two other cases are described below. In case 1, the satellite service 421 is the preferred source of speed data over the VSS 462. In case 2, the satellite service 421 is again the preferred source of speed data over the VSS 462, but a lower maximum speed threshold value is stored on the computer readable medium 414 compared with a greater maximum speed threshold value stored on the computer readable medium 446.

Figure 18:
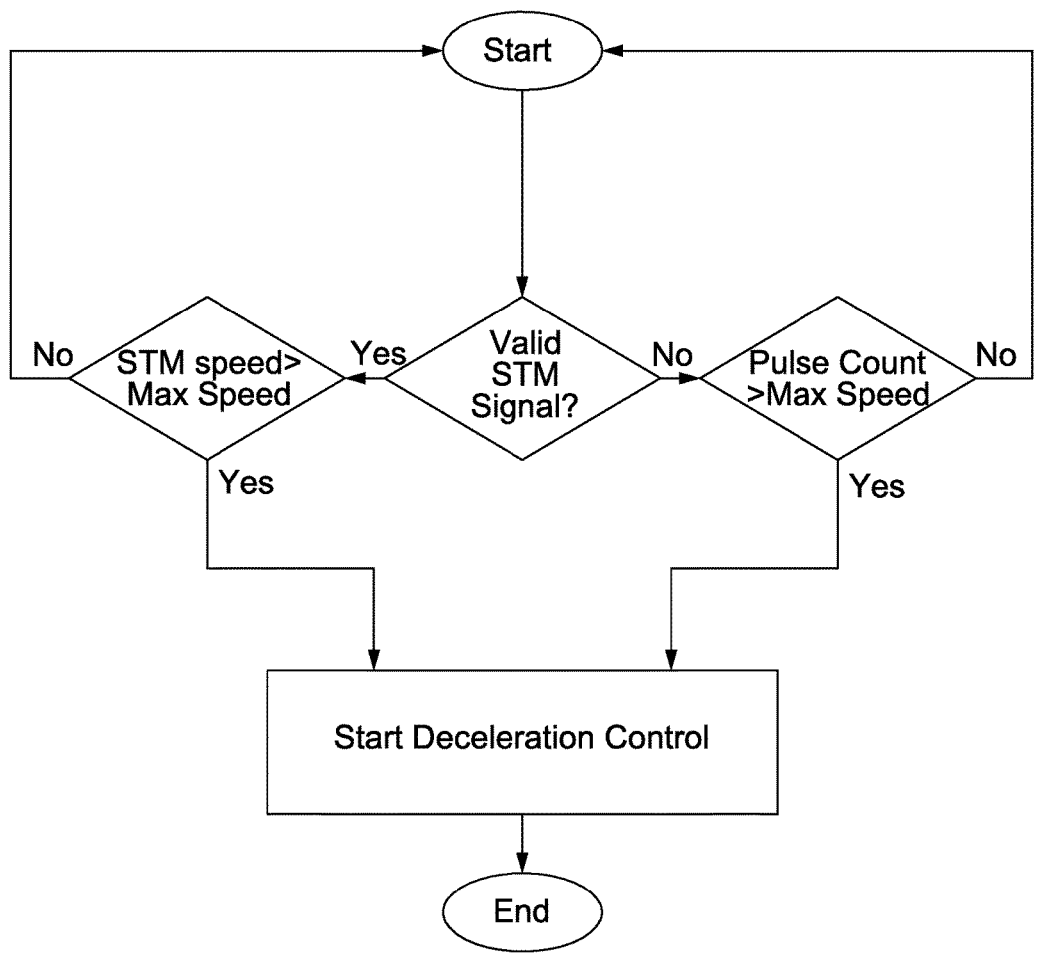
FIG. 18 is a flow chart of applying vehicle speed sensor data as a backup source of speed data from satellite-based speed data.

Case 1: Maximum Speed Threshold Values Stored on the Computer Readable Medium 414 and in the STM Computer Readable Medium 446 are Equal FIG. 18 is a flow chart of a method for control of the vehicle maximum speed by the throttle control system 410 after being calibrated as shown in FIGS. 13 and 14. The method of FIG. 18 may be executed on the processor 412 in cases where the maximum speed threshold value stored on the computer readable medium 414 matches the maximum speed threshold value stored in the STM computer readable medium 446. Where the STM 441 is receiving satellite data from the satellite data receiver 442, the processor 412 may cause the throttle control system 410 to control deceleration in response to trigger signals from the STM 441.

Where no satellite data is being received at the satellite data receiver 442, the pulse data from the VSS 462 and the correlated speed value from the speed table may be referenced by the processor 412 as a trigger for controlling deceleration. Where the correlated speed value determined from the pulse data matches the maximum speed threshold value stored on the computer readable medium 414, the throttle control system 410 may control deceleration, as would be the case if the throttle control system 410 received inputs from the STM 441 corresponding to any of trigger states B or D.

The processor 412 may also be configured and adapted to apply a cruise countdown timer similar to that executed by the STM processor 444 and described in FIG. 11. Where the pulse data shows a pulse count equal to or greater than the pulse count corresponding to the maximum speed threshold value, a timer starts counting down from a set value. If the timer reaches zero, the cruise control module 466 is disabled by an interrupt signal to the cruise control module 466 from the cruise control relay 419 (e.g. by internally triggering a normally closed cruise relay to an open state, etc.). The processor 412 would cause the cruise control relay 419 to send an interrupt signal to the cruise control module 466 as would be the case if the throttle control system 410 received inputs from the STM 441 corresponding to any of trigger states C or D. Once the vehicle speed drops to the maximum speed threshold value, a resumption signal may be sent to the cruise control module 466 (e.g. by reverting an opened cruise relay back to a closed state, etc.).

Case 2: Maximum Speed Threshold Value Stored on the Computer Readable Medium 414 is Lower than the Maximum Speed Threshold Value Stored in the STM Computer Readable Medium 446 and Satellite Data is being Received by the Satellite Data Receiver 442

Figure 19:
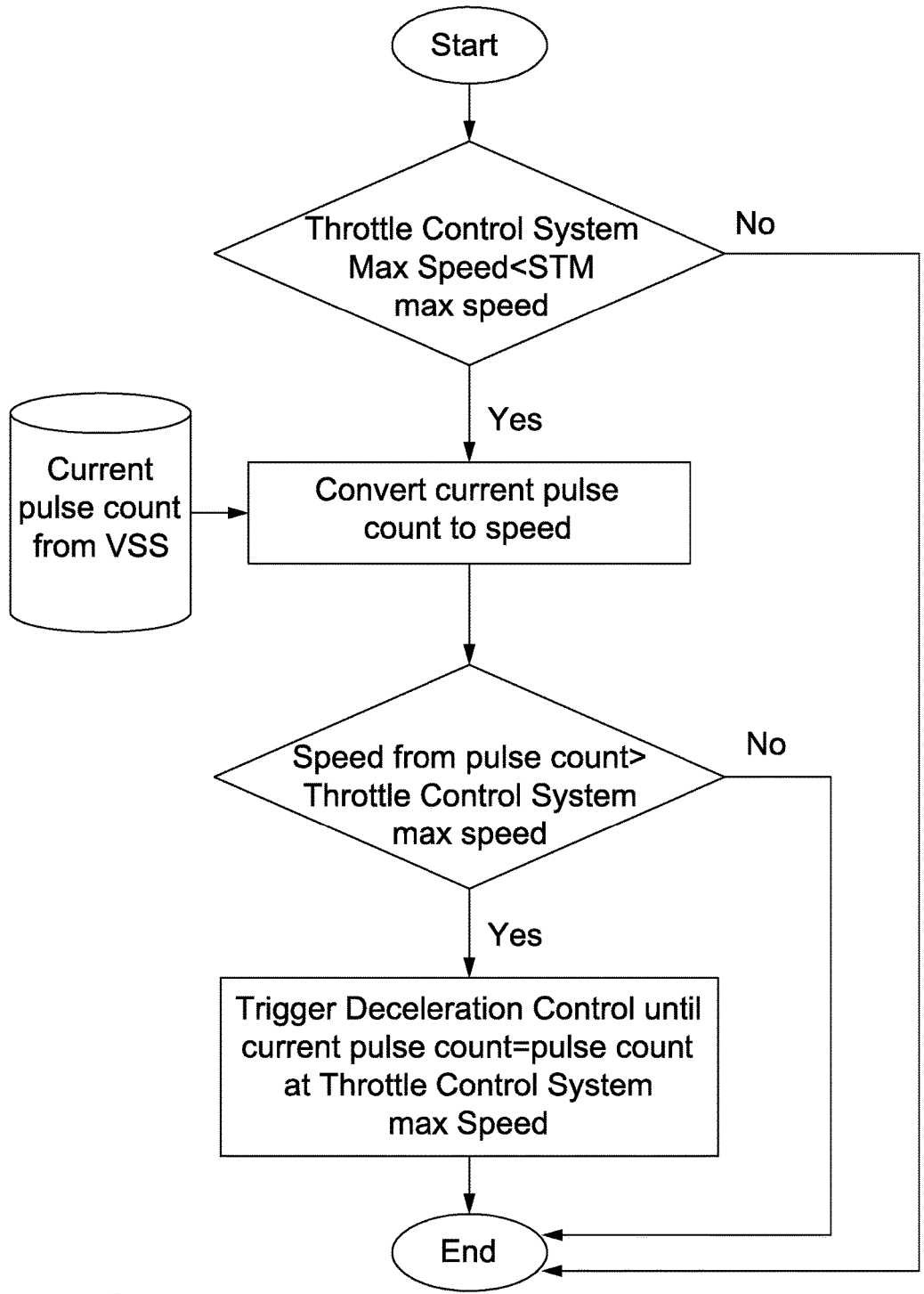
FIG. 19 is a flow chart of maximum speed threshold value stored on the throttle control system rather than on the satellite-based speed data.

FIG. 19 is a flow chart of a method for applying the maximum speed threshold value stored on the computer readable medium 414 rather than the maximum speed threshold value stored on the STM computer readable medium 446. The method of FIG. 19 applies where the STM 441 is receiving satellite data from the satellite service 421 at the satellite data receiver 442. Where the maximum speed threshold value stored on the computer readable medium 414 is lower than the maximum speed threshold value stored on the STM computer readable medium 446, the lower maximum speed threshold value of the computer readable medium 414 will take precedence.

For example, while the STM 441 is receiving satellite data at the satellite data receiver 442, the maximum speed threshold value stored on the computer readable medium 414 is 80 km/hr, and the maximum speed threshold value stored on the STM computer readable medium 446 is 100 km/hr, the processor 412 would apply the maximum speed threshold value stored on the computer readable medium 414 of 80 km/hr with reference to the vehicle speed as determined from the pulse data. Similarly, where the maximum speed threshold value stored on the STM computer readable medium 446 is lower than the maximum speed threshold value stored on the computer readable medium 414, the lower of the two values is applied. In such a case, the lower maximum speed threshold value stored on the STM computer readable medium 446 would be applied by the STM processor 444 with reference to speed data including the satellite data from the satellite service 421, rather than the processor 412 applying the higher maximum speed threshold value stored on the computer readable medium 414 with reference to the speed data including the pulse data from the VSS 462. The lower of the two values would trigger deceleration control first since both values remain active.

Downhill Logic

If the vehicle speed is greater than the maximum speed threshold value because of a downhill slope, limiting the output voltage to the ECM 460 may compromise vehicle safety, and may not limit speed. For example, where the vehicle is a loaded semi-trailer truck travelling downhill, safe vehicle control may be facilitated by maintaining driver control over the throttle positioning system, allowing the driver to increase engine speed and shift to a lower gear, or otherwise providing the driver with a chance to manipulate the engine or transmission in reaction to a slope or changes in terrain.

The processor 412 may apply downhill logic based on calibrated speed values against the pulse data from the VSS 462 compared with the speed table as described in relation to FIGS. 13 and 14. If the throttle control system 410 receives pulse count data that increases for a defined time period, and which based on the output voltage may be a result of the vehicle travelling downhill, the processor 412 may be programmed to disable the deceleration control procedure and maintain or restore driver control of the throttle positioning system. Any suitable time period may be defined, for example between about 1 second and about 5 seconds. Where a vehicle exceeds the maximum speed threshold value while subject to acceleration control, speed data indicative that the vehicle's speed is increasing notwithstanding the output voltage being lowered to $V_{Idle}$. Alternatively or in combination with the pulse data from the VSS 462, the satellite service 421 may provide location data that includes altitude. Where a change in altitude is detected and correlated with an increase in speed that would not ordinarily follow the output voltages being provided to the ECM 460, the downhill logic may be activated and driver control of the throttle maintained.

Throttle Control with Reference to Vehicle Data Bus Input

Figure 20:
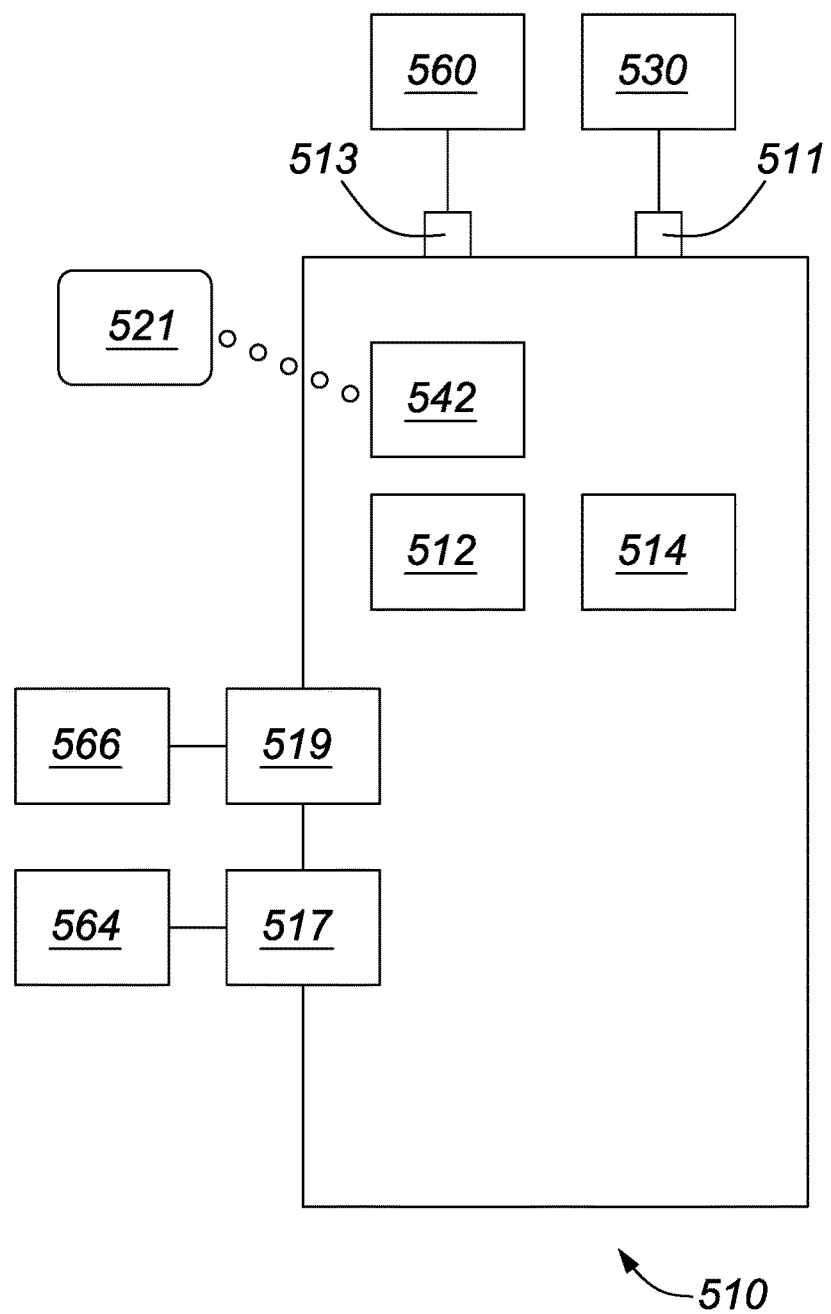
FIG. 20 is a schematic of a throttle control system in communication with a vehicle data bus.

FIG. 20 is a schematic of a throttle control system 510. The throttle control system 510 is in communication with a vehicle data bus 564 at a data bus input 517. The data bus input 517 receives digital speed data from the vehicle data bus 564 and communicates the speed data to the processor 512 for storage on the computer readable medium 514, communication to the STM 514, or other applications. The vehicle data bus 564 may operate on any suitable protocol (e.g. SAE J1939, SAE J1708, SAE J1850, SAE J1587, etc.).

Where the digital speed data from the vehicle data bus 564 shows a vehicle speed equal to the maximum speed threshold value stored on the computer readable medium 514, the processor 512 may cause the throttle control system 510 to control deceleration. The digital speed data from the vehicle bus 564 may also include an indication of whether the cruise control module 566 of the vehicle is active, which may be received by the processor 512 from the data bus input 517. Where the cruise control module 566 is used to increase the vehicle speed beyond the maximum speed threshold value on the computer readable medium 514, the processor 512 may also cause an interrupt signal to be sent to the cruise control module 566 through the cruise control relay 519, in addition to executing a method of deceleration control. Once vehicle speed drops below the maximum speed threshold value, the processor 512 may cause a resumption signal to be sent to the cruise control module 566 through the cruise control relay 519. The resumption signal resumes driver control of the cruise control module 566.

Throttle Control with Reference to Inertial Navigation

Figure 21:
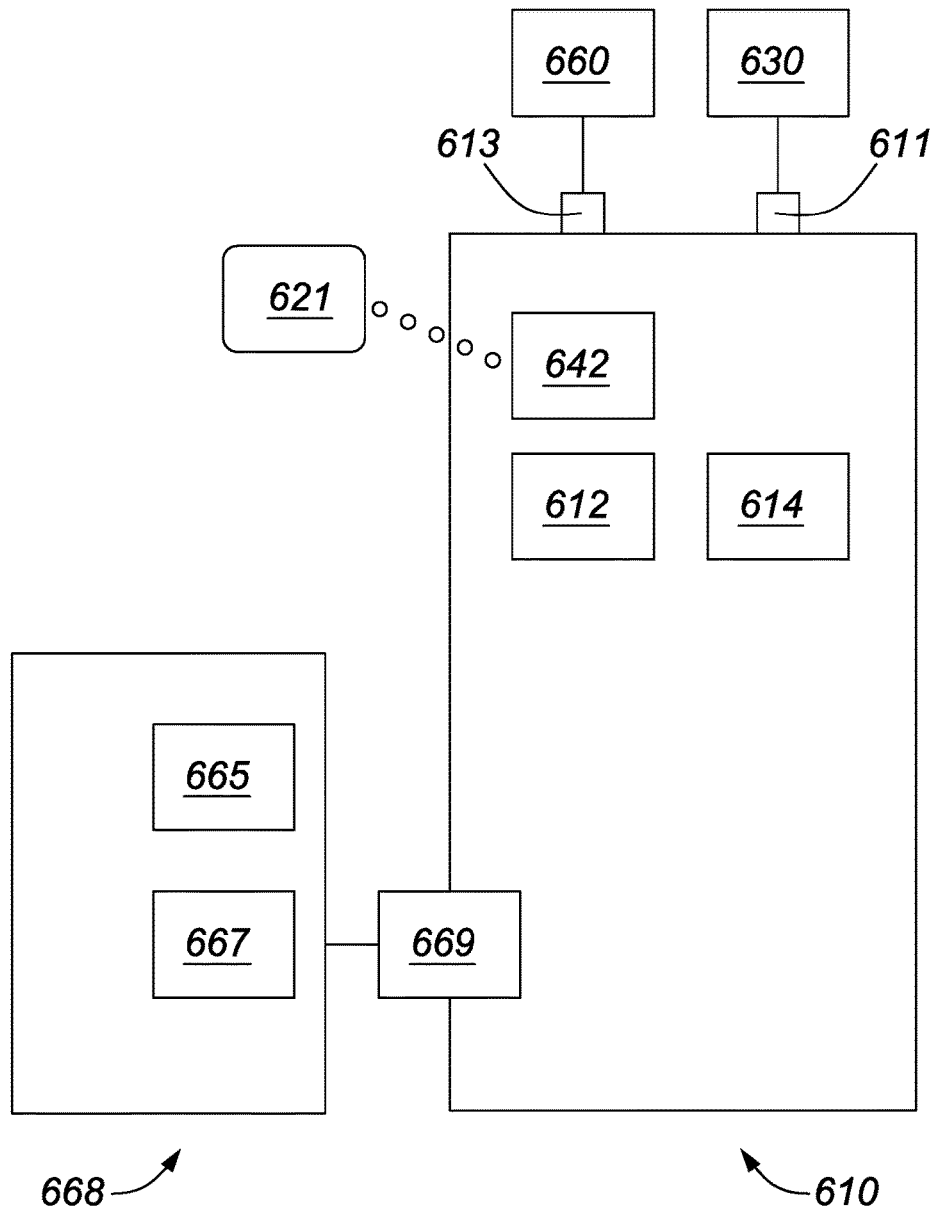
FIG. 21 is a schematic of a throttle control system for use with a vehicle including an inertial navigation system.

FIG. 21 is a schematic of a throttle control system 610 for use with a vehicle including an inertial navigation system ("INS") 668. The throttle control system 610 is in communication with the INS 668 through an INS input 669. The INS 668 includes gyroscopes 667 for deriving an attitude of the vehicle with respect to a reference frame. The INS 668 also includes accelerometers 665 for measuring a specific force of the vehicle. The INS 668 may also provide location data, speed data, or both. The INS 668 also detects vehicle altitude and the location data from the INS 668 may trigger the downhill logic in combination with the speed data from the INS 668 or another source. The INS 668 is shown as component of the vehicle but could alternatively be integrated with the throttle control system 610 or could be a third-party standalone product.

Figure 22:
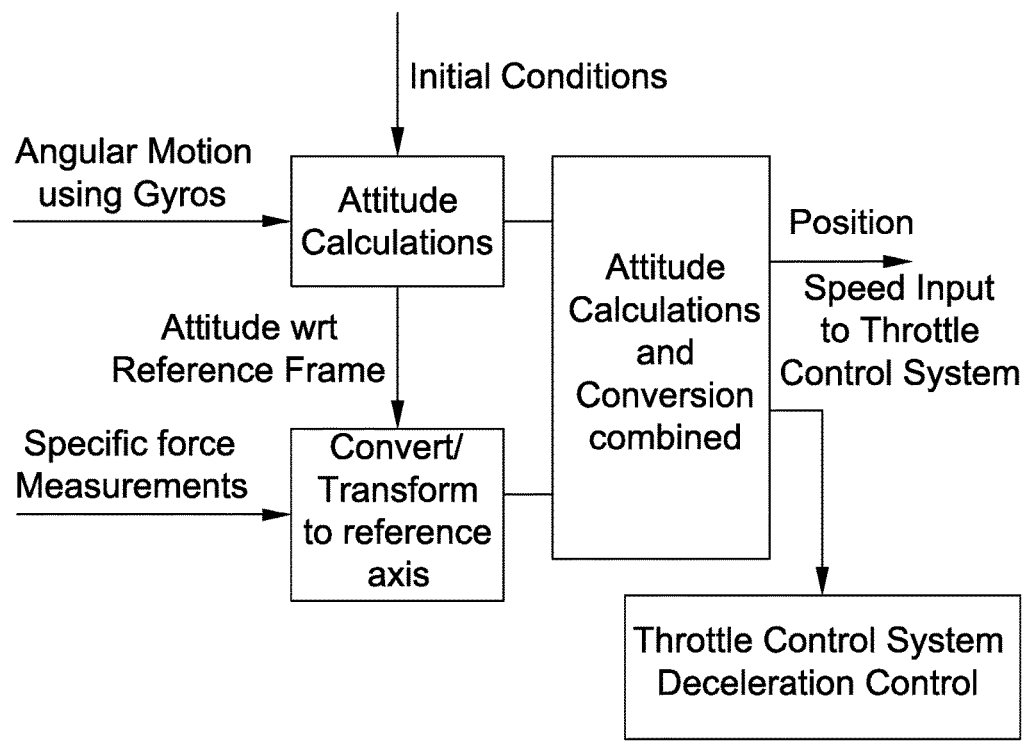
FIG. 22 is a flow chart of using inertial navigation to calculate speed and position data.

FIG. 22 is a flow chart of application of the INS 668 to provide a speed input to the throttle control system 610 through the INS input 669. The INS 668 detects the angular motion of the vehicle with the gyroscopes 667. The angular motion is applied to calculate the vehicle attitude with respect to a reference frame. The INS 668 detects the specific force of the vehicle with the accelerometers 665 and resolves the specific force against the reference frame. Once both the angular motion and the vehicle attitude are normalized to the reference frame, the resultant force due to the force of gravity or the earth's gravitational field is computed and combined with the specific force quantities to estimate the vehicle's speed, direction, and position, including altitude. The estimate of the vehicle's speed, direction, and position is provided from the INS 668 to the throttle control system 610. Where the estimate of the vehicle's speed exceeds the maximum speed threshold value stored on the computer readable medium 614, the throttle control system 610 may apply the speed data from the INS 668 to control deceleration.

Deceleration Control with Reference to Posted Speed Limits

Figure 23:
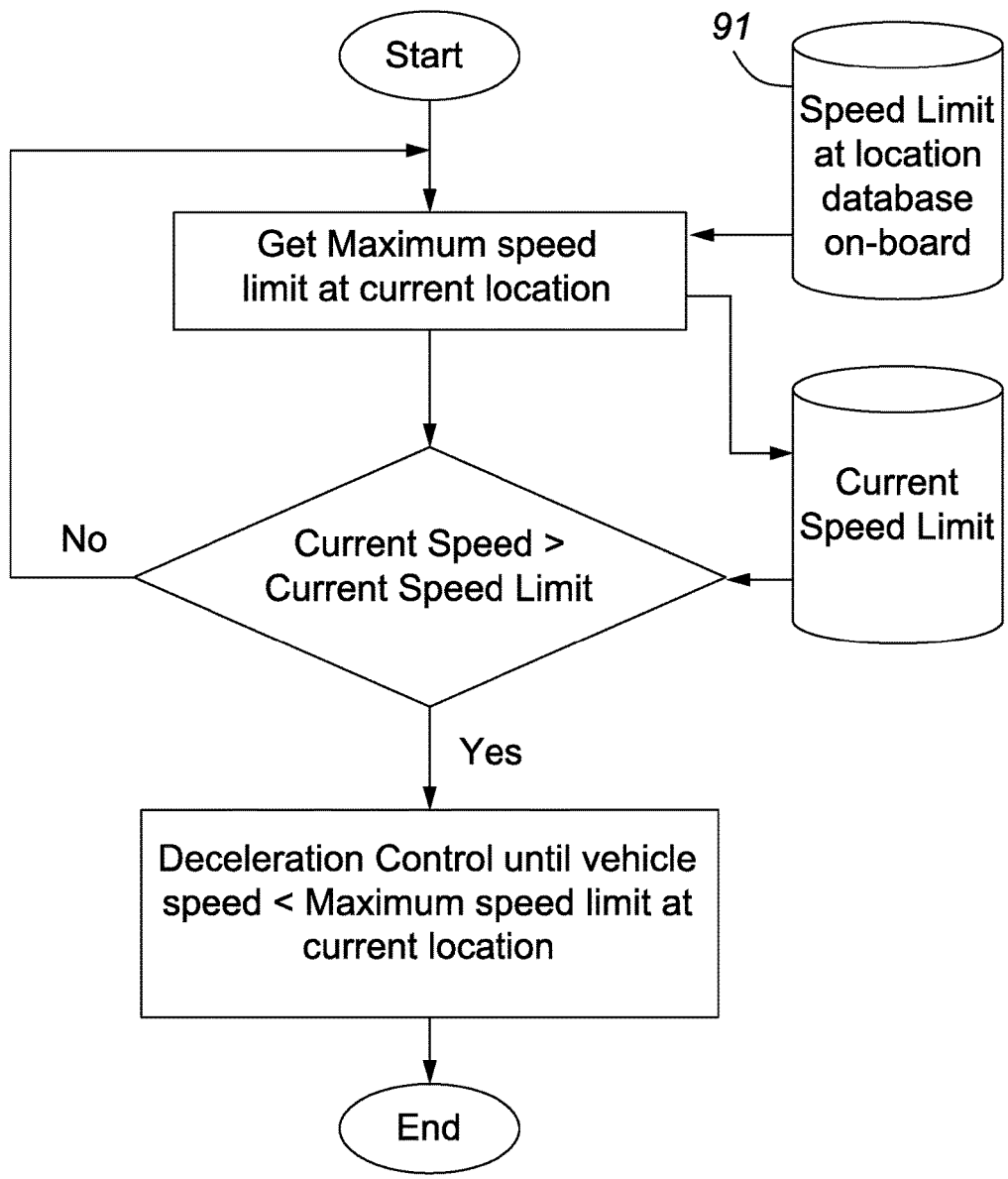
FIG. 23 is a flow chart of controlling acceleration based on a locally-accessed database of posted speed limits.

FIG. 23 is a flow chart of application of a database of posted speed limit information 91 locally stored on the computer readable medium 14 (using the throttle control system 10 as an example context for application of the method of FIG. 23). The processor 12 may reference current position data of the vehicle as received from the location data source 40 against the database of posted speed limit information 91 to determine the posted speed limit at the current vehicle position. Deceleration control may be applied with the maximum speed threshold value being defined with reference to the speed limit from the database of posted speed limit information 91. The maximum speed threshold value may be equal to the speed limit at the vehicle location or may be a defined margin above the speed limit at the vehicle location. If the current speed of the vehicle is greater than the maximum speed threshold value at the current vehicle position, the throttle control system 10 may apply deceleration control until the vehicle speed drops to the maximum speed threshold value. The maximum speed threshold value may be equal to the speed limit at the current vehicle position or the top end of the defined margin above the speed limit.

Internet Service Enabled Throttle Control System

FIG. 24 is a schematic of a remote-access enabled throttle control system 710. In place of a satellite data receiver, such as the satellite data receivers 142, 242, 342, 442, 542, or 642 of the throttle control systems 110, 210, 310, 410 510, or 610, the throttle control system 710 includes a communication module 748. The communication module 748 receives the satellite data similarly to the satellite data receivers 142, 242, 342, 442, 542, or 642. The communication module 748 also facilitates two-way communication with an internet service 792. The communication port 720 may include or be operatively connected with a communication modem integrated with the throttle control system 710. The communication module 748 may be substituted with separate modules, with a first module including a satellite data receiver and a second module including a two-way internet service communication link. The throttle control system 710 includes the communications module 748 resident with the processor 712 rather than on a separate STM. The communications module 748 could alternatively be located on a separate STM in communication with the processor 712, similarly to the throttle control system 1110 of FIG. 33.

The communication module 748 may provide additional functionality to the throttle control system 710 by providing two-way communication with the internet service 792. The processor 712 may receive packets from the internet service 792. The packets may include information about maximum speed threshold values, geofences, or other information. The maximum speed threshold value and other parameters applicable to a particular location, to a particular vehicle, to a particular driver, or a combination thereof, may be updated on the internet service 792 and communicated to the processor 712 remotely. Updates to the maximum speed threshold value or other parameters received from the internet service 792 may be stored in the computer readable medium 714.

Where the throttle control system 710 is recalibrated as shown in FIG. 13, the packet of the updated $V_{Idle}$ values stored on the computer readable medium 714 may be provided to the internet service 792. The packet may be provided to the internet service 792 either at a later time by a separate application, or sent to the internet service 792 through the communication module 748, which may facilitate real-time updates to and from the internet service 792. The packet may be encrypted (e.g. by hexadecimal encryption, etc.) when communicated between the internet service 792 and the processor 712. The packet may include data of input voltage, output voltage, average voltage values for each throttle pedal circuit during calibration of $V_{Idle}$, exceptions during calibration, other information, or a combination thereof. The packets may be parsed and analyzed by the internet service. When applying a throttle control system that has an internet communication link, such as the throttle control system 710, throttle circuit voltages may be provided to the internet service in real time can for assessment of whether the system has been bypassed or otherwise tampered with.

During normal operation of the throttle controller 730, voltages greater than 0 V are expected to be received at the throttle controller input 711. Where the throttle output 713 is a voltage output to the ECM 760, voltages of at least 0 V are being provided at the throttle output 713 to the ECM 760 for controlling the throttle. If the input voltages or the output voltages drop to 0 V, the processor 712 may send an alert to the internet service 792 indicating that the throttle control system 710 has been disconnected or tampered with. In addition, if the vehicle speed equals or exceeds the maximum speed threshold value and maintains the speed without the throttle control system 710 limiting the vehicle's speed, and in the absence of the downhill logic being activated, a packet including an alert may be sent to the internet service 792 about potential tampering.

Throttle Control with Reference to Geofences

Figure 25:
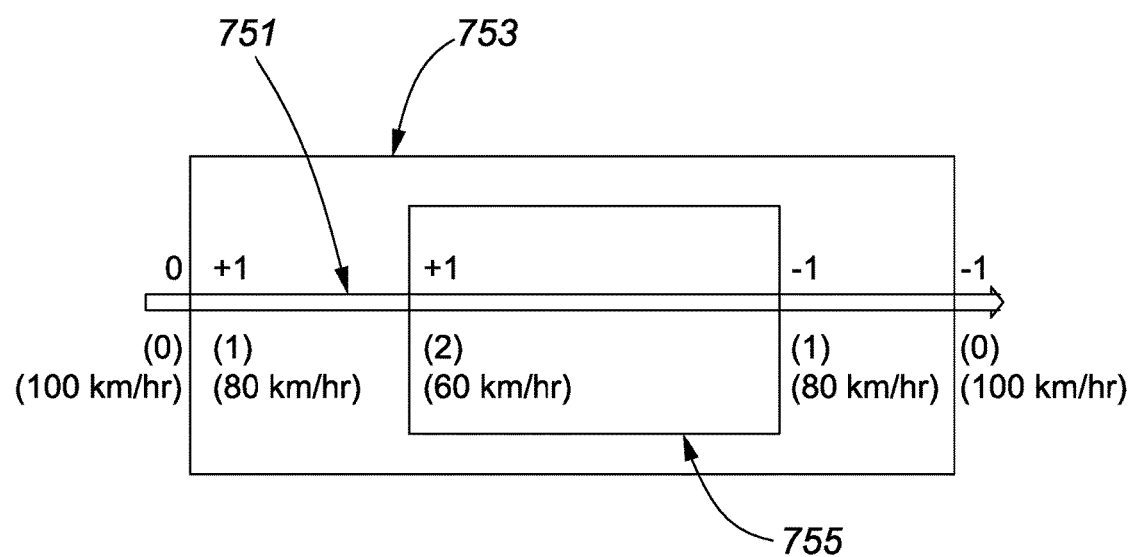
FIG. 25 is a schematic of accumulator indices for geofences used with a throttle control system.

FIG. 25 shows application of geofences stored on the internet service 792 and based on accumulators to control vehicle speed. Portions of a road 751 are enclosed by a first geofence 753 and a second geofence 755. The first geofence 753 surrounds the second geofence 755. The location and coordinates of the first and second geofences 753, 755 may be stored in the internet service 792. The identities of vehicles that are to be subject to deceleration control within each of the first and second geofences 753, 755 are defined on the internet service 792. The maximum allowable speed thresholds applicable inside each of the first and second geofences 753, 755 may also be defined on the Internet service 792 as indicated on FIG. 25. The maximum allowable speed threshold within the first geofence 753 is shown as 80 km/hr and the maximum allowable speed threshold within the second geofence 755 is shown as 60 km/hr. As a vehicle travels along the road 751, the throttle control system 710 provides an update of the vehicle position to the internet service 792 through the communication module 748. The throttle control system 710 reports the vehicle position coordinates at a regular reporting interval, for example about once every five minutes.

The internet service 792 checks the coordinates of vehicle position reported by the throttle control system 710 to verify whether the coordinates fall within either of the first and second geofences 753, 755. The internet service 792 may also check whether based on the speed data and the location data, the vehicle is likely to enter a geofence before the next reporting of location data from the throttle control system 710 to the internet service 792. If the throttle control system 710 is within the boundaries of a geofence, such as the first geofence 753, the internet service 792 responds with a packet containing the maximum speed threshold value within the first geofence 753. If the vehicle is travelling above the maximum speed threshold value of the first geofence 753 when the vehicle enters the first geofence 753, the throttle control system 710 may control deceleration. Alternatively, the locations of the geofences 753, 755, the maximum speed threshold values as a function of accumulator value, or both, may be stored locally on the computer readable medium 714 with updates as necessary from the Internet service 792. Where an STM is included in the throttle control system, such as the STM 1141, controlling deceleration may be initiated by an output from the limiter trigger output 1154 to the limiter input 1124, and the throttle control system 1110 will in turn control deceleration.

The maximum speed threshold values of the first and second geofences 753, 755 may be determined by accumulators stored on the Internet service 792 and communicated to the processor 712 by the communication module 748. The accumulators define decreases in the maximum speed threshold value based on increases in the accumulator values. Outside of the first and second geofences, 753, 755, the accumulator value is 0 and the maximum speed threshold value is 100 km/hr. As the vehicle passes into the first geofence 753, the internet service 792 sends a packet to the communication module 748, which increases the accumulator value by 1. This increase provides a total accumulator value of 1 and a decrease in the maximum speed threshold value of 20 km/hr from 100 km/hr to 80 km/hr.

When the vehicle enters the second geofence 755 from the first geofence 753, the accumulator value increments by 1 to a total value of 2, with a corresponding decrease in the maximum speed threshold value of 20 km/hr from 80 km/hr to 60 km/hr. As the vehicle leaves the second geofence 755, the accumulator value decreases by 1 to a total value of 1, and the maximum speed threshold value increases from 60 km/hr to 80 km/hr. As the vehicle then leaves the first geofence 753, the accumulator value decreases by 1 to a total value of 0, and the maximum speed threshold value increases from 80 km/hr to 100 km/hr.

The locations of the first and second geofences 753, 755 and the changes in accumulator value for each of the first and second geofences 753, 755 may all be stored on the internet service 792 for transmission to the throttle control system 710 as the vehicle approaches or passes into one of the first and second geofences 753, 755. The signals to increase or decrease the accumulator values may also be provided to the communication module 748 from the internet service 792. Standardizing the result of increasing or decreasing the accumulator value and storing logic for deriving maximum speed threshold values from accumulator values facilitates sending smaller packets from the internet service 792 when one of the first and second geofences 753, 755 are entered, which may mitigate bandwidth usage.

Throttle Control with Reference to Weather Information

Figure 26:
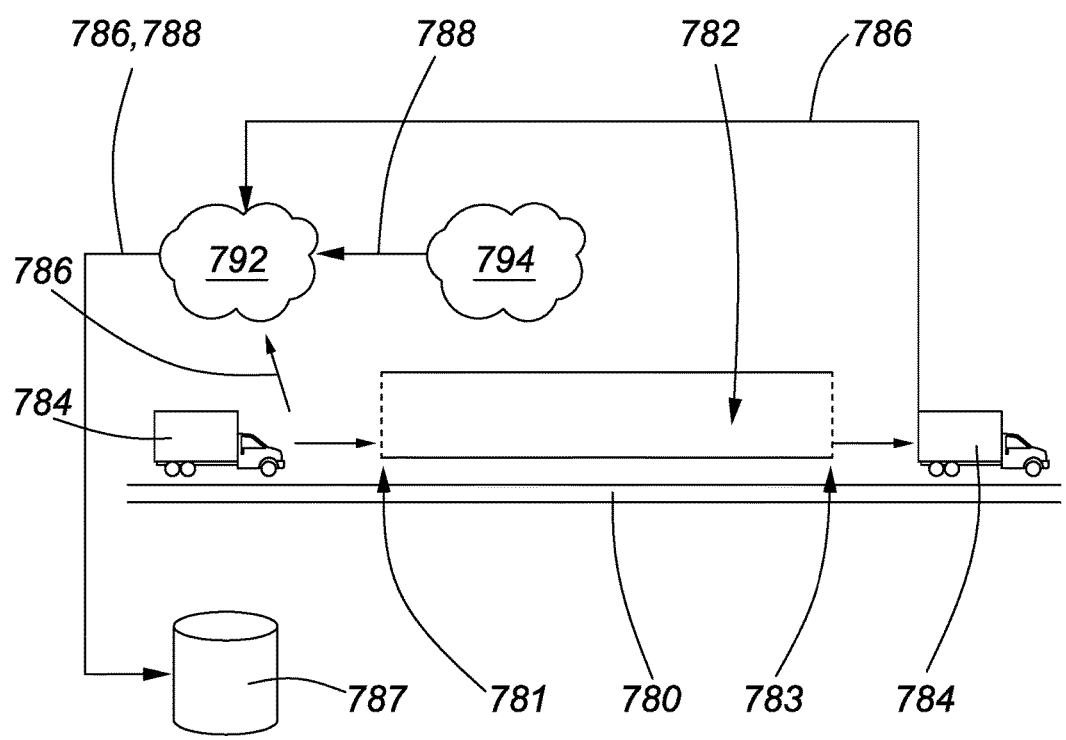
FIG. 26 is a schematic of a throttle control system interacting with an internet service and a weather service.

FIG. 26 is a schematic of a road 780 passing through a bad weather zone 782. The bad weather zone 782 extends between a bad weather start location 781 and a bad weather end location 783. A vehicle 784 travels along the road 780 through the bad weather zone 782. The vehicle 784 includes the throttle control system 710 in communication with the internet service 792. Vehicle location data 786 may be provided to the Internet service 792 from the throttle control system 710 at pre-set intervals as described in relation to geofences and FIG. 25. Communication of the vehicle location data 786 to the Internet service 792 is shown at the bad weather start location 781 and at the bad weather end location 783. The vehicle location data 786 may include the latitude and longitude of the vehicle 784 ("$(L, L)_V$"), the time, the vehicle speed, the vehicle heading, other vehicle information, or a combination thereof.

The internet service 792 may be in communication with a weather service 794. The internet service 792 receives weather data 788 from the weather service 794. The weather data 788 may include information about the weather in terms of location, severity, and effect on the maximum speed threshold value, maximum voltage threshold value, maximum voltage range value, or a combination thereof. In the examples below, maximum speed threshold value is used as a reference point, but the maximum speed threshold value, maximum voltage threshold value, maximum voltage range value, or a combination thereof may be decreased as a result of inclement weather conditions. The weather data 788 may define the bad weather zone 782 based on latitude and longitude information from the weather service 794. The latitude and longitude data may include latitude and longitude values of the bad weather start location 781 "$(L, L)_{BW\,Start}$" and latitude and longitude values of the bad weather end location 783 "$(L, L)_{BW\,End}$". The weather data 788 may also include data of the severity and effect on the maximum speed threshold value of the bad weather.

The vehicle location data 786, including the $(L, L)_V$ values, may be stored in a vehicle location and weather database 787. The weather data 788, including the $(L, L)_{BW\,Start}$ and $(L, L)_{BW\,End}$ values, may also be added to the vehicle location and weather database 787 accessible by the internet service 792 and by the throttle control system 710. The vehicle location and weather database 787 may be stored on the internet service 792.

Figure 27:
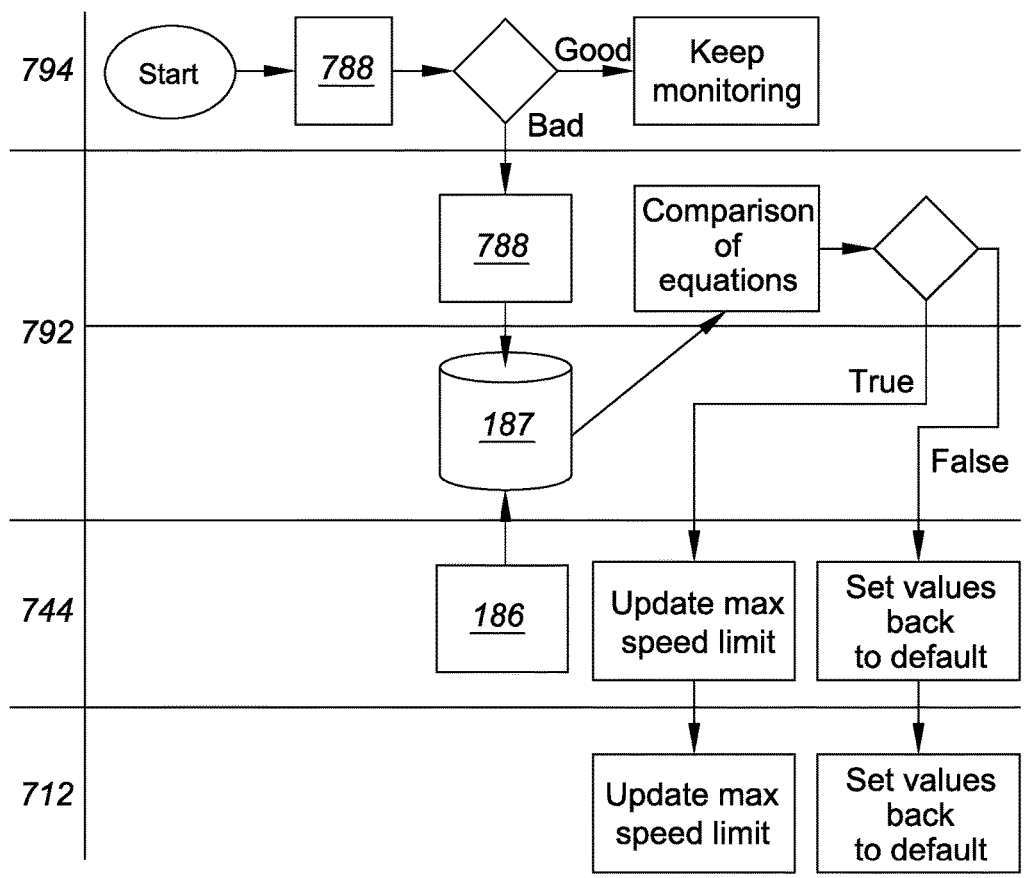
FIG. 27 is a flow chart of speed limiting based on weather and heading data.

FIG. 27 is a flow chart of a method of accounting for the weather data 788 in application of the throttle control system 710 to control the vehicle 784. The weather data 788 may be evaluated by the weather service 794 to determine whether the weather data 788 is indicative of bad weather that justifies lowering the maximum speed threshold value. If the weather data 788 is indicative of good weather, the weather service 794 simply continues monitoring the weather data 788. If the weather data 788 is indicative of bad weather, the weather data 788 is provide to the internet service 792 and stored in the vehicle location and weather database 787. Weather data 788 indicative of bad weather may result in lowering the maximum speed threshold value in general, within selected geofences, for selected vehicles, for selected drivers, or with any other suitable qualification on the extent of change in the maximum speed threshold value. The nature of the weather may also be relevant in terms of effect on road conditions, effect on visibility, or other factors. Lowering the maximum speed threshold value, changing the maximum voltage range value based on the weather data 788 may enhance safety of the driver, cargo, and vehicle.

The internet service 792 may calculate the vehicle position based on the $(L, L)_V$ data in the vehicle location and weather database 787, and compares this position to the bad weather zone 782 based on $(L, L)_{BW\ Start}$ and $(L, L)_{BW\ End}$ values stored in the vehicle location and weather database 787. The internet service 792 calculates whether the vehicle is approaching or within the bad weather zone 782. The calculation by the internet service 792 may include confirmation of whether the vehicle location $(L, L)_V$ is within a defined threshold range "$(L_x, L_y)$" from $(L, L)_{BW\ Start}$ and of whether the vehicle 784 is inside the bad weather zone 782 by application of $(L, L)_{BW\ Start} <= (L, L)_V <= (L, L)_{BW\ End}$. Based on the $(L, L)_V$ and $(L, L)_{BW\ Start}$, the internet service 792 applies a comparison of equations to determine when to change the maximum speed threshold value. In FIG. 27, the comparison of equations tests as "True" where $(L, L)_{BW\ Start} - (L, L)_V <= (L_x, L_y)$, or where $(L, L)_{BW\ Start} <= (L, L)_V <= (L, L)_{BW\ End}$.

Where the internet service 792 assess that the vehicle is within the range $(L_x, L_y)$ from $(L, L)_{BW\ Start}$ or that $(L, L)_{BW\ Start} <= (L, L)_V <= (L, L)_{BW\ End}$, a packet is sent to the throttle control system 710. The packet includes an updated maximum speed threshold value and a geofence or other geographical definition of the bad weather zone. The packet is received at the communication module 748 and the information is saved on the computer readable medium 714 for access by the processor 712. After sending the packet containing the maximum speed threshold information, the Internet service 792 may notify the driver that the maximum speed threshold value of the vehicle has been lowered due to the inclement conditions within the bad weather zone. The internet service 792 may notify the driver by a message communicated to the throttle control system 710, to a cellular phone or other device via any available messaging platform, or to any suitable mobile data terminal. If the outcome of the comparison between the vehicle location data and weather data indicates that the maximum speed threshold value is to be lowered, the throttle control system 710 may control deceleration, if the updated maximum speed threshold value is exceeded by the current speed of the vehicle 784.

When the internet service 792 calculates that the vehicle has left the bad weather zone based on no longer meeting the $(L, L)_{BW\ Start} <= (L, L)_V <= (L, L)_{BW\ End}$ criterion, the internet service 792 raises the maximum allowable speed threshold value to a value appropriate to the current location of the vehicle in the absence of bad weather to restore the maximum speed threshold value and other parameters applicable to good weather. The internet service 792 follows the restoration of maximum speed threshold values by sending a message to the driver as described above to notify the driver that initial conditions are restored.

For example, a loaded semi-trailer or tractor may approach a bad weather zone including a snowstorm, and the driver may have no prior warning of the nature of the bad weather and related road conditions. In this case, the Internet service 792 may send the packets with the weather data 788 to both lower the maximum speed threshold and notify the driver of the bad weather zone. Once the weather data 788 indicates that the bad weather has passed, the maximum speed threshold value may be reverted to the value in the absence of bad weather.

In place of the weather service 794, the internet service 792 may include or be in communication with a transient travel conditions service (not shown) that functions as the weather service but is directed to other transient conditions that may be relevant to the maximum speed threshold value or other factors based on which vehicle speed, acceleration, or both may be limited. Such events may include a reported accident with authorities on scene, a demonstration, repair of a section of highway, or any temporary event on the road 780 that may require a more conservative approach to throttle control than would otherwise be the case without the event.

Throttle Control with Reference to Driver Profile

Figure 28:
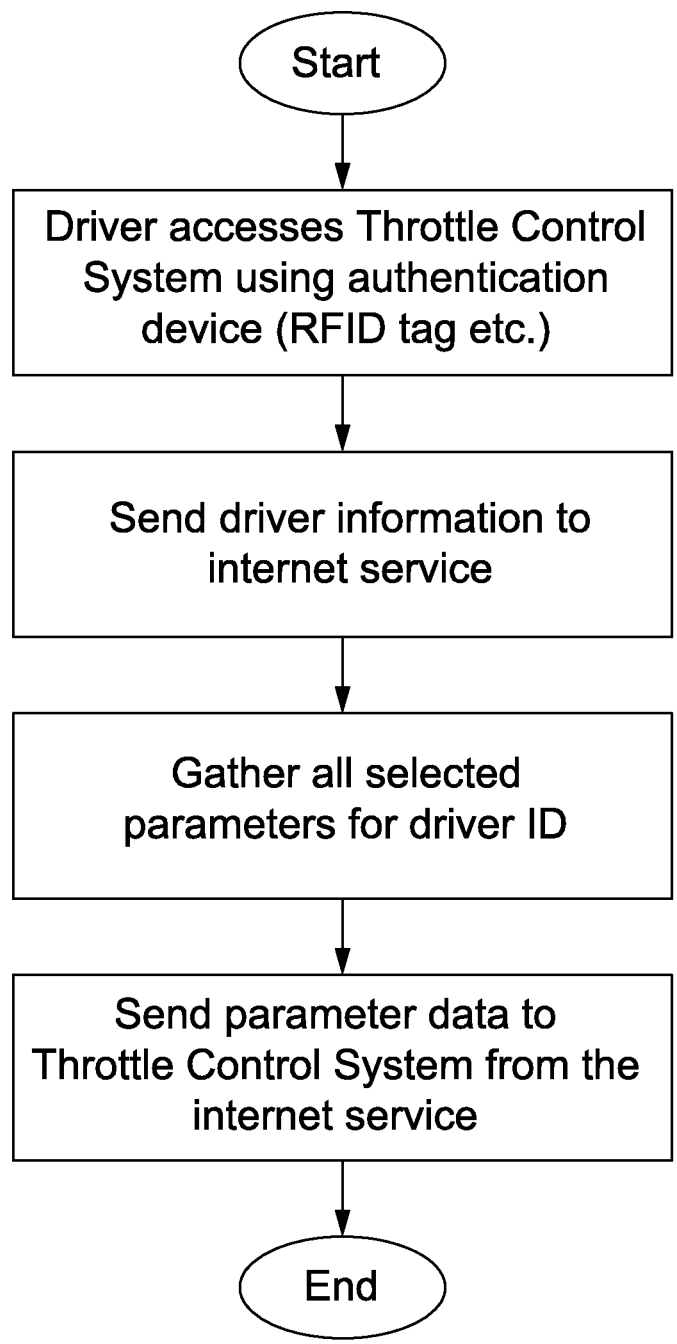
FIG. 28 is a flow chart of communication between the throttle control system of FIG. 24 and the control service for matching a driver with a driver profile.

FIG. 28 is a flow chart of access of driver-specific parameter settings by the throttle control system 710. The parameters are stored on the internet service 792. The parameters may include organization(s) to which a driver belongs, a password for accessing the driver's account, the serial number of a driver ID device associated with the driver (e.g. RFID tag, Prox Card, Dallas I-Button, Biometrics, NFC, or Pin Code etc.), any geofences pertinent to a route assigned to the driver, the maximum allowable speed threshold value inside any such each geofence, the maximum allowable speed outside the geofences, and acceleration privileges.

The driver uses a password, driver ID device, or other driver ID input to authenticate the driver's identity with the throttle control system 710. A driver ID device serial number or other unique identifier specific to the driver ID input may be communicated from the throttle control system 710 to the Internet service 792. The internet service 792 compares the unique identifier of the driver ID input to a database of authorized identifiers and vehicles associated with the identifying information. If the unique identifier received exists in the database, the internet service 792 may retrieve parameters of the throttle control system 710 associated with the particular driver ID input. The parameters are sent to the throttle control system 710 via the communication module 748. Some example parameters may include maximum speed threshold values, maximum voltage threshold values, maximum voltage range values, different values of X, different values of Y, override privileges, or other parameters that may be specific to a given driver.

When the driver is finished with the vehicle, the throttle control system 710 may be cleared of the parameters, allowing a different driver to authenticate on the vehicle for a subsequent trip with the vehicle. The parameters for a particular driver ID input may be static with respect to the corresponding driver and dynamically updated on a particular vehicle as the driver provides the driver ID input to the vehicle.

Throttle Control with Reference to Posted Speed Limits

Figure 29:
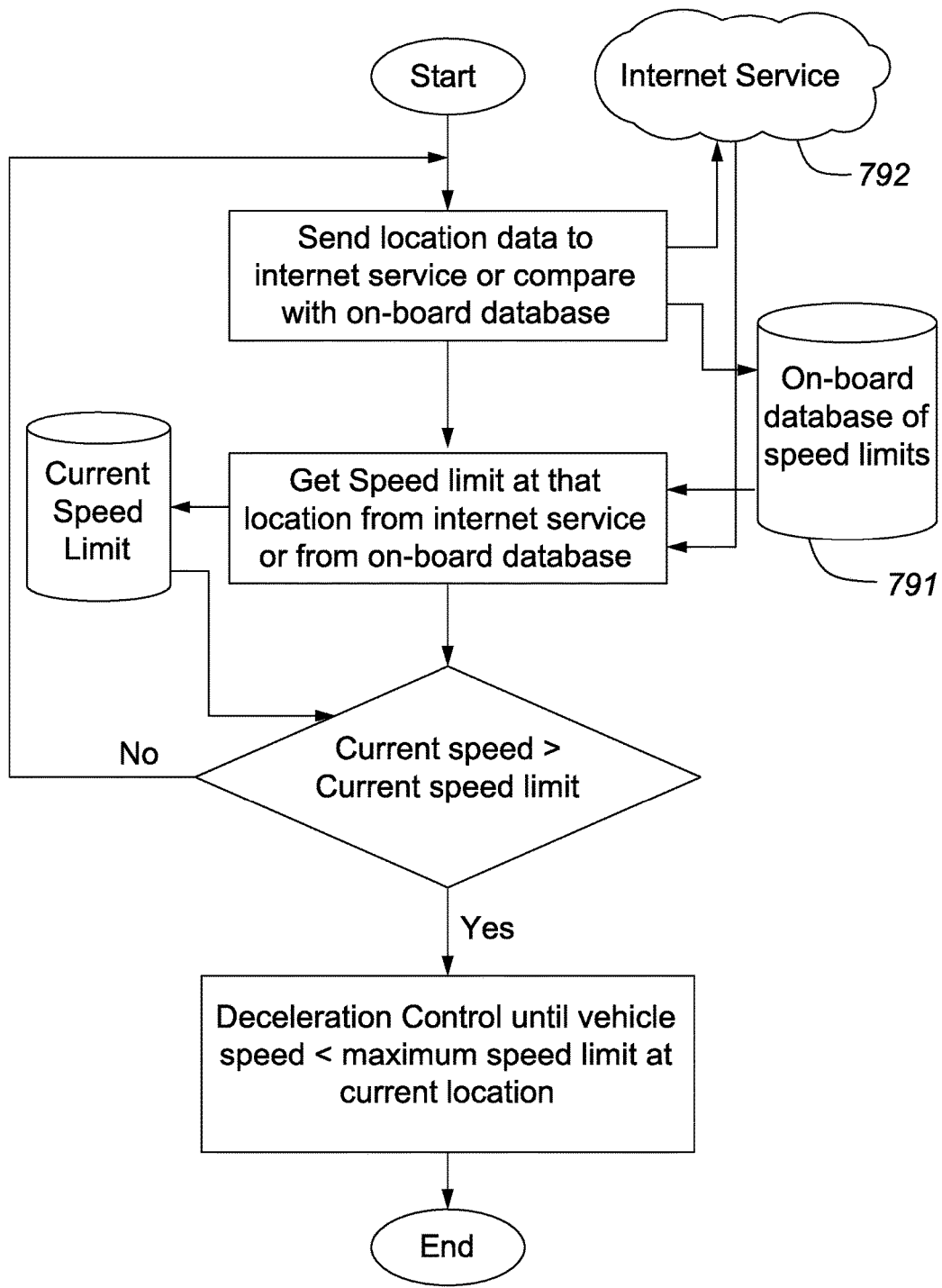
FIG. 29 is a flow chart of controlling acceleration based on a remotely-accessed database of posted speed limits.

FIG. 29 is a flow chart of a method of updating the maximum speed threshold value with reference to a database of speed limits stored on the internet service 792 or in the speed limit database 791 locally stored on the computer readable medium 714. When applying the internet service 792, the throttle control system 710 transmits the location data to the Internet service 792. The internet service 792 then transmits a packet including the speed limit at the location to the throttle control system 710. The processor 712 updates the maximum speed threshold value based on the packet and stores the updated maximum speed threshold value on the computer readable medium 714. If using the onboard speed limit database 791, the location data from the satellite service 721 is compared with the speed limit database 791. If the current vehicle speed at the time the maximum speed threshold value is updated exceeds the updated maximum speed threshold value, the throttle control system 710 may control deceleration.

Integration with ECM

Figure 30:
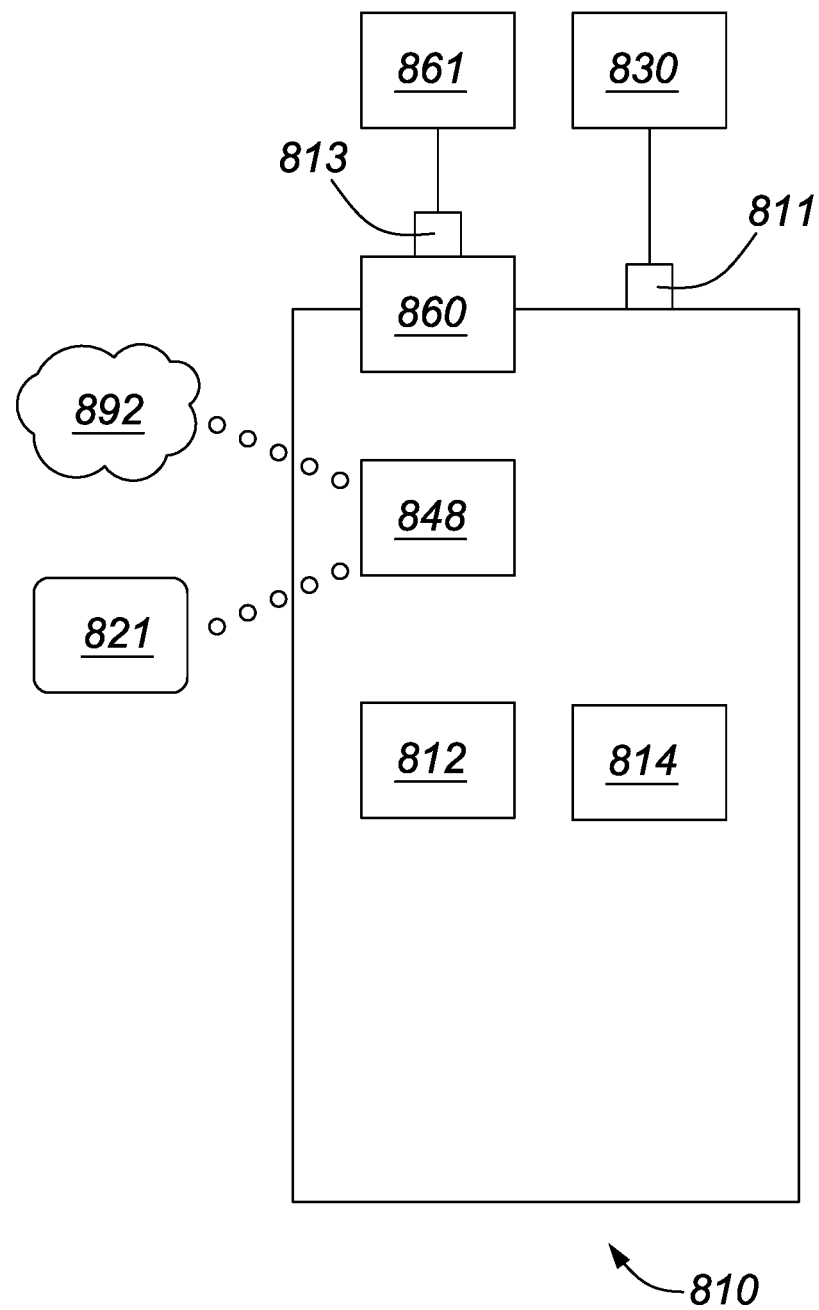
FIG. 30 is a schematic of a throttle control system integrated directly with an electronic control module of the vehicle.

FIG. 30 is a schematic of a throttle control system 810 that is integrated with the vehicle ECM 860. Since the throttle control system 810 is integrated with the ECM 860, the throttle control signal from the throttle control system 810 is downstream of the ECM 860. The throttle output 813 may drive actuators to control the vehicle throttle 861 and associated fuel injection system components. The throttle control system 810 is shown in communication with both the satellite service 821 and the Internet service 892 as sources of speed data and location data, which are applied by the processor 812 in causing the throttle control system 810 to apply acceleration control and deceleration control. The downstream mechanism for effecting throttle control differs in throttle control systems that are integrated with the ECM or otherwise sending a throttle control signal that is downstream of the ECM from throttle control systems that are upstream of the ECM. However, the changes in the downstream throttle control signals effected by the throttle control system 810 through the throttle output 813 may be proportional to the corresponding changes in output voltage from the throttle output in throttle control systems that are upstream of the ECM and provide an output voltage to the ECM.

Throttle Control Systems with Example Combinations of Features

Figure 31:
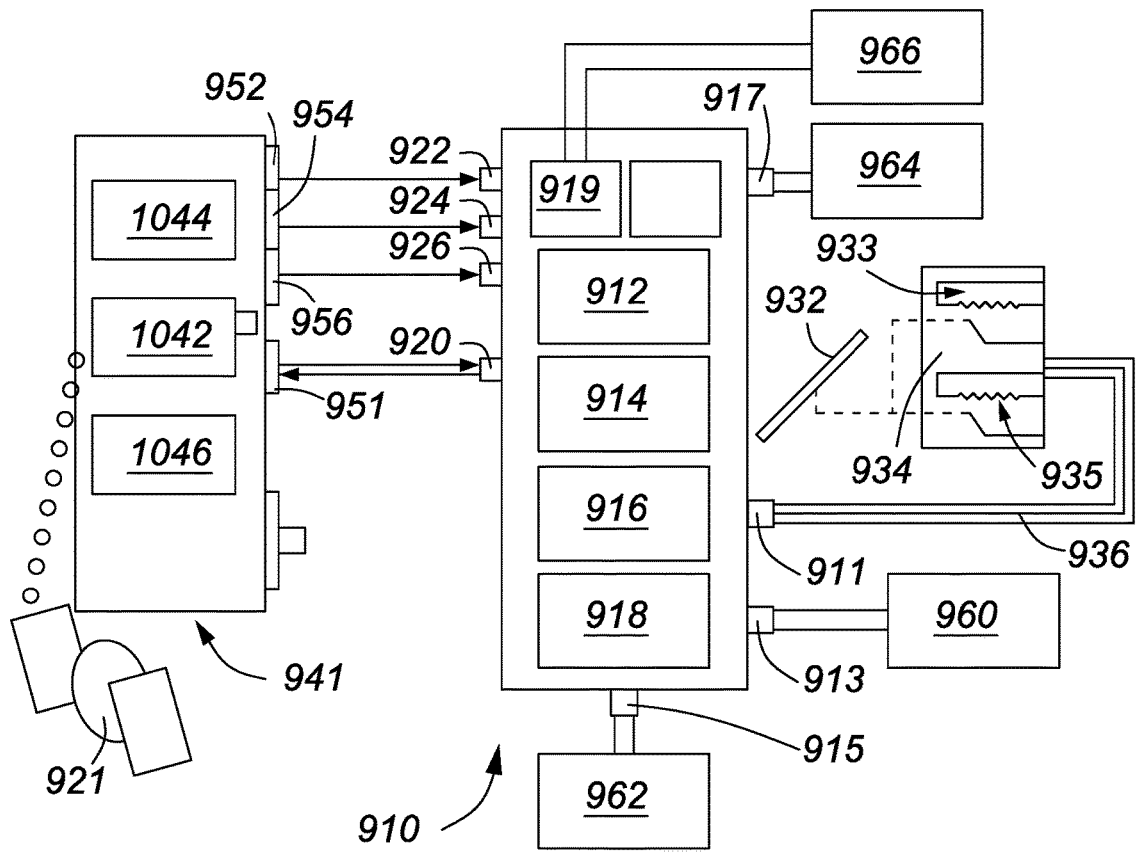
FIG. 31 is a schematic of a throttle control system connected with multiple vehicle components.

FIG. 31 is a schematic of a throttle control system 910 including features from multiple systems described above, and showing some additional details not shown in the schematics of FIGS. 1, 2, 8 to 10, 12, 20, 21, 24, and 30. The components of the vehicle connected with the throttle control system 910 include the throttle controller 930, the ECM 960, the VSS 962, the vehicle data bus 964, and the cruise control module 966. The processor 912 is in communication with a variable voltage generator 918 for defining the output voltage to be provided to the ECM 960. The throttle control system 910 includes a throttle controller input monitor 916 in communication with the processor 912 for receiving the input throttle voltage from the throttle controller 930 via the throttle input 911. The speed data may be provided from the satellite service 921 via the STM 941 at either the limiter trigger input 924 or the communication port 920, from the VSS 962, from the vehicle data bus 964, or a combination thereof. Data from the vehicle data bus 964 may be selected in preference to data from the VSS 962 as a source of comparison speed data. The location data may be provided by the satellite service 921. Data from the cruise control module 966, the vehicle data bus 964, or both may also be provided to the STM processor 944 for determining whether the vehicle is in cruise control and what the maximum cruise control speed threshold value is for applying the cruise control timer.

Figure 32:
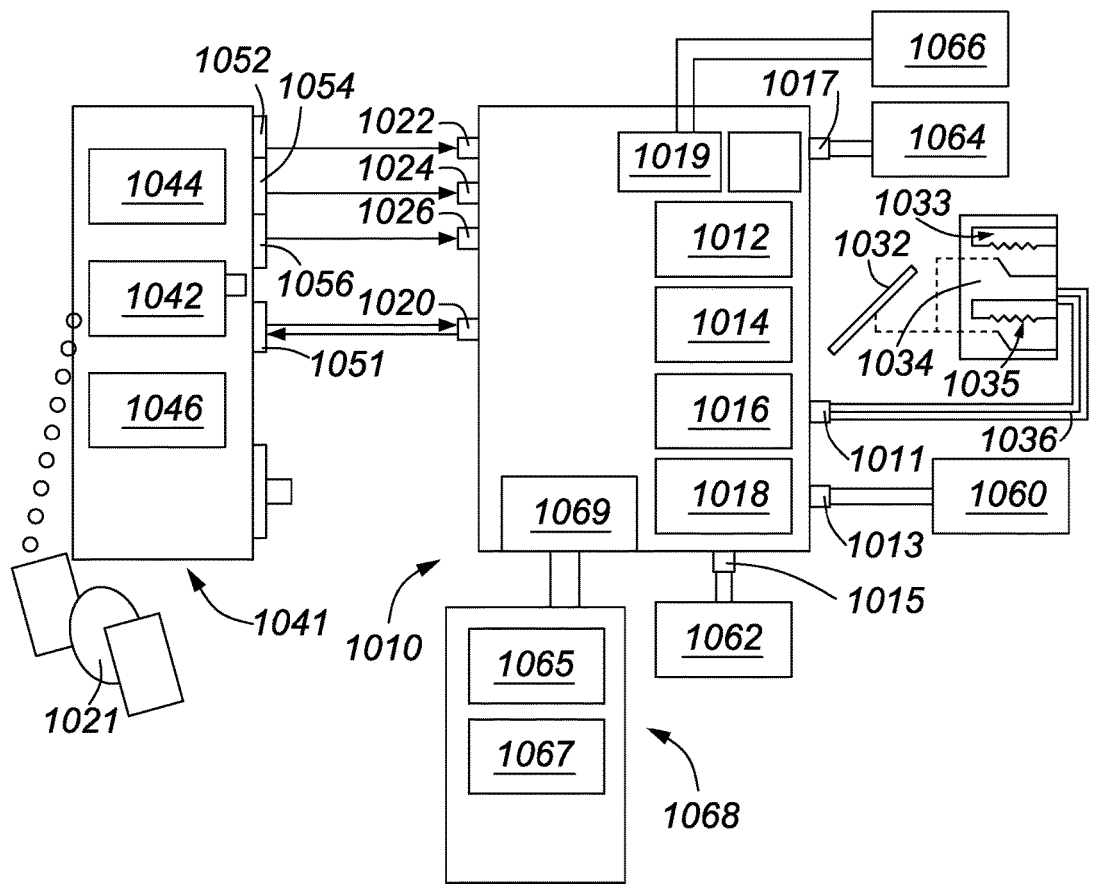
FIG. 32 is a schematic of a throttle control system for use with a vehicle including an inertial navigation system.

FIG. 32 is a schematic of a throttle control system 1010 for use with a vehicle including the inertial navigation system 1068. The components of the vehicle connected with the throttle control system 1010 include the throttle controller 1030, the ECM 1060, the VSS 1062, the vehicle data bus 1064, and the cruise control module 1066. The processor 1012 is in communication with the variable voltage generator 1018 for defining the output voltage to be provided to the ECM 1060. The throttle control system 1010 includes the throttle controller input monitor 1016 in communication with the processor 1012 for receiving the input throttle voltage from the throttle controller 1030 via the throttle input 1011. The speed data may be provided from the satellite service 1021 via the STM 1041 at either the limiter trigger input 1024 or the communication port 1020, from the VSS 1062, from the vehicle data bus 1064, from the INS 1068, or a combination thereof. The location data may be provided by the satellite service 1021, the INS 1068, or a combination thereof.

Figure 33:
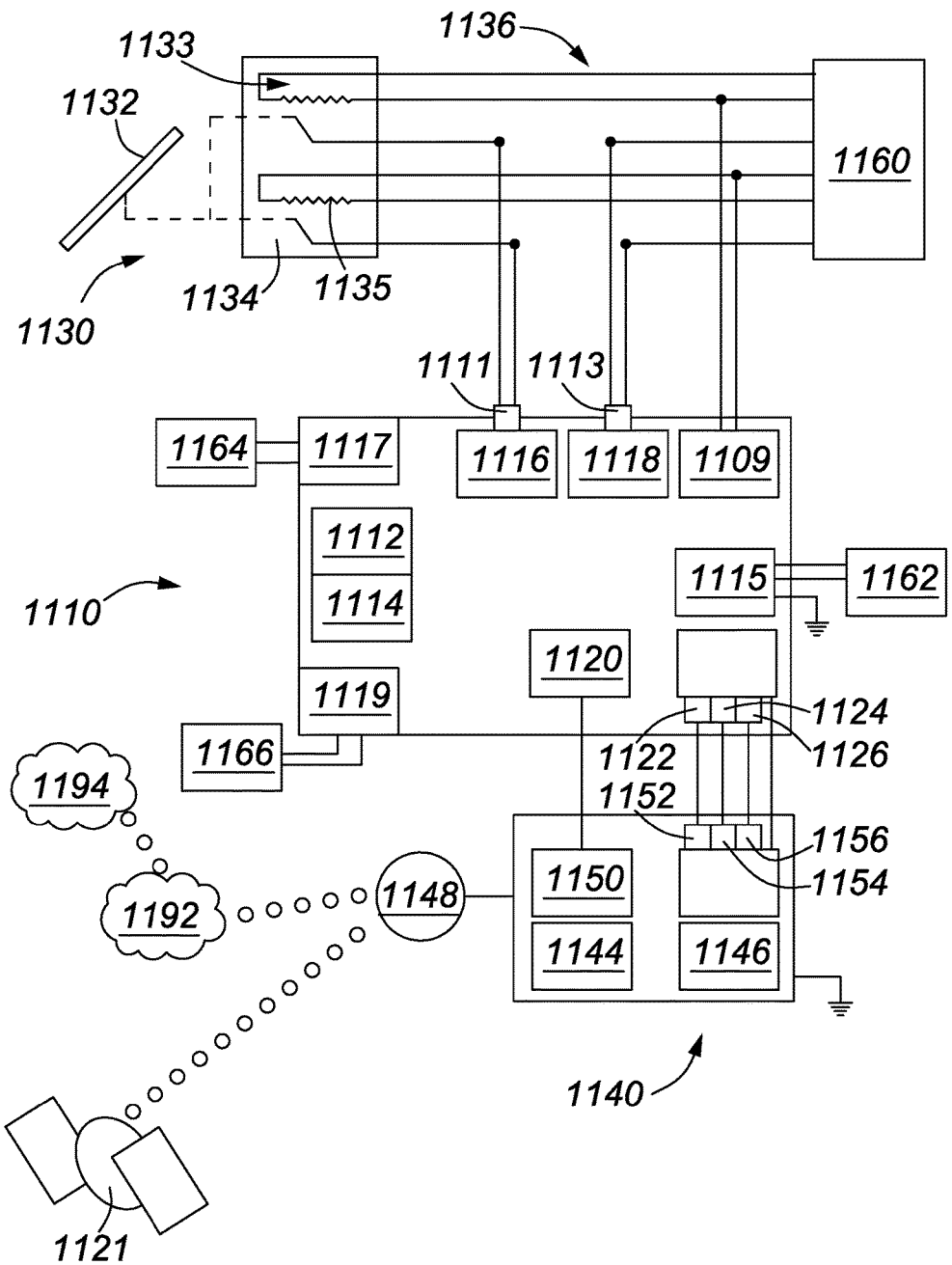
FIG. 33 is a schematic of a throttle control system in communication with an internet service.

FIG. 33 is a schematic of a throttle control 1110 system in communication with the internet service 1192 and the weather service 1194. The components of the vehicle connected with the throttle control system 1110 include the throttle controller 1130, the ECM 1160, the VSS 1162, the vehicle data bus 1164, and the cruise control module 1166. The processor 1112 is in communication with the variable voltage generator 1118 for defining the output voltage to be provided to the ECM 1160. The throttle control system 1110 includes the throttle controller input monitor 1116 in communication with the processor 1112 for receiving the input throttle voltage from the throttle controller 1130 via the throttle input 1111. The speed data may be provided from the satellite service 1121 via the STM 1141 at either the limiter trigger input 1124 or the communication port 1120, from the VSS 1162, from the vehicle data bus 1164, or a combination thereof. The location data may be provided by the satellite service 1121.

The throttle control system 1110 includes a tamper detection module 1109 connected with the circuit defined by a portion of the connection 1136 between the throttle position controller 1134 and the ECM 1160. The tamper logic may be activated when input voltage from the throttle controller 1130 is zero, output voltage to the ECM 1160 is zero, or the main power is disconnected from the throttle control system 1110. The safety logic allows the driver to manipulate the engine speed to shift to a lower gear if necessary (e.g. to deal with terrain, unusual road conditions, etc.).

The throttle control system 1110 includes the STM 1141. As a result, when the STM 1141 receives a data packet from the internet service 1192 at the communication module 1148, the packet may be passed from the STM 1141 to the processor 1112 via the connection between the STM communication port 1151 and the communication port 1120. Alternatively to a single packet which is passed from the STM 1141 to the processor 1112, two separate packets may be encrypted and otherwise prepared by the internet service 1192, with a first packet to be received by the STM 1141 and a second packet to be received by the processor 1112 after pass through from the STM 1141 along the communication port 1120.

When applying weather data from the weather service 1194, the outcome of the comparison between the vehicle location data and weather data may indicate that the maximum speed threshold value is to be lowered. In such a case, the STM processor 1144 may send a trigger signal through the limiter trigger output 1154 to the limiter trigger input 1124 if the current vehicle speed exceeds the updated maximum speed threshold value. In response to receipt of the trigger signal at the limiter trigger input 1120, the processor 1112 may cause the variable voltage generator 1118 to control deceleration. The cruise disabling function may also be triggered through the cruise trigger output 1152. Pulse data from the VSS 1162 or vehicle bus data from the data bus 1164 may be calibrated against the speed data from the satellite service 1121 with reference to the location data.

Three-Circuits Vehicle Throttle Controller

FIG. 34 is a flow chart of a method of calibrating of a 3-circuit throttle control system, analogous to the calibration shown in FIG. 3 for the 2-circuit throttle control system 10, with storage of values for all three circuits in the calibration database 191.

FIG. 35 is a flow chart of a method of storing pedal voltages at a wide open throttle position during the calibration of a 3-circuit throttle control system analogous to the calibration shown in FIG. 4 for the 2-circuit throttle control system 10. The minimum value of $V_{WOT}$ is stored as $V_{WOT}$ for circuit 3. Circuit 3 is provided for redundancy in the event circuits 1 and 2 fail. Circuits 1 and 2 are designed to increase in voltage when the throttle pedal is pressed. Circuit 3 is designed to decrease from 5V when the throttle pedal is pressed.

FIG. 36 is a flow chart of a method of calibrating a 3-circuit throttle control system for controlling vehicle deceleration analogous to the calibration shown in FIG. 6 for the 2-circuit throttle control system 10.

Examples Only

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of controlling a throttle on a vehicle, the method comprising:
   receiving speed data of a vehicle speed;
   receiving location data of a vehicle location;
   receiving an input voltage from a throttle controller;
   accessing a maximum speed threshold value corresponding to the vehicle location;
   comparing the vehicle speed with the maximum speed threshold value; and
   providing a throttle signal to the throttle;
   wherein the throttle signal corresponds to the input voltage where the speed data is indicative of the vehicle speed being below the maximum speed threshold value; and
   the throttle signal corresponds to a lowered input voltage value for controlling vehicle deceleration where the speed data is indicative of the vehicle speed being greater than the maximum speed threshold value.

2. The method of claim 1, wherein receiving the speed data comprises receiving the speed data from a satellite service.

3. The method of claim 2, further comprising:
   receiving comparison speed data from a comparison speed data source other than the satellite service; and
   calibrating the comparison speed data against the speed data received from the satellite service.

4. The method of claim 3, wherein the comparison speed data source comprises a vehicle speed sensor.

5. The method of claim 3, wherein the comparison speed data source comprises a vehicle data bus.

6. The method of claim 3, wherein, after calibrating the comparison speed data against the speed data received from the satellite service:
   the throttle signal corresponds to the input voltage where the comparison speed data is indicative of the vehicle speed being below the maximum speed threshold value; and
   the throttle signal corresponds to the lowered input voltage value for controlling vehicle deceleration where the comparison speed data is indicative of the vehicle speed being greater than the maximum speed threshold value.

7. The method of claim 6, wherein the comparison speed data is applied for comparing the vehicle speed with the maximum speed threshold value when the speed data is unavailable from the satellite service.

8. The method of claim 2, further comprising removing driver control over a vehicle cruise control module where the vehicle cruise control module is directing the vehicle to drive at a maximum cruise control speed threshold value greater than the maximum speed threshold value.

9. The method of claim 8, wherein removing driver control over the vehicle cruise control module follows receiving speed data indicative of the vehicle speed being greater than the maximum cruise control speed threshold value.

10. The method of claim 8, wherein removing driver control over the vehicle cruise control module follows a defined time period of receiving speed data indicative of the vehicle speed being at or below the maximum cruise control speed threshold value and being greater than the maximum speed threshold value.

11. The method of claim 2, wherein:
   receiving the speed data from the satellite service comprises receiving the speed data with a satellite-based tracking module ("STM");
   comparing the vehicle speed with the maximum speed threshold value is completed by the STM; and
   providing the throttle signal to the throttle comprises receiving a limiter trigger signal from the STM where the vehicle speed is greater than the maximum speed threshold value.

12. The method of claim 11, further comprising:
   receiving comparison speed data from a comparison speed data source other than the satellite service;
   receiving a calibration trigger signal from the STM; and
   calibrating the comparison speed data against the speed data received from the satellite service.

13. The method of claim 11, further comprising:
   receiving a cruise trigger signal from the STM; and
   removing driver control over a vehicle cruise control feature in response to the cruise trigger signal.

14. The method of claim 1, wherein receiving the speed data comprises receiving the speed data from a vehicle speed sensor.

15. The method of claim 1, wherein receiving the speed data comprises receiving the speed data from a vehicle data bus.

16. The method of claim 1, wherein receiving the location data comprises receiving the location data from a satellite service.

17. The method of claim 1, wherein receiving the location data comprises receiving the location data from an inertial navigation system.

18. The method of claim 1, wherein receiving the location data comprises receiving the location data from a terrestrial beacon system.

19. The method of claim 1, wherein accessing the maximum speed threshold value comprises accessing a database of posted speed limits, identifying the vehicle location in the database, and applying the posted speed limit at the vehicle location for defining the maximum speed threshold value.

20. The method of claim 19, wherein defining the maximum speed threshold value comprises setting the maximum speed threshold value at a defined margin above the posted speed limit.

21. The method of claim 1, wherein accessing the maximum speed threshold value comprises accessing a database of geofence locations and identifying the vehicle location in the database.

22. The method of claim 21, wherein:
receiving the location data comprises receiving the location data from a satellite service; and
the maximum speed threshold value at the time the vehicle enters a geofence remains applicable if communication with the satellite service is lost.

23. The method of claim 21, wherein a border of the geofence is located proximate an access point to a tunnel.

24. The method of claim 21, wherein the geofence locations are defined by accumulators that define the maximum speed threshold value.

25. The method of claim 21, wherein accessing the database of geofence locations comprises accessing an internet service hosting the database of geofence locations.

26. The method of claim 21, wherein accessing the database of geofence locations comprises accessing a locally-stored copy of the database of geofence locations.

27. The method of claim 21, wherein the maximum speed threshold value inside at least one geofence is zero.

28. The method of claim 22, further comprising sending an alert to an internet service when the vehicle enters the geofence with a zero maximum speed threshold value.

29. The method of claim 1, wherein accessing the maximum speed threshold value comprises accessing a database of driver profiles.

30. The method of claim 1, wherein accessing the maximum speed threshold value comprises accessing an internet service.

31. The method of claim 30, wherein accessing the internet service comprises accessing a weather service.

32. The method of claim 31, wherein accessing the weather service comprises receiving weather data including data of a bad weather zone location, identifying the vehicle location in relation to the bad weather zone, and defining the maximum speed threshold value with respect to the bad weather zone.

33. The method of claim 32, further comprising lowering the maximum speed threshold where the vehicle location is inside the bad weather zone.

34. The method of claim 32, further comprising lowering the maximum speed threshold where the vehicle location is within a defined distance from the bad weather zone.

35. The method of claim 1, wherein accessing the maximum speed threshold value comprises accessing a database locally stored onboard the vehicle.

36. The method of claim 1, wherein:
the throttle signal comprises an output voltage to an ECM of the vehicle;
the output voltage is lowered from the input voltage to a target voltage value for controlling vehicle deceleration where the speed data is indicative of the vehicle speed being greater than the maximum speed threshold value; and
providing the throttle signal to the throttle comprises providing the output voltage at the target voltage value to the ECM.

37. The method of claim 36, further comprising:
receiving an input voltage of an idle throttle value ("VIdle"); and
calibrating the target voltage based on VIdle; wherein the target voltage is VIdle.

38. The method of claim 37, further comprising recalibrating VIdle during vehicle operation when the input voltage is equal to VIdle.

39. The method of claim 37, wherein lowering the output voltage to VIdle comprises lowering the output voltage from a voltage value at the time the maximum speed threshold value is detected ("VLIM") to VIdle in X steps of Y duration each.

40. The method of claim 39, further comprising releasing control over the output voltage once a time period of XY has passed following both the output voltage reaching VIdle and the speed data indicating that the speed is equal or less than the maximum speed threshold value.

41. The method of claim 39, wherein X=60 steps, Y=50 ms/step, and XY=3 seconds.

42. The method of claim 1, wherein providing the throttle signal to the throttle comprises providing an output voltage to an ECM in communication with the throttle.

43. The method of claim 1, wherein comparing the speed data to the maximum speed threshold value and preparing the throttle signal are executed onboard an ECM of the vehicle and providing the throttle signal to the throttle comprises actuation of the throttle by the ECM.

44. The method of claim 1, wherein the throttle signal corresponds to the input voltage where the speed data is indicative of the vehicle speed accelerating beyond the maximum speed threshold value following the throttle signal corresponding to the lowered input voltage value.

45. The method of claim 1, further comprising providing the speed data, the location data, or data of the input voltage to an internet service.

46. A non-transitory computer readable medium including instructions encoded thereon for carrying out the method of any one of claims 1 to 45.

47. A system for controlling a throttle on a vehicle, the system comprising:
a speed data input for receiving speed data of a vehicle speed;
a location data input for receiving location data of a vehicle location;
a voltage input for receiving an input voltage from a throttle controller;
a throttle output for providing a throttle signal to the throttle;

a computer readable medium for storing a maximum speed threshold value corresponding to the location; and a processor in communication with the speed data input for receiving the speed data, with the location data input for receiving the location data, with the voltage input for receiving the input voltage, with the throttle output for controlling the throttle signal, and with the computer readable medium for accessing the maximum speed threshold value;

wherein the processor is configured and adapted to compare the speed data to the maximum speed threshold value;

the throttle signal corresponds to the input voltage where the speed data is indicative of the vehicle speed being below the maximum speed threshold value; and the throttle signal corresponds to a lowered input voltage value for controlling vehicle deceleration where the speed data is indicative of the vehicle speed being greater than the maximum speed threshold value.

48. The system of claim 47, wherein the speed data input and the location data input together comprise a satellite data input for receiving satellite data from a satellite service, and the satellite data comprises the speed data and the location data.

49. The system of claim 48, further comprising a comparison speed data input for receiving comparison speed data from a comparison speed data source other than the satellite service; wherein the processor is configured and adapted to calibrate the comparison speed data against the speed data received from the satellite service.

50. The system of claim 49, wherein the comparison speed data source comprises a vehicle speed sensor.

51. The system of claim 49, wherein the comparison speed data source comprises a vehicle data bus.

52. The system of claim 49, wherein:

the throttle signal corresponds to the input voltage where the comparison speed data is indicative of the vehicle speed being below the maximum speed threshold value; and the throttle signal corresponds to the lowered input voltage value for controlling vehicle deceleration where the comparison speed data is indicative of the vehicle speed being greater than the maximum speed threshold value.

53. The system of claim 52, wherein the processor is configured and adapted to apply the comparison speed data for comparing the vehicle speed with the maximum speed threshold value when the speed data is unavailable from the satellite service.

54. The system of claim 48, further comprising a cruise control relay interrupt for removing driver control over a vehicle cruise control module where the vehicle cruise control module is directing the vehicle to drive at a speed greater than the maximum speed threshold value.

55. The system of claim 48, further comprising a satellite-based tracking module ("STM") in communication with the processor; wherein the STM is in communication with the satellite service for providing the location data input and the speed data input;

comparing the vehicle speed with the maximum speed threshold value is completed by the STM; and the STM is configured and adapted to provide a limiter trigger signal to the processor where the vehicle speed is greater than the maximum speed threshold value.

56. The system of claim 55, further comprising a comparison speed data input for receiving comparison speed data from a comparison speed data source other than the satellite service; and wherein the STM is configured and adapted to provide a calibration trigger signal to the processor in response to comparison speed data indicative of the maximum speed threshold value; and the processor is configured and adapted to calibrate the comparison speed data against the speed data received from the satellite service in response to the calibration trigger signal and the limiter trigger signal both being provided to the processor by the STM.

57. The system of claim 55, wherein:

the processor is configured and adapted to receive an input voltage of an idle throttle value ("VIdle") and calibrate the target voltage based on VIdle;

the STM is configured and adapted to provide a calibration trigger signal to the processor in response to an input voltage equal to VIdle; and the processor is configured and adapted to calibrate VIdle in response to the calibration trigger signal.

58. The system of claim 55, further comprising a cruise control relay providing operative communication between the processor and a vehicle cruise control feature, and wherein:

the STM is configured and adapted to provide a cruise trigger signal to the processor; and the processor is configured and adapted to remove driver control over a vehicle cruise control feature in response to the cruise trigger signal.

59. The system of claim 47, wherein the speed data input is for receiving the speed data from a vehicle speed sensor.

60. The system of claim 47, wherein the speed data input is for receiving the speed data from a vehicle data bus.

61. The system of claim 47, wherein the location data input is for receiving the speed data from a satellite-based tracking system.

62. The system of claim 47, wherein the location data input is for receiving the speed data from an inertial navigation system.

63. The system of claim 47, wherein the location data input is for receiving the speed data from a terrestrial beacon system.

64. The system of claim 47, wherein:

the throttle output comprises a voltage output for connecting the system to an electronic control module ("ECM") of the vehicle;

the throttle signal comprises an output voltage; and controlling the throttle signal comprises lowering the input voltage to a lower value target voltage for controlling vehicle deceleration where the speed data indicates that the speed is greater than the maximum speed threshold value.

65. The system of claim 64, wherein the processor is configured and adapted to receive an input voltage of an idle throttle value ("VIdle"); and calibrate the target voltage based on VIdle; wherein the target voltage is VIdle.

66. The system of claim 65, wherein the processor is configured and adapted to recalibrate VIdle during vehicle operation when the input voltage is equal to VIdle.

67. The system of claim 65, wherein the processor is configured and adapted to lower the output voltage to VIdle by lowering the output voltage from a voltage value at the time the maximum speed threshold value is detected ("VLIM") to VIdle in X steps of Y duration each.

68. The system of claim 67, wherein the processor is configured and adapted to release control over the output voltage once a time period of XY has passed following both the output voltage reaching VIdle and the speed data indicating that the speed is equal or less than the maximum speed threshold value.

69. The system of claim 67, wherein X=60 steps, Y=50 ms/step, and XY=3 seconds.

70. The system of claim 47, wherein the throttle output comprises a downstream output for directing actuation of the throttle downstream of an ECM.

71. The system of claim 47, wherein the throttle signal corresponds to the input voltage where the speed data is indicative of the vehicle speed accelerating beyond the maximum speed threshold value following the throttle signal corresponding to the lowered input voltage value.

* * * * *